(12) United States Patent
Tomita et al.

(10) Patent No.: US 7,711,253 B2
(45) Date of Patent: May 4, 2010

(54) BLUR CORRECTION CAMERA SYSTEM

(75) Inventors: Hiroyuki Tomita, Yokohama (JP);
Kazutoshi Usui, Kawasaki (JP); Kenichi Kitano, Kawasaki (JP); Yoshiko Ono, Kawasaki (JP)

(73) Assignee: Nikon Corporation, Tokyo (JP)

( * ) Notice: Subject to any disclaimer, the term of this patent is extended or adjusted under 35 U.S.C. 154(b) by 326 days.

(21) Appl. No.: 10/540,136

(22) PCT Filed: Dec. 25, 2003

(86) PCT No.: PCT/JP03/16809

§ 371 (c)(1),
(2), (4) Date: Jun. 21, 2005

(87) PCT Pub. No.: WO2004/059380

PCT Pub. Date: Jul. 15, 2004

(65) Prior Publication Data

US 2006/0110147 A1    May 25, 2006

(30) Foreign Application Priority Data

| Dec. 25, 2002 | (JP) | 2002-374644 |
| Dec. 25, 2002 | (JP) | 2002-374661 |
| Dec. 25, 2002 | (JP) | 2002-374687 |
| Dec. 25, 2002 | (JP) | 2002-374704 |
| Dec. 25, 2002 | (JP) | 2002-374724 |
| Dec. 25, 2002 | (JP) | 2002-374739 |
| Dec. 25, 2002 | (JP) | 2002-374748 |
| Feb. 3, 2003  | (JP) | 2003-026098 |

(51) Int. Cl.
*G03B 17/00* (2006.01)

(52) U.S. Cl. ............... 396/53; 396/55; 396/75; 396/79; 396/80; 396/82; 396/133; 348/208.5

(58) Field of Classification Search ............ 396/55, 396/53, 49, 75, 79, 80, 82, 87, 120, 128, 396/133, 153, 323, 657; 348/208.5, 220.1
See application file for complete search history.

(56) References Cited

U.S. PATENT DOCUMENTS 4,876,602 A * 10/1989 Zwirn et al. .............. 348/625

(Continued)

FOREIGN PATENT DOCUMENTS

JP       A 61-240780         10/1986

(Continued)

OTHER PUBLICATIONS

Nov. 13, 2009 Supplemental European Search Report in U.S. Appl. No. 03/786,325.

*Primary Examiner*—W B Perkey
*Assistant Examiner*—Michael A Strieb
(74) *Attorney, Agent, or Firm*—Oliff & Berridge, PLC

(57) ABSTRACT

A blur correction camera system includes a blur correction lens driven based upon the vibration detection signal detected by an angular velocity sensor, that corrects an image blur, a point-image function computing unit that computes a point spread function, and an image restoration computing unit that corrects an image blur by executing image restoration through image processing on a captured image by using the point spread function. The image blur that cannot be completely corrected by the blur correction lens is further corrected through image restoration so as to obtain a high quality image.

28 Claims, 28 Drawing Sheets

U.S. PATENT DOCUMENTS

| | | | | |
|---|---|---|---|---|
| 5,155,520 A | * | 10/1992 | Nagasaki et al. | 396/53 |
| 5,282,044 A | * | 1/1994 | Misawa et al. | 348/208.5 |
| 5,365,303 A | * | 11/1994 | Yamasaki et al. | 396/53 |
| 5,440,343 A | * | 8/1995 | Parulski et al. | 348/316 |
| 5,619,030 A | * | 4/1997 | Shiomi | 250/201.1 |
| 5,633,756 A | | 5/1997 | Kaneda et al. | |
| 5,657,080 A | | 8/1997 | Sekine | |
| 5,878,108 A | * | 3/1999 | Baba et al. | 378/98.4 |
| 5,999,746 A | * | 12/1999 | Kitagawa | 396/52 |
| 6,097,896 A | * | 8/2000 | Usui | 396/55 |
| 6,219,446 B1 | * | 4/2001 | Kiriki et al. | 382/167 |
| 6,771,308 B1 | * | 8/2004 | Yamamoto et al. | 348/207.2 |
| 6,900,841 B1 | | 5/2005 | Mihara | |
| 6,940,542 B2 | * | 9/2005 | Kitazawa et al. | 348/208.99 |
| 2001/0010705 A1 | * | 8/2001 | Min | 375/240.11 |
| 2002/0167597 A1 | | 11/2002 | Nakano et al. | |
| 2005/0168581 A1 | * | 8/2005 | Shinohara et al. | 348/208.1 |

FOREIGN PATENT DOCUMENTS

| | | | |
|---|---|---|---|
| JP | A 62-127976 | | 6/1987 |
| JP | A 63-187883 | | 8/1988 |
| JP | A 06-118468 | | 4/1994 |
| JP | A 06-276512 | | 9/1994 |
| JP | A 09-163215 | | 6/1997 |
| JP | A 11-101998 | | 4/1999 |
| JP | A 11-146260 | | 5/1999 |
| JP | A-2000-155347 | | 6/2000 |
| JP | A-2000-162659 | | 6/2000 |
| JP | A-2000-207549 | | 7/2000 |
| JP | 2001-203930 | * | 7/2001 |
| JP | A-2001-333326 | | 11/2001 |
| JP | A 2002-112099 | | 4/2002 |
| JP | A-2002-131832 | | 5/2002 |
| JP | A-2002-156675 | | 5/2002 |
| JP | A-2002-232777 | | 8/2002 |
| JP | A 2002-300459 | | 10/2002 |
| JP | A-2002-365686 | | 12/2002 |
| WO | WO 02/28091 A1 | | 4/2002 |

* cited by examiner (a) $z'(x,y)$ (b) $p'(x,y)$ (c) $o''(x,y)$ (a) POINT IMAGE FUNCTION p(x)

(b) SPATIAL FREQUENCY TRANSFER FUNCTION P(u)

(c) INVERSE FILTER 1/P(u)

(d) WIENER FILTER 1/(P(u) + 1/c)

BLUR CORRECTION CAMERA SYSTEM

INCORPORATION BY REFERENCE

The disclosures of the following priority applications are herein incorporated by reference:
Japanese Patent Application No. 2002-374644 filed Dec. 25, 2002
Japanese Patent Application No. 2002-374661 filed Dec. 25, 2002
Japanese Patent Application No. 2002-374687 filed Dec. 25, 2002
Japanese Patent Application No. 2002-374704 filed Dec. 25, 2002
Japanese Patent Application No. 2002-374724 filed Dec. 25, 2002
Japanese Patent Application No. 2002-374748 filed Dec. 25, 2002
Japanese Patent Application No. 2002-374739 filed Dec. 25, 2002
Japanese Patent Application No. 2003-026098 filed Feb. 3, 2003

TECHNICAL FIELD

The present invention relates to a technology adopted in a camera or the like to correct an image blur by detecting a vibration caused by an unsteady hand movement or the like.

BACKGROUND ART

There are cameras known in the related art, that have a blur correcting function for preventing an unsteady hand movement during a photographing operation from lowering the quality of the captured image. Blurring is corrected in such a camera by adopting one of the following two primary methods.

The first method is an optical blur correction method in which a vibration of the camera is detected by using a vibration detection sensor such as an angular velocity sensor or an acceleration sensor and a blur is corrected by driving an optical system such as a photographic lens or a variable apex-angle prism in correspondence to the extent of the detected vibration (see, for instance, Japanese Laid Open Patent Publication No. S61-240780).

The second method is an electronic blur correction method in which the extent of blur is determined based upon the difference between the captured image and a previous image having been stored in memory on a temporary basis and the blur is corrected when reading out the image (see, for instance, Japanese Laid Open Patent Publication No. S63-187883). Through either of these two methods, the blur is corrected in real-time when the image is photographed.

There is another technology known in the related art which is used as an alternative blur correction method to those described above, through which a degraded image is restored as a blur-free image, unaffected by any unsteady hand movement. For instance, Japanese Laid Open Patent Publication No. S62-127976 discloses a method in which degradation of an image caused by a vibration occurring during the photographing operation is expressed as a point spread function and the image is restored as a blur-free image based upon the point spread function. There is also a technology known in the related art adopted in conjunction with a camera equipped with a vibration detection means alone, through which hand movement information is recorded and a blur is corrected by executing image restoration processing based upon the information when reproducing the image (see, for instance, Japanese Laid Open Patent Publication No. H 6-276512).

A specific method adopted in the image restoration processing is now explained. The term "image restoration" refers to a restoration of a blurred image, achieved by processing the blurred image based upon blur-related information so as to obtain an image manifesting a lesser extent of blurring.

With (x, y) representing positional coordinates on an image plane, o(x, y) representing an image obtained without experiencing any vibration (hereafter referred to as a raw image), z(x, y) representing an image degraded due to vibration (hereafter referred to as a blurred image) and p(x, y) representing information of a point image having become spread due to vibration (hereafter referred to as a point spread function), o(x, y), z(x, y) and p(x, y) achieve a relationship expressed as follows;

$$z(x,y)=o(x,y)*p(x, y,) \quad (1)$$

In the expression above, "*" indicates a convolution (convoluted integration) arithmetic operation, which is expressed specifically as follows;

$$z(x, y)=\iint o(x, y)p(x-x', y-y')dx' dy' \quad (2)$$

When the relationship is transformed into a relationship in a spatial frequency (u, v) range through a Fourier transform, expressions (1) and (2) are rewritten as follows;

$$Z(u, v)=O(u, v) \cdot P(u, v) \quad (3)$$

Z(u, v), O(u, v) and P(u, v) respectively represent the spectrums of z(x, y), o(x, y) and p(x, y). In addition, P(u, v) in expression (3) is specifically referred to as a spatial frequency transfer function.

If the point-image function p(x, y) can be somehow ascertained in addition to the blurred image z(x, y), their spectrums can be computed and then the spectrum O(u, v) of the raw image can be computed by using the following expression (4), which is a modified form of expression (3).

$$O(u, v) = \frac{Z(u, v)}{P(u, v)} \quad (4)$$

1/P(u, v) in expression (4) is specifically referred to as an inverse filter. The raw image o(x, y) can be determined through an inverse Fourier transformation of the spectrum computed by using expression (4). FIGS. 6(a) to 6(c) and FIGS. 7(a) to 7(d) illustrate the image restoration executed in the related art.

In order to simplify the explanation, it is assumed that a uniform blur has occurred along a single axis (the X axis), as shown in FIG. 6(b).

FIG. 7 (a) shows a section taken from the point spread function. The results of a Fourier transformation executed on this section in FIG. 7(a), which are shown in FIG. 7(b), constitute the spatial frequency transfer function of the blur shown in FIG. 6(a). This transfer function has characteristics of special interest in that it assumes the value 0 at a plurality of points. The inverse filter of this function manifests instances of infinity, as shown in FIG. 7(c). When the inverse filter is incorporated in expression (4), the phenomenon expressed as in (5) below occurs with regard to a specific spatial frequency and, in such a case, the spectrum value of the raw image is indeterminate.

$$O(u, v) = \frac{Z(u, v)}{P(u, v)} = \frac{0}{0} = \text{indeterminate} \quad (5)$$

When the transfer function indicates the value 0, there is a frequency component that has not been transferred in the case of a blur (information has been lost), and accordingly, the expression above indicates that the lost frequency component cannot be restored. This, in turn, means that the complete recovery of the raw image is not possible.

It is to be noted that a Wiener filter expressed as below is actually used in the image restoration so as to ensure that the inverse filter does not manifest infinity.

$$\frac{P^*(u, v)}{|P(u, v)|^2 + 1/c} \quad C: \text{constant} \quad (6)$$

FIG. 7(d) is a graph of the Wiener filter.

The use of the Wiener filter ensures that O(u, v) is not allowed to become indeterminate, unlike in expression (5).

However, the following problems exist in the optical blur correction and the image restoration in the related art described above.

(Problems of Optical Blur Correction)

An angular velocity sensor is normally used to detect vibration in the optical blur correction. In order to convert the angular velocity detected with the angular velocity sensor to an angle, the value (reference value) output from the sensor while it is in a resting state during the operation is needed. However, this reference value is known to be readily affected by drift attributable to temperature changes. This issue is now explained in detail in reference to FIGS. 8(a) and 8(b).

FIGS. 8(a) and 8(b) show the angular velocity sensor output containing the drift component, reference value outputs and the extent of blur manifesting on the image surface.

FIG. 8(a) shows the change occurring in the angular velocity sensor output value over time and in order to simplify the explanation, it is assumed that a vibration due to a hand movement, represented as a sine wave, has occurred. In FIG. 8(a), a waveform e0 indicates the vibration sensor output when a vibration due to a hand movement represented as a sine wave has occurred. In addition, waveforms e1 and e2 each represent a reference value computed through a low pass filter, with the cutoff frequency in the waveform e1 set lower than in the waveform e2. The output value in FIG. 8(a) indicates that the center of the vibration shifts (drifts) as time elapses due to environment-related factors.

FIG. 8(b) shows the extents of blurs in the image surface manifesting after executing blur correction based upon the angular velocity sensor output and the reference values in FIG. 8(a). Waveforms f0, f1 and f2 in FIG. 8(b) respectively correspond to the waveforms e0, e1 and e2 in FIG. 8(a), with the waveform f0 representing the extent of blur manifesting in the image surface when no blur correction has been executed. The waveform f1 indicates that by using the reference value e1 with a lower cutoff frequency than that in the waveform f2, the high frequency component is clipped more effectively but the extent of blur increases over time. The waveform f2, on the other hand, indicates that while the drift is reduced compared to that manifesting in the waveform f1 by using the reference value with a higher cutoff frequency, the high-frequency component attributable to the hand movement cannot be eliminated.

As described above, the requirements that need to be satisfied to eliminate an image blur caused by an unsteady hand movement and the requirements that need to be satisfied to reduce the extent of the adverse effect of drift conflict with each other, and it is difficult to select an optimal cutoff frequency for the low pass filter, at which the image blur can be corrected to a desired extent and the effect of the drift, too, is minimized. For this reason, a detection error is bound to manifest in the detected vibration extent, which gives rise to a problem in that blurring is not completely eliminated from the image having undergone the optical blur correction.

In addition, an optical blur correction apparatus often includes a switch operated to switch on/off a blur correction operation, and if the user fails to turn on the switch and a blur correction is not executed during the photographing operation, a blurred image will result.

(Problems of Image Restoration)

Next, the problems of image restoration are explained.

It is known in the related art that the resolution of an image obtained through restoration processing executed on a blurred image by using a Wiener filter is improved over that of the raw image. However, since the filter value is fairly large at a spatial frequency (u', v') at which P(u', v')≈0, the noise component is amplified if the noise contained in the image includes the spatial frequency component. This gives rise to a problem in that the image quality is lowered by an unnecessary stripe pattern that is bound to manifest in the image. While this stripe pattern does not pose a very serious problem as long as the initial blurring is insignificant, it manifests prominently if the extent of blurring is significant and in such a case, the stripe pattern becomes problematic.

In addition, cameras having an image restoration processing function in the related art are not capable of optically correcting blur but simply record output data from a vibration sensor such as an angular velocity sensor and execute restoration processing based upon the vibration information when reproducing the image. Thus, there is a problem in that if an image blur occurs to a great extent, the image quality cannot be improved through the image restoration processing due to the adverse effect of the stripe pattern described above and the like.

Furthermore, while the point-image function needed in the image restoration processing is computed based upon information such as the angular velocity sensor output and an image restoration computation is executed based upon the results of the computation of the point-image function, the volume of data output from the angular velocity sensor is extremely large, which necessitates lengthy arithmetic operations to be executed to result in poor computation efficiency. There is another problem in that it requires a high-speed arithmetic processing unit.

Moreover, even when the data needed for the image restoration are recorded into a recording medium or are transmitted to an external recipient without executing the point-image function computation or the image restoration computation, the great volume of data requires a large-capacity recording medium and a high-speed recording means or a high-speed communication means. Thus, the image restoration cannot be realized with ease and the implementation of the image restoration may lead to an increase in the cost.

DISCLOSURE OF THE INVENTION

The present invention adopts the following structures.

(1) A blur correction camera system according to the present invention includes a vibration detection unit that detects a vibration and outputs a vibration detection signal, a blur correction optical system that is driven based upon the vibration detection signal and corrects an image blur, an image-capturing unit that captures an image formed with a photographic optical system that includes the blur correction optical system and an image restoration computing unit that corrects an image blur by executing image restoration through image processing on an image captured by the image-capturing unit. It is desirable to further include a point spread function computing unit that computes a point spread function and that the image restoration computing unit execute the image restoration by processing the image using the point spread function. It is also desirable to further include a reference value computing unit that computes a reference value for the vibration detection signal and that the point spread function computing unit compute the point spread function based upon calculation results of the reference value computing unit. The blur correction camera system should preferably include a camera that includes the vibration detection unit, the blur correction optical system, the image-capturing unit, the point spread function computing unit, the reference value computing unit and an image recording unit that records an image, and an external device having the image restoration computing unit, which is a device independent of the camera and executes image restoration by using the image recorded by the image recording unit and the point spread function input thereto.

A blur correction camera according to the present invention includes a vibration detection unit that detects a vibration and outputs a vibration detection signal, a blur correction optical system that is driven based upon the vibration detection signal and corrects an image blur, an image-capturing unit that captures an image formed by a photographic optical system that includes the blur correction optical system, an image recording unit that records the image captured by the image-capturing unit and a point spread function computing unit that computes a point spread function needed in an image restoration computation. It is desirable to further include a point spread function output means for outputting the point spread function computed by the point spread function computing unit to the outside by utilizing the image recording unit or a communication means. It is also desirable to further include a reference value computing unit that computes a reference value for the vibration detection signal and that the point spread function computing unit computes the point spread function based upon calculation results of the reference value computing unit.

An image restoring device according to the present invention includes a data input unit that receives image data and a point spread function obtained when capturing the image data through at least one of communication with an outside and a medium and an image restoration computing unit that executes image restoration so as to correct an image blur by executing image processing on the image data using the point spread function.

A computer readable computer program product according to the present invention contains a blur correction control program, and the control program includes a data input instruction for receiving image data and a point spread function obtained when capturing the image data and an image restoration computation instruction for executing image restoration so as to correct an image blur by executing image processing on the image data using the point spread function. It is desirable that the computer program product be a recording medium on which the control program is recorded. Alternatively, the computer program product may be a carrier wave on which the control program is embodied as a data signal.

(2) A blur correction camera system according to the present invention includes a vibration detection unit that detects a vibration and outputs a vibration detection signal, a reference value computing unit that computes a reference value for the vibration detection signal, a blur correction optical system that is driven based upon the vibration detection signal and the reference value and corrects an image blur, an image-capturing unit that captures an image formed with a photographic optical system that includes the blur correction optical system, a point spread function computing unit that computes a point spread function by using the reference value or the vibration detection signal and an image restoration computing unit that corrects an image blur by executing image restoration through image processing on the image captured by the image-capturing unit using the point spread function. It is desirable to further include a point spread function computation switching unit that selects one of the reference value and the vibration detection signal to be used in the computation of the point spread function executed by the point spread function computing unit. The point spread function computation switching unit may also function as a blur correcting operation setting unit that switches ON/OFF a blur correcting operation by the blur correction optical system. It is desirable that when the blur correction optical system is to be engaged in the blur correcting operation, the point spread function computing unit compute the point spread function by using the reference value. If the blur correction optical system is not to be engaged in a blur correcting operation, the point spread function computing unit may compute the point spread function by using the vibration detection signal. The blur correction camera system should preferably include a camera that includes the vibration detection unit, the blur correction optical system, the image-capturing unit, the point spread function computing unit, the reference value computing unit and the image recording unit that records an image, and an external device having the image restoration computing unit, which is a device independent of the camera and executes image restoration by using the image recorded by the image recording unit and the point spread function input thereto.

A blur correction camera according to the present invention includes a vibration detection unit that detects a vibration and outputs a vibration detection signal, a reference value computing unit that computes a reference value for the vibration detection signal, a blur correction optical system that is driven based upon the vibration detection signal and the reference value and corrects an image blur, an image-capturing unit that captures an image formed by a photographic optical system that includes the blur correction optical system, an image recording unit that records the image captured by the image-capturing unit and a point spread function computing unit that computes a point spread function using one of the reference value and the vibration detection signal. It is desirable to further include a point spread function output means for outputting the point spread function computed by the point spread function computing unit to the outside by utilizing one of the image recording unit and a communication means.

(3) A blur correction camera according to the present invention includes a vibration detection unit that detects a vibration and outputs a vibration detection signal, a reference value computing unit that computes a reference value for the vibration detection signal a blur correction optical system that is driven based upon the reference value and the vibration detection signal and corrects an image blur, an image-capturing unit that captures an image formed by a photographic optical system that includes the blur correction optical system, a point spread function computing unit that computes a point spread function needed in an image restoration computation based upon the reference value and an information volume reducing unit that reduces the volume of information related to at least one of the reference value used in the computation of the point spread function and the computed point spread function. It is desirable that the information volume reducing unit reduce the information volume by culling data related to at least one of the reference value and the computed point spread function. It is also desirable that the information volume reducing unit reduce the information volume by ensuring that there will still be a large enough volume of information required for the image restoration computation.

(4) A blur correction camera system according to the present invention includes a vibration detection unit that detects a vibration and outputs a vibration detection signal, an image-capturing unit that captures an image formed by a photographic optical system which includes a blur correction optical system as a raw image, and a raw image saving unit that saves the raw image, an image restoration computing unit that allows parameters related to image processing to be varied, executes image restoration by executing image processing on the raw image using the parameter and creates a restored image obtained by correcting an image blur and a restoration result saving unit that saves at least one of the parameters used in the image processing executed at the image restoration computing unit and the restored image in correspondence to the raw image. It is desirable to further include a point spread function computing unit that computes a point spread function, that the image restoration computing unit execute the image restoration by processing the image using the point spread function and that the parameters include the point spread function. It is desirable that the restoration result saving unit be capable of saving at least one of a plurality of sets of parameters each corresponding to one of a plurality of restored images and a plurality of restored images. The blur correction camera system should preferably include a camera that includes a vibration detection unit, the blur correction optical system that is driven based upon the vibration detection signal and corrects an image blur, the image-capturing unit, the point spread function computing unit, a reference value computing unit that computes a reference value for the vibration detection signal and the raw image saving unit, and an external device having the image restoration computing unit and a restoration result saving unit, which is a device independent of the camera and executes image restoration by using a raw image recorded at the raw image saving unit and the point spread function input thereto.

An image restoring device according to the present invention includes a data input unit that receives raw image data and a point spread function obtained when capturing the raw image data through at least one of communication with an external device and a medium, an image restoration computing unit that allows parameters related to image processing to be varied, executes image restoration through image processing on the raw image data using parameters which include the point spread function and creates a restored image obtained by correcting an image blur and a restoration result saving unit that saves at least one of the parameters used in the image processing executed by the image restoration computing unit and the restored image in correspondence to the raw image.

A computer readable computer program product according to the present invention contains a blur correction control program, and the control program includes a data input instruction for receiving raw image data and a point spread function obtained when capturing the raw image data, an image restoration computation instruction for creating a restored image by executing image restoration so as to correct an image blur through image processing executed on the raw image data using variable parameters related to the image processing, which include the point spread function and a restoration result saving instruction for saving at least one of the parameters used in the image processing during the image restoration computation step and the restored image in correspondence to the raw image data. It is desirable that the computer program product be a recording medium on which the control program is recorded. Alternatively, the computer program product may be a carrier wave on which the control program is embodied as a data signal.

(5) A blur correction camera according to the present invention includes a vibration detection unit that detects a vibration and outputs a vibration detection signal, an optical blur correction means for correcting an image blur by driving a blur correction optical system based upon the vibration detection signal, a point spread function computing unit that computes a point spread function needed in image restoration in which the image blur is corrected through image processing and an image restoration decision-making unit that makes a decision as to whether to enter an image restoration mode in which blur correction is executed through the image restoration or a preparatory operation for a blur correction to be achieved through the image restoration is executed. It is desirable that the image restoration decision-making unit make a decision as to whether to enter the image restoration mode based upon the vibration detection signal. The image restoration decision-making unit may instead make a decision as to whether to enter the image restoration mode based upon a shutter speed. Alternatively, the image restoration decision-making unit may make a decision as to whether to enter the image restoration mode based upon the focal length of the photographic optical system. The image restoration decision-making unit may make a decision as to whether to enter the image restoration mode based upon the point spread function as well. A reporting means for reporting a decision made by the image restoration decision-making unit that the image restoration mode should not be entered may be further provided. If the image restoration decision-making unit determines that the image restoration mode should not be entered, the image restoration mode does not need to be executed. When the image restoration decision-making unit determines that the image restoration mode should not be entered, the point spread function does not need to be saved.

(6) A blur correction camera according to the present invention includes a vibration detection unit that detects a vibration and outputs a vibration detection signal, a reference value computing unit that computes a reference value for the vibration detection signal, a blur correction optical system that is driven based upon the reference value and the vibration detection signal and corrects an image blur, a drive control unit that controls an operation of the blur correction optical system based upon the vibration detection signal and the reference value, a point spread function computing unit that computes based upon the reference value a point spread function needed in image restoration executed to correct image blur through image processing and a blur correction mode selection unit that selects whether to enter an image restoration mode in which blur correction is executed through the image restoration or a preparatory operation for blur correction to be achieved through image restoration is executed in addition to an optical blur correcting operation executed by engaging the blur correction optical system in blur correction. The drive control unit modifies the contents of control implemented on the blur correction optical system in correspondence to the selection made by the blur correction mode selection unit. It is desirable that the drive control unit modify the contents of the control implemented on the blur correction optical system by adjusting a method for reference value computation in correspondence to the selection made by the blur correction mode selection unit. The reference value computing unit may compute the reference value by using a low pass filter and the drive control unit may modify the contents of the control implemented on the blur correction optical system by adjusting a cutoff frequency of the low pass filter. If the selection made by the blur correction mode selection unit indicates that image restoration is to be executed, the drive control unit should set the cutoff frequency to a higher level than the cutoff frequency set when the selection made by the blur correction mode selection unit indicates that image restoration is not to be executed.

(7) A blur correction camera according to the present invention includes a vibration detection unit that detects a vibration and outputs a vibration detection signal, an optical blur correction means for correcting an image blur by driving a blur correction optical system based upon the vibration detection signal, a point spread function computing unit that computes a point spread function needed in image restoration executed to correct through image processing a blur that cannot be completely corrected by the optical blur correction means and a blur correction mode selection unit that selects an optical blur correction mode in which blur correction is executed by engaging the optical blur correction means in operation and an image restoration mode in which blur correction is executed through image restoration or a preparatory operation for blur correction to be achieved through image restoration is executed. When the blur correction mode selection unit selects the image restoration mode, it also selects the optical blur correction mode in conjunction.

A blur correction camera according to the present invention includes a vibration detection unit that detects a vibration and outputs a vibration detection signal, an optical blur correction means for correcting an image blur by driving a blur correction optical system based upon the vibration detection signal, a point spread function computing unit that computes a point spread function needed in image restoration executed to correct through image processing a blur that cannot be completely corrected by the optical blur correction means and a blur correction mode selection unit that selects an optical blur correction mode in which a blur correction is executed by engaging the optical blur correction means in operation and an image restoration mode in which blur correction is executed through image restoration or a preparatory operation for blur correction to be achieved through image restoration is executed. The blur correction mode selection unit is not allowed to enter the image restoration mode unless the optical blur correction mode is also selected.

A blur correction camera according to the present invention includes a vibration detection unit that detects a vibration and outputs a vibration detection signal, an optical blur correction means for correcting an image blur by driving a blur correction optical system based upon the vibration detection signal, a point spread function computing unit that computes a point spread function needed in image restoration executed to correct through image processing a blur that cannot be completely corrected by the optical blur correction means and a blur correction mode selection unit that selects an optical blur correction mode in which a blur correction is executed by engaging the optical blur correction means in operation and an image restoration mode in which blur correction is executed through image restoration or a preparatory operation for blur correction to be achieved through image restoration is executed. The blur correction mode selection unit issues a warning if the image restoration mode alone is selected without also selecting the optical blur correction mode.

A blur correction camera according to the present invention includes a vibration detection unit that detects a vibration and outputs a vibration detection signal, an optical blur correction means for correcting an image blur by driving a blur correction optical system based upon the vibration detection signal, and a point spread function computing unit that computes a point spread function needed in image restoration executed to correct through image processing a blur that cannot be completely corrected by the optical blur correction. The point spread function computing unit is enabled to execute the computation of the point spread function as the optical blur correction means is engaged in operation.

(8) A blur correction camera system according to the present invention includes a blur correction optical system that corrects an image blur, a vibration detection unit that detects a vibration and outputs a vibration signal, a reference value computing unit that computes a reference value for the vibration signal, a drive unit that drives the blur correction optical system, a position detection unit that detects a position of the blur correction optical system and outputs a position signal, a control unit that controls drive of the blur correction optical system based upon the reference value, the vibration signal and the position signal so as to correct a blur manifesting in a subject image due to the vibration, an image-capturing unit that captures an image formed by a photographic optical system which includes the blur correction optical system, a control position error output unit that outputs as a control position error a difference between a target drive position for the drive of the blur correction optical system by the control unit and an actual drive position of the blur correction optical system output by the position detection unit, and an image restoration computing unit that corrects an image blur by executing image restoration on the image captured by the image-capturing unit through image processing in which the control position error is taken into consideration. It is desirable to further include a point spread function computing unit that computes a point spread function needed in the image restoration computation and a function correcting unit that corrects the point spread function by using the control position error and that the image restoration computing unit execute the image restoration by executing the image processing using the point spread function having been corrected by the function correcting unit. Alternatively, a point spread function computing unit may further be provided, that computes a point spread function needed in the image restoration computation, the point spread function may be computed based upon one of (a) the reference value and the control position error, (b) the vibration signal and the control position error, (c) the reference value, the vibration signal and the control position error and (d) the control position error, and the image restoration computing unit may execute the image restoration by using the point spread function in the image processing. The blur correction camera system should preferably include a camera that includes at least the vibration function unit, the blur correction optical system, the image-capturing unit, the point spread function computing unit, the reference value computing unit and the image recording unit that records an image, and an external device having at least the image restoration computing unit, which is a device independent of the camera and executes the image restoration using the image recorded by the image recording unit and the point spread function input thereto. Alternatively, the blur correction camera system should preferably include a camera that includes at least the vibration function unit, the blur correction optical system, the image-capturing unit, the reference value computing unit and an image recording unit that records an image, and an external device having at least the point spread function computing unit and the image restoration computing unit, which is a device independent of the camera and executes the image restoration using the image recorded by the image recording unit and the point spread function input thereto.

A blur correction camera according to the present invention includes a blur correction optical system that corrects an image blur, a vibration detection unit that detects a vibration and outputs a vibration signal, a reference value computing unit that computes a reference value for the vibration signal, a drive unit that drives the blur correction optical system, a position detection unit that detects a position of the blur correction optical system and outputs a position signal, a control unit that controls drive of the blur correction optical system based upon the reference value, the vibration signal and the position signal so as to correct a blur manifesting in a subject image due to the vibration, an image-capturing unit that captures an image formed by a photographic optical system which includes the blur correction optical system, an image recording unit that records an image, a control position error output unit that outputs as a control position error a difference between a target drive position for the drive of the blur correction optical system by the control unit and an actual drive position of the blur correction optical system output by the position detection unit, a point spread function computing unit that computes a point spread function needed in image restoration computation, a function correcting unit that corrects the point spread function by using the control position error and an external output means for outputting to an external device the point spread function having been corrected by the correcting unit via one of the image recording unit and a communication means.

A blur correction camera according to the present invention includes a blur correction optical system that corrects an image blur, a vibration detection unit that detects a vibration and outputs a vibration signal, a reference value computing unit that computes a reference value for the vibration signal, a drive unit that drives the blur correction optical system, a position detection unit that detects a position of the blur correction optical system and outputs a position signal, a control unit that controls drive of the blur correction optical system based upon the reference value, the vibration signal and the position signal so as to correct a blur manifesting in a subject image due to the vibration, an image-capturing unit that captures an image formed by a photographic optical system which includes the blur correction optical system, an image recording unit that records an image, a control position error output unit that outputs as a control position error a difference between a target drive position for the drive of the blur correction optical system by the control unit and an actual drive position of the blur correction optical system output by the position detection unit, a point spread function computing unit that computes a point spread function needed in image restoration computation and an external output means for outputting to an external device the point spread function via one of the image recording unit and a communication means. In this blur correction camera, the point spread function is computed based upon one of (a) the reference value and the control position error, (b) the vibration signal and the control position error, (c) the reference value, the vibration signal and the control position error and (d) the control position error.

A blur correction camera according to the present invention includes a blur correction optical system that corrects an image blur, a vibration detection unit that detects a vibration and outputs a vibration signal, a reference value computing unit that computes a reference value for the vibration signal, a drive unit that drives the blur correction optical system, a position detection unit that detects a position of the blur correction optical system and outputs a position signal, a control unit that controls drive of the blur correction optical system based upon the reference value, the vibration signal and the position signal so as to correct a blur manifesting in a subject image due to the vibration, an image-capturing unit that captures an image formed by a photographic optical system which includes the blur correction optical system, an image recording unit that records an image, a control position error output unit that outputs as a control position error a difference between a target drive position for the drive of the blur correction optical system by the control unit and an actual drive position of the blur correction optical system output by the position detection unit, and an external output means for outputting to an external device the control position error via one of the image recording unit and a communication means.

An image restoring device according to the present invention includes a data input unit that receives through at least one of communication with an external device and a medium a control position error determined based upon a difference between a target drive position for a blur correction optical system and an actual drive position of the blur correction optical system output by a position detection unit, image data, a point spread function obtained when capturing the image data and a function correcting unit that corrects the point spread function by using the control position error and an image restoration computing unit that corrects an image blur by executing image restoration on the image data through image processing in which the point spread function having been corrected by the function correcting unit is used.

An image restoring device according to the present invention includes a data input unit that receives through at least one of communication with an external device and a medium a control position error determined based upon a difference between a target drive position for a blur correction optical system and an actual drive position of the blur correction optical system output by a position detection unit, image data and a vibration signal obtained when capturing the image data, a point spread function computing unit that computes a point spread function needed in image restoration computation, a function correcting unit that corrects the point spread function by using the control position error and an image restoration computing unit that corrects an image blur by executing image restoration on the image data through image processing in which the point spread function having been corrected by the function correcting unit is used.

An image restoring device according to the present invention includes a data input unit that receives through at least one of communication with an external device and a medium, at least one of a control position error determined based upon a difference between a target drive position for a blur correction optical system and an actual drive position of the blur correction optical system output by a position detection unit, image data and a vibration signal obtained when capturing the image data, a point spread function computing unit that computes a point spread function needed in image restoration computation and an image restoration computing unit that corrects an image blur by executing image restoration on the image data through image processing in which the point spread function is used. The point spread function is computed based upon one of (a) a reference value determined based upon the vibration signal and the control position error, (b) the vibration signal and the control position error, (c) the reference value, the vibration signal and the control position error and (d) the control position error.

A computer readable computer program product according to the present invention contains a blur correction control program, and the control program includes a data input instruction for receiving, through at least one of communication with an external device and a medium, a control position error determined based upon a difference between a target drive position for a blur correction optical system and an actual drive position of the blur correction optical system output from a position detection unit, image data and a point spread function obtained when capturing the image data, a function correction instruction for correcting the point spread function by using the control position error and an image restoration computation instruction for correcting an image blur by executing image restoration on the image data through image processing executed using the point spread function having been corrected through a function correction step.

A computer readable computer program product according to the present invention contains a blur correction control program, and the control program includes a data input instruction for receiving, through at least one of communication with an external device and a medium, a control position error determined based upon a difference between a target drive position for a blur correction optical system and an actual drive position of the blur correction optical system output from a position detection unit, image data and a vibration signal obtained while capturing the image data, a point spread function computation instruction for computing a point spread function needed in image restoration computation, a function correction instruction for correcting the point spread function by using the control position error and an image restoration computation instruction for correcting an image blur by executing image restoration on the image data through image processing using the point spread function having been corrected through a function correction step.

A computer readable computer program product according to the present invention contains a blur correction control program, and the control program includes a data input instruction for receiving, through at least one of communication with an external device and a medium, at least one of a control position error determined based upon a difference between a target drive position for a blur correction optical system and an actual drive position of the blur correction optical system output from a position detection unit, image data and a vibration signal obtained while capturing the image data, a point spread function computation instruction for computing a point spread function needed in image restoration computation based upon one of (a) a reference value determined based upon the vibration signal and the control position error, (b) the vibration signal and the control position error, (c) the reference value, the vibration signal and the control position error and (d) the control position error, and an image restoration computation instruction for correcting an image blur by executing image restoration on the image data through image processing using the point spread function. The computer program product is a recording medium on which the control program is recorded. Alternatively, it may be a carrier wave on which the control program is embodied as a data signal.

BEST MODE FOR CARRYING OUT THE INVENTION

The following is a detailed explanation of the embodiments of the present invention, given in reference to the drawings and the like.

FIRST EMBODIMENT

Figure 1:
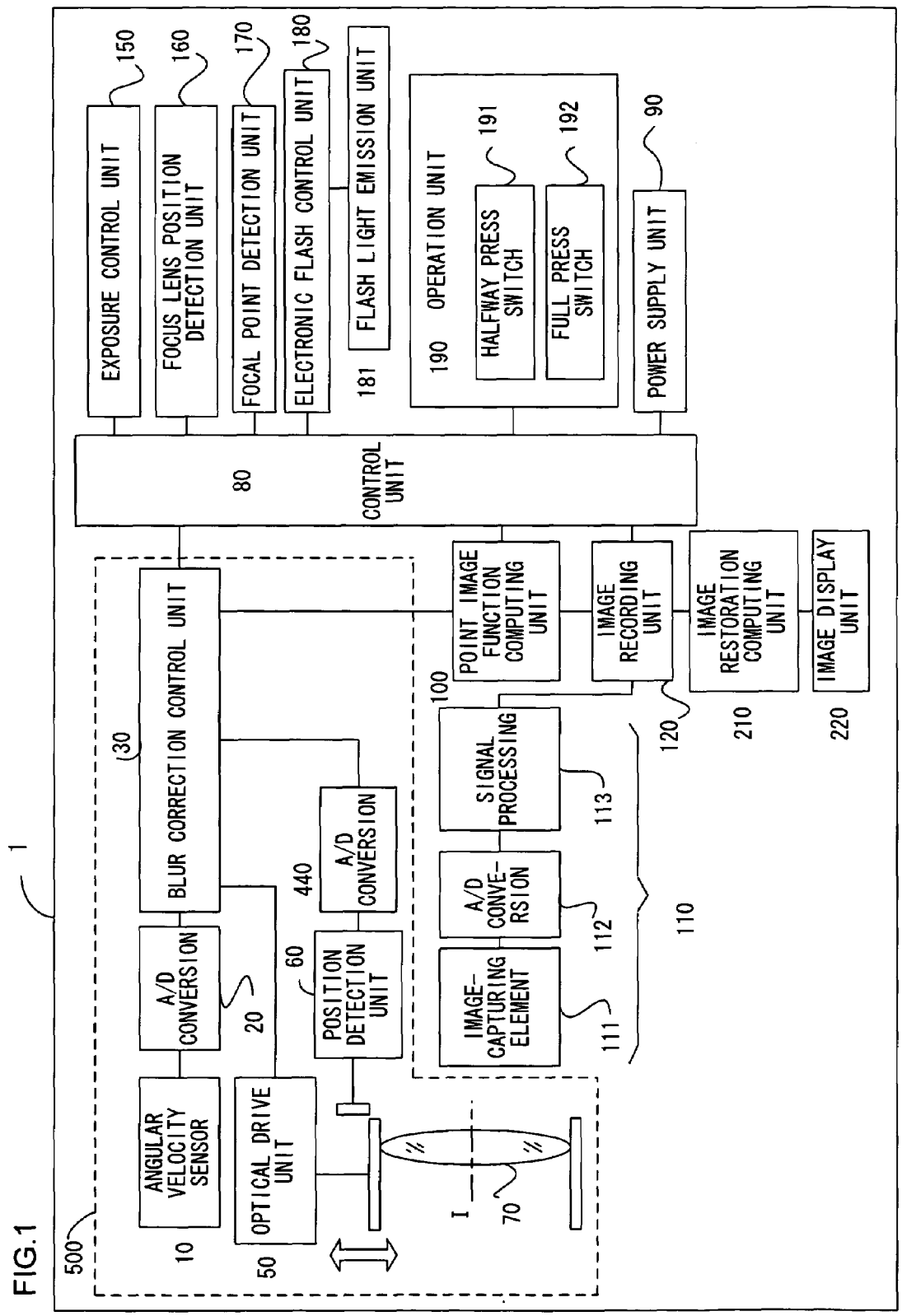
FIG. 1 is a block diagram showing the system configuration adopted in a first embodiment of a blur correction camera according to the present invention.

FIG. 1 is a block diagram showing a system configuration adopted in a first embodiment of a blur correction camera according to the present invention.

Figure 2:
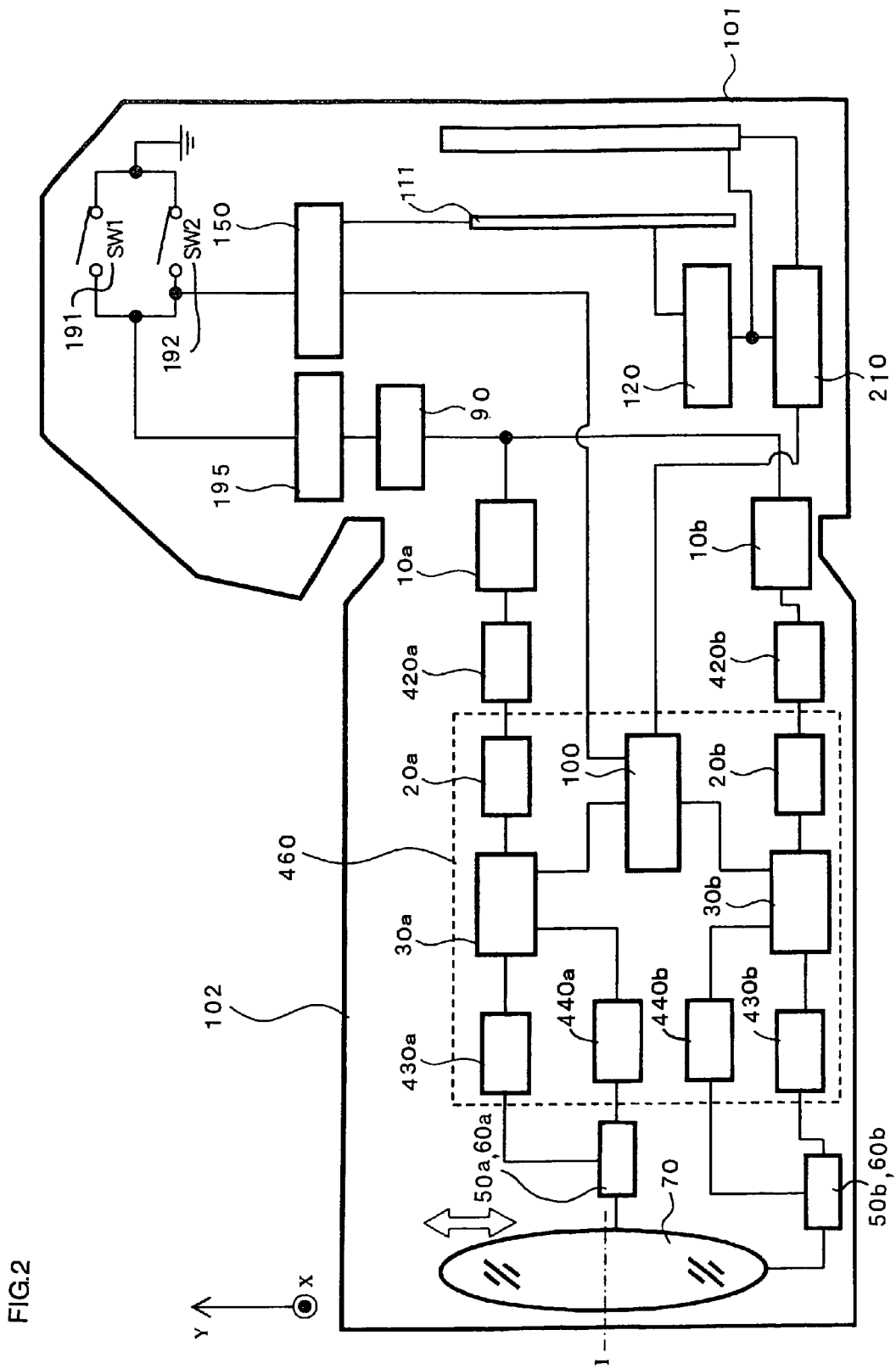
FIG. 2 presents an example of a block configuration that may be adopted in the blur correction camera in the first embodiment.

The blur correction camera 1 achieved in the embodiment constitutes a camera system having an optical blur correction function and is capable of image restoration. FIG. 2 is a diagram of a block configuration that may be adopted in the blur correction camera 1 realized as a single lens reflex camera that allows the use of interchangeable lens barrels. As shown in FIG. 2, the camera system includes a camera body 101 and a lens barrel 102.

The blur correction camera 1 is a digital still camera that electronically captures an image and includes an optical correction system (or a blur correction optical system) 500.

Angular velocity sensors 10 in the optical system 500 constitute a vibration detection unit that detects a vibration to which the blur correction camera 1 is subjected, as an angular velocity value. The angular velocity sensors 10 detect the angular velocity by taking advantage of the Coriolis force and output the results of the detection as voltage signals.

The angular velocity sensors 10 and the processing of the signals output from the angular velocity sensors are now explained in reference to FIG. 2.

The angular velocity sensors 10 are each installed in correspondence to either the X axis perpendicular to an optical axis I of a photographic lens or the Y axis perpendicular to the X axis so as to two-dimensionally detect a vibration of the blur correction camera 1. The angular velocity sensors 10 are enabled to detect angular velocities only while power is supplied thereto from a power supply unit 90. It is to be noted that while a single angular velocity sensor 10 is shown in FIG. 1 for simplification, FIG. 2 shows angular velocity sensors 10a and 10b corresponding to the X axis direction and the Y axis direction respectively.

An amplification unit 420 amplifies the outputs from the angular velocity sensors 10.

An A/D conversion unit 20, which is converters that convert analog signals to digital signals, converts analog vibration signals output from the angular velocity sensors 10 to digital signals and provides the digital signals to blur correction control units 30.

An A/D converter 440 converts position information (analog signals) indicating the position of a blur correction lens 70, provided from a position detection unit 60 to digital signals. Blur correction lens position information resulting from the conversion is transmitted to a blur correction control unit 30.

A D/A converter 430 converts drive signals (digital signals) obtained through computation executed at the blur correction control unit 30 to analog signals. The analog signals resulting from the conversion are transmitted to an optical drive unit 50.

Since one angular velocity sensor 10 normally provides a small output, the resolution of the angular velocity value is too low (the angular velocity value per bit is excessively large) and an accurate vibration detection cannot be executed if the output is directly digitized at the A/D converter 20 and then is processed in a microcomputer 460. This means that the accuracy of the blur correction is compromised. Accordingly, angular velocity signals are amplified at the amplification unit 420 before they are input to the A/D converter 20. Since the resolution of the angular velocity values can be improved (the angular velocity value per bit can be lowered) in the microcomputer 460 in this manner, the accuracy of the blur correction is improved.

The amplification unit 420 includes two amplification units 420a and 420b respectively corresponding to the angular velocity sensors 10a and 10b. Instead of using the amplification units simply for signal amplification, high frequency noise contained in the sensor outputs may be reduced by disposing a low pass filter at each amplification unit as well.

In addition, as shown in FIG. 2, the A/D conversion unit 20, the blur correction control unit 30, the optical drive unit 50, the position detection unit 60, the D/A converter 430 and the A/D converter 440 includes respectively a pair of A/D conversion units 20a and 20b, a pair of blur correction control units 30a and 30b, a pair of optical drive units 50a and 50b, a pair of position detection units 60a and 60b, a pair of D/A converters 430a and 430b and a pair of A/D converters 440a and 440b are installed in correspondence to the X axis direction and the Y axis direction. However, since the operations executed along the X axis and the Y axis by the individual units are identical, a collective explanation is provided below without distinguishing the operation executed along the X axis from that executed along the Y axis or vice versa.

The explanation is now given in reference to FIG. 1.

The blur correction control unit 30 obtains through computation a drive signal to be used to drive the blur correction lens 70 by using a vibration signal detected with the angular velocity sensor 10 and position information indicating the position of the blur correction lens 70 detected by the position detection unit 60 which is to be detailed later and outputs the drive signal to the optical drive unit 50. The blur correction control unit 30 also functions as a control position error output unit that outputs an error (control position error) as detailed later.

Figure 3:
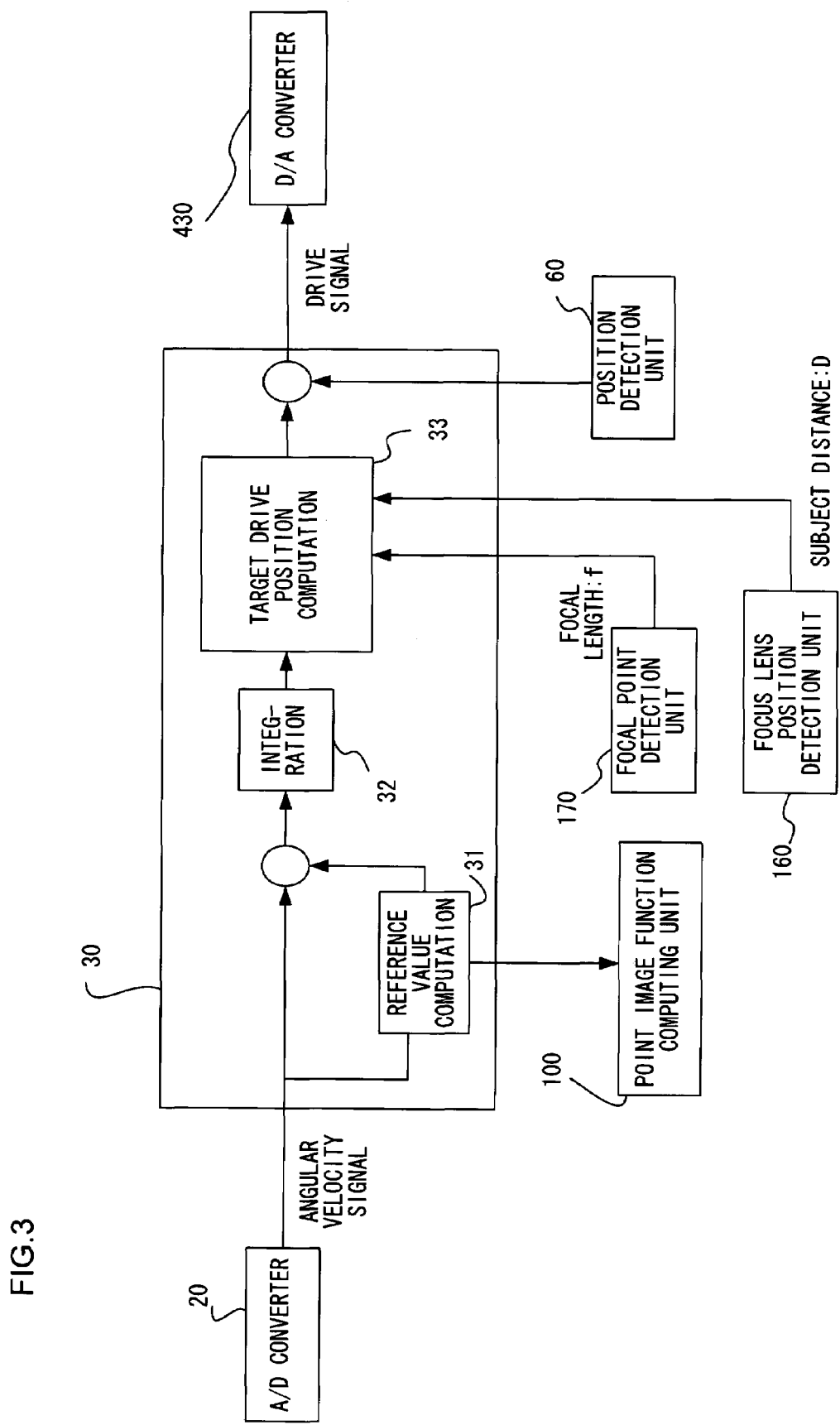
FIG. 3 is a control block diagram illustrating a control operation executed in a blur correction control unit in an optical correction system.
Figure 4:
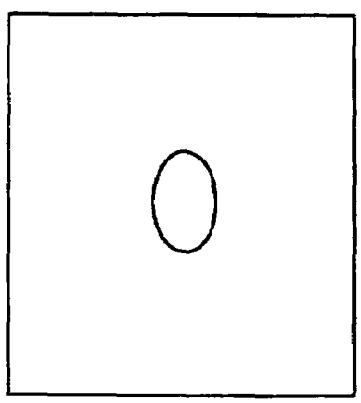
FIGS. 4(a) to 4(c) illustrate the image restoration executed in the embodiment.
Figure 4:
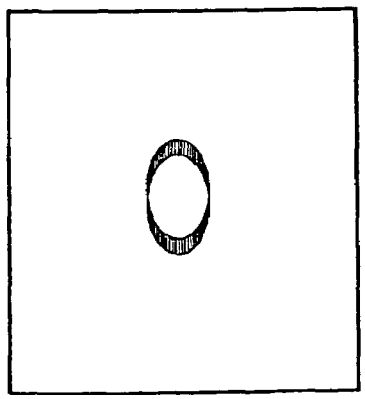
Figure 4:
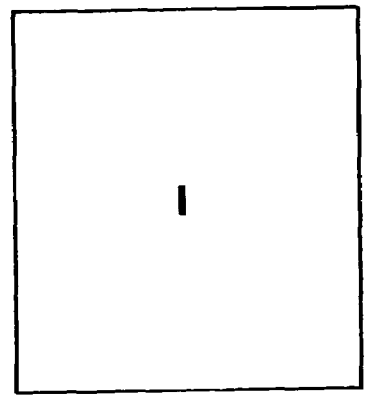
Figure 4:
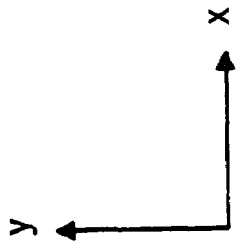

The blur correction control unit 30 includes a reference value computing unit 31 (see FIG. 3). The reference value computing unit 31 computes a reference value for the vibration signal provided by the angular velocity sensor 10, and in this embodiment, it is achieved by using a digital low pass filter (LPF). The output of the LPF is used as the reference value. The control operation executed by the blur correction control unit 30 is to be described in detail later.

The optical drive unit 50 is an actuator that drives the blur correction lens 70 based upon the drive signal output from the blur correction control unit 30.

The position detection unit 60 detects the position of the blur correction lens 70 along the X axis or the Y axis, based upon which the blur correction is executed. The output (position signal) from the position detection unit 60 is transmitted to the blur correction control unit 30 via the A/D converter 440.

The blur correction lens 70 is a blur correction optical system included in the photographic optical system of the camera and constituted with a single lens or a lens group made up of a plurality of lenses that is allowed to move within a plane substantially perpendicular to the optical axis I of the photographic optical system. As the blur correction lens 70 is driven by the optical drive unit 50 along a direction substantially perpendicular to the optical axis I, the optical axis I of the photographic optical system becomes deflected.

A blur in an image such as a photograph occurs as the image in the image forming plane moves during the exposure due to a vibration such as an unsteady hand movement to which the camera is subjected. In the blur correction camera 1 achieved in the embodiment, a vibration to which the blur correction camera 1 is subjected can be detected with the angular velocity sensor 10. Once the vibration to which the blur correction camera 1 has been subjected is detected, the movement of the image on the image forming plane caused by the vibration can be ascertained and then the movement of the image on the image forming plane, i.e., the image blur, can be corrected by driving the blur correction lens 70 so as to cancel out the movement of the image on the image forming plane.

In addition to the optical correction system 500 described above, the blur correction camera 1 includes a control unit 80, the power supply unit 90, a point-image function computing unit 100, an image-capturing unit 110, an image recording unit 120, an exposure control unit 150, a focus lens position detection unit 160, a focal length detection unit 170, an electronic flash control unit 180, an operation unit 190 and the like.

The control unit 80 controls the overall operation of the blur correction camera 1 and executes various types of control computation and the like to control the blur correction control unit 30, the point-image function computing unit 100, the exposure control unit 150, the focus lens position detection unit 160, the focal length detection unit 170, the electronic flash control unit 180 and the like.

The power supply unit 90 continuously supplies power to the components of the camera that require power, such as the angular velocity sensor 10, as long as a halfway press timer 195 in FIG. 2 remains in an ON state. When the halfway press timer is in an OFF state, the power supply stops. Accordingly, the detection of a camera vibration by the angular velocity sensor 10 is enabled only while the halfway press timer 195 in the camera is in an ON state.

The point-image function computing unit 100 is a point spread function computing unit that computes a point-image function (point spread function) effective during the exposure based upon various types of information provided by the blur correction control unit 30, the exposure control unit 150, the focus lens position detection unit 160, the focal length detection unit 170 and the like.

While a point-image function converges on a single point if a perfect optical blur correction is achieved with the blur correction lens 70 alone, the optical blur correction is never complete in reality and for this reason, a point-image function is distributed. In other words, the image is bound to show image blur (blur correction residual error) that has not been corrected through the use of the blur correction lens 70. The point-image function that is computed by the point-image function computing unit is used when correcting through subsequent image processing the blur correction residual error remaining on the image forming plane, which has not been corrected with the blur correction lens 70.

The image-capturing unit 110, which includes an image-capturing element 111, an A/D conversion unit 112, a signal processing unit 113 and the like, captures an image formed by the photographic optical system onto the image forming plane and outputs image data to the image recording unit 120. The image-capturing element 111 receives the subject image formed on the image forming plane by the photographic optical system and converts the subject image to image data constituted of analog signals. The A/D conversion unit 112 converts the analog image to a digital image. The signal processing unit 112 processes the image data having been converted to digital signals by the A/D conversion unit 112.

In addition to images captured by the image-capturing unit 110, point-image functions computed by the point-image function computing unit 100, various types of information (parameters) required to execute various types of image restoration processing and the like are recorded and saved in correspondence to the individual images at the image recording unit 120. The point-image functions, the various types of information and the like may be recorded as headers embedded in the individual image files or they may be directly embedded in the images through digital watermarking technology or the like. Alternatively, a separate file may be created in correspondence to each image file and the information may be written into the separate file.

In more specific terms, the image recording unit 120 may be achieved as a removable recording medium such as a compact disc (trademark) or a smart medium (trademark), or it may be achieved as a buffer memory capable of image transfer.

The exposure control unit 150 controls the length of the exposure period to elapse at the image-capturing element based upon the exposure time length setting selected via a command dial (not shown) or the like. Exposure time length information and timing information indicating the timing with which the exposure starts/ends are transmitted to the point-image function computing unit 100.

The focus lens position detection unit 160 detects the position of a focus lens (not shown). By detecting the position of the focus lens, the distance from the image forming plane to the subject, which is needed when computing the point-image function, can be computed.

The focal point detection unit 170 detects the lens focal length f in the photographic optical system during the photographing operation. The lens focal length f, too, constitutes information needed to compute the point-image function.

The electronic flash control unit 180 controls the light emission at an electronic flash unit 181.

The operation unit 190 includes a halfway press switch (SW1) 191 and a full press switch (SW2) 192.

The halfway press switch 191 enters an ON state by interlocking with a halfway press operation of a shutter release button (not shown). As the halfway press switch 191 enters an ON state, a photometric computation by a photometering unit (not shown), auto focus drive and the like start. In addition, if the halfway press timer 195 has been in an OFF state, it is switched to an ON state in synchronization as the halfway press switch 191 enters an ON state.

The full press switch 192 enters an ON state by interlocking with a full press operation of the shutter release button (not shown). As the full press switch 192 enters an ON state, a sequence of photographing operations, which includes opening/closing of the shutter by a shutter mechanism (not shown) and an image acquisition by an image sensor, is executed.

An image restoration computing unit 210 executes image restoration processing to correct a blur contained in an image based upon image data provided by the image recording unit 120 in the blur correction camera 1, the point-image function information which corresponds to the image data and the various parameters to be used in the image restoration processing. While the Wiener filter expressed in (6) is used in the image restoration processing executed by the image restoration computing unit 210, the image restoration processing may be executed by adopting another method.

At an image display unit 220, an image photographed by a photographer or an image resulting from an image restoration is displayed, and a monitor unit of the camera is equivalent to the image display unit in the embodiment.

Next, the aspect of the embodiment related to the blur correction control unit 30, including the control implemented during the optical blur correcting operation, is explained.

FIG. 3 is a control block diagram illustrating the control operation executed at the blur correction control unit 30 in the optical correction system 500.

First, the angular velocity sensor 10 detects a vibration to which the camera has been subjected. The angular velocity sensor 10 is normally constituted with a piezoelectric vibration angular velocity sensor that detects the Coriolis force. The output of the angular velocity sensor 10 is input to the reference value computing unit (low-frequency component extraction) 31 via the A/D converter 20.

The reference value computing unit 31 computes a vibration reference value based upon the output from the angular velocity sensor 10. The reference value for a normal unsteady hand movement may be set to the value output while the angular velocity sensor 10 is in a completely stationary state (hereafter referred to as a zero output). However, this zero output value fluctuates as environment conditions such as the drift and the temperature change and, for this reason, the reference value cannot be set to a fixed value. Accordingly, the reference value needs to be computed based upon the actual operating state, i.e., based upon the signal indicating the unsteady hand movement of the photographer, to determine the zero output. A digital low pass filter (LPF) is used in the reference value computation.

While it is desirable to set the cutoff frequency fc for the digital low pass filter as low as possible, the adverse effect of the sensor drift tends to manifest more readily if the cutoff frequency fc is set too low as has been explained in reference to the related art. However, the frequency component equal to or lower than fc, which is not corrected in the optical correction, manifests as a significant residual image blur if the cutoff frequency is set too high. Through the image restoration processing executed by using a point-image function obtained based upon the reference value output which is not optically corrected, the image blur remaining after the optical correction can be subsequently eliminated, as detailed later.

Following the reference value computation, a vibration detection signal obtained by subtracting the reference value from the vibration detection signal provided by the angular velocity sensor 10 is transmitted to an integrating unit 32.

The integrating unit 32 executes time integration of the vibration detection signal expressed in units of angular velocity and thus converts the vibration detection signal to a camera vibration angle. It may execute the time integration as expressed below in (7).

$$\theta(t)=\theta(t-1)+C\cdot(\omega(t)-\omega_0(t)) \quad (7)$$

In expression (7), $\theta(t)$: target drive position, $\omega(t)$: vibration detection signal, $\omega_0(t)$: reference value and t: time (integer), with C representing a constant determined in correspondence to conditions such as the lens focal length.

The target drive position signal computed by the integrating unit 32 is transmitted to a target drive position computing unit 33.

At the target drive position computing unit 33, target drive position information to be used when driving the blur correction lens 70 is obtained through computation executed by taking into consideration the information indicating the lens focal length f provided by the focal point detection unit 170 and the information indicating the subject distance D provided by the focus lens position detection unit 160 as well as the vibration angle information having been transmitted from the integrating unit 32.

Through PID control of the known art or the like, the blur correction control unit 30 ascertains the difference between a target drive position information and the position information provided by the position detection unit 60, which detects the position of the blur correction lens 70 so as to drive the blur correction lens 70, in correspondence to the target drive position information and outputs a drive signal to be used to drive the optical system drive unit 50. The drive signal is provided to the optical system drive unit 50 via the D/A converter 430. As an electrical current is supplied to a coil at the optical system drive unit 50 in response to the drive signal having been thus output, the blur correction lens 70 can be driven along the direction perpendicular to the optical axis.

The position detection unit 60 monitors the position of the blur correction lens 70 and based upon the lens position signal indicating the detected lens position, the blur correction control unit 30 executes feedback control on the blur correction lens 70.

Next, the operation of the point-image function computing unit 100 is explained.

Figure 8:
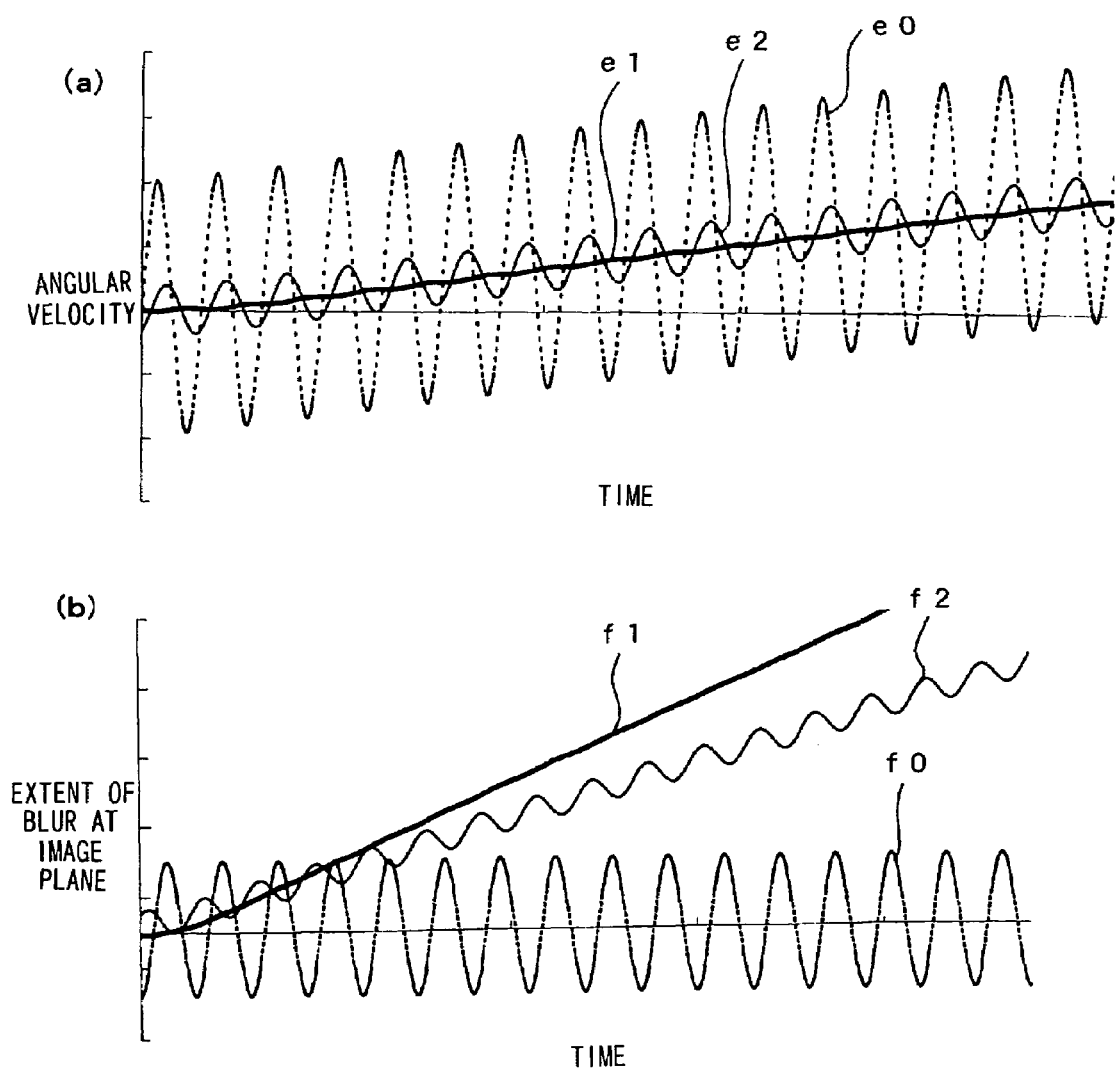
FIGS. 8(a) and 8(b) show an angular velocity sensor output containing a drift component, reference value outputs and an extent of blurring manifesting in an image surface.

The problem of blur correction by the optical correction system 500 failing to completely correct the blur and some degree of residual blurring remaining in the image (the occurrence of blur correction residual error) has been discussed in the explanation of the related art (see FIGS. 8(*a*) and 8(*b*)). Such a blur correction residual error is primarily attributable to the specific value assumed for the reference value. Accordingly, the point-image function computing unit 100 in the embodiment calculates a point-image function related to the blur correction residual error based upon the reference value.

The method adopted when computing the point-image function is briefly explained.

The point-image function is computed as expressed below. Namely, a reference value computation average value $\omega_0$ave is subtracted from the reference value $\omega_0$ having been obtained, and then an error angle $\theta(t)$ is determined by integrating the difference. Then, a point spread function X(t) of the image surface is determined based upon the focal length information f.

$$\omega_0 \text{ ave}=\Sigma\omega_0(t)/N \quad (8)$$

$$\theta'(t)=\theta'(t-1)+C\cdot(\omega_o(t)-\omega_o \text{ ave}) \quad (9)$$

$$X(t)=f\cdot\theta(t) \quad (10)$$

It is to be noted that if a teleconverter is mounted, it is necessary to adjust the focal length in correspondence to the magnification factor of the teleconverter. In addition, by correcting the point spread function by using the subject distance information, the accuracy of the point spread function is improved. In such a case, the following expression (11) may be used.

$$X(t)=\beta \cdot Rf \cdot \theta(t) \tag{11}$$

β: lateral magnification factor
R: subject distance

The point spread function is obtained by executing the arithmetic operations described above along the X direction and the Y direction and then by expanding the arithmetic operation results over the X-Y plane.

It is to be noted that the method described above simply represents an example of a point-image function computation, and the point-image function may be computed through another method.

The point-image function thus computed is then transmitted to the image restoration computing unit 210. Based upon the point-image function transmitted thereto, the image restoration computing unit 210 executes image restoration computation to correct the residual image blur that has not been eliminated through the blur correcting operation of the blur correction lens 70 and thus obtains a high quality image from which the blur has been effectively eliminated.

In the image restoration processing in the related art, the vibration detection data indicating a vibration detected with an angular velocity sensor or the like are directly used to compute the point-image function which is then used in the image restoration processing. However, this method is problematic in that when a significant extent of blur manifests in the image, the image quality cannot be improved through the image restoration processing. In contrast, the embodiment in which the blur is first corrected to some extent by engaging the optical blur correction mechanism in operation and then image restoration processing is executed by using the vibration information greatly improves the image quality.

FIGS. 4(a) to 4(c) and FIGS. 5(a) to 5(d) illustrate the image restoration achieved in the embodiment.

Figure 5:
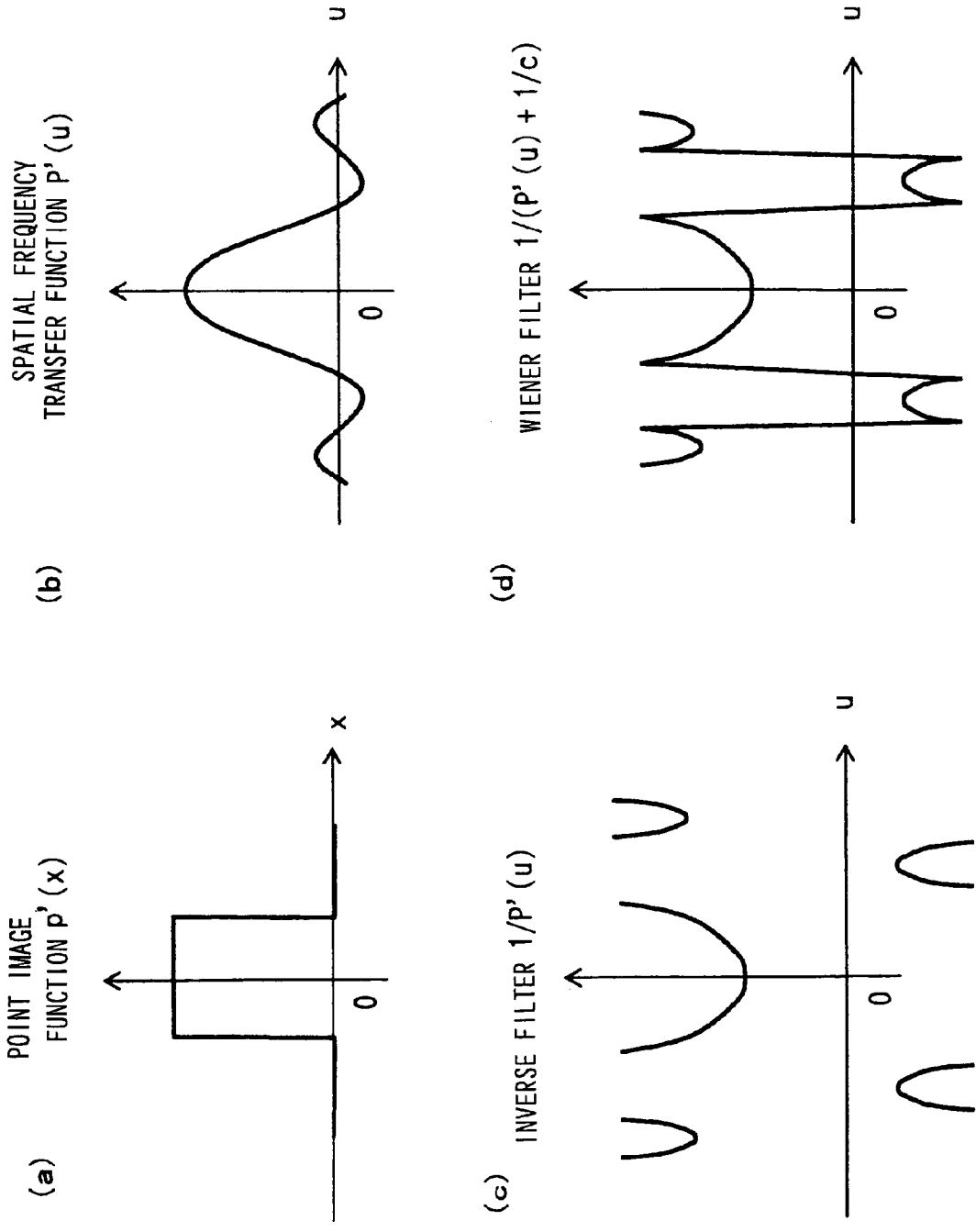
FIGS. 5(a) to 5(d) illustrate the image restoration executed in the embodiment.
Figure 6:
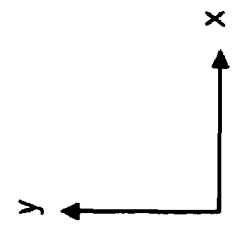
FIGS. 6(a) to 6(c) area first set of figures illustrating image restoration executed in the related art.
Figure 6:
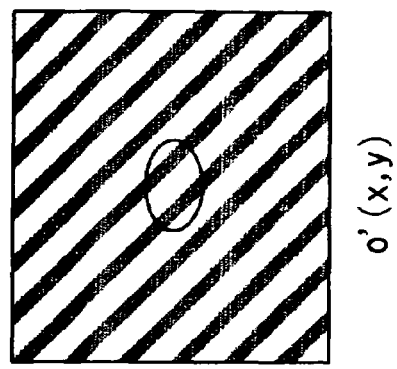
Figure 6:
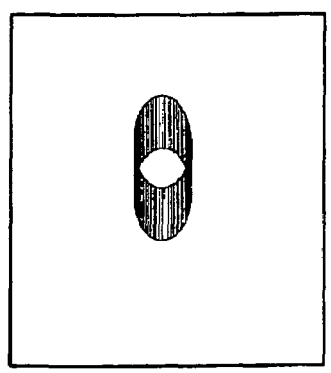
Figure 6:
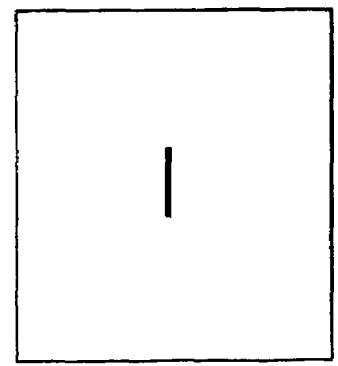
Figure 7:
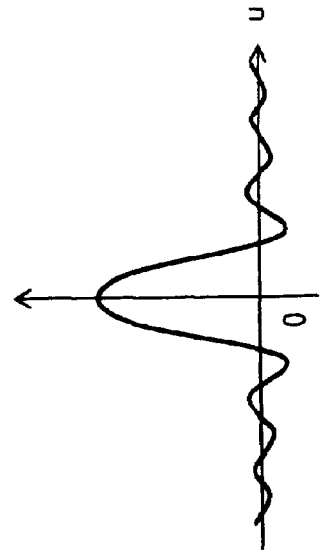
FIGS. 7(a) to 7(d) are a second set of figures illustrating image restoration executed in the related art.
Figure 7:
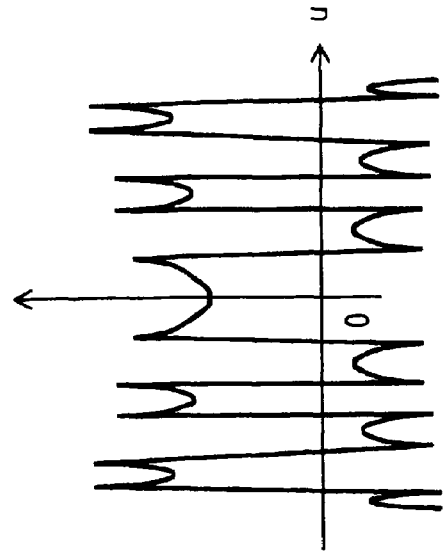
Figure 7:
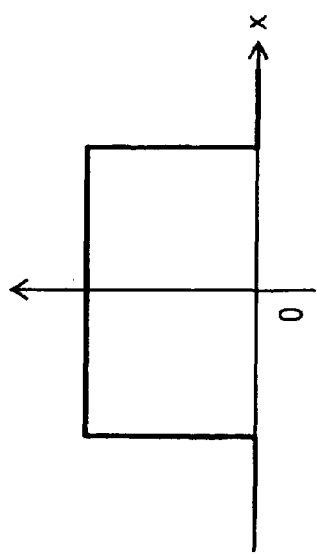
Figure 7:
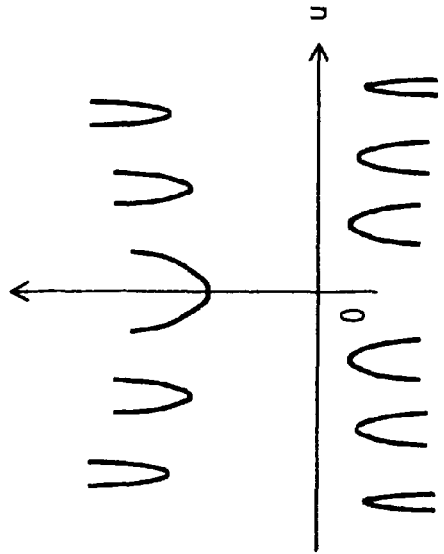

In the embodiment, the image restoration is executed by using the image data and the blur information obtained after the blur correction by the optical blur correction mechanism and thus, the extent of blur to be corrected through the image restoration is not excessive. This advantage becomes obvious as the image restoration in the embodiment is compared with the image restoration shown in FIGS. 7(a) to 7(d). As the extent of the blur becomes greater, the frequency component which is not transferred increases, making it more difficult to restore the image. The number of points at which the spatial frequency transfer function assumes the value 0 in FIG. 5(b) is smaller than the number of points at which the function assumes the value 0 in FIG. 7(b). This indicates that the frequency component which is not transferred is reduced and thus the image restoration can be executed with a higher level of effectiveness.

As described above in detail, the following advantages can be achieved in the first embodiment.

There are provided the blur correction optical system, which corrects an image blur, and the image restoration computing unit, which corrects an image blur through image restoration by executing image processing on an image captured by the image-capturing unit. They complement each other with the problems of the optical blur correction executed with the blur correction optical system addressed by the image restoration computing unit and the problems of the blur correction executed with image restoration addressed by the blur correction optical system. As a result, a highly effective blur correction can be achieved.

The point spread function computing unit that computes a point spread function is provided and the image restoration computing unit executes the image restoration by processing the image using the point spread function. Thus, by computing the point spread function and saving the point spread function during the photographing operation, the image restoration can be executed at any desired time point after the photographing operation.

Since the point spread function computing unit computes the point spread function based upon the results of the computation executed at the reference value computing unit, the residual blur which the blur correction by the blur correction optical system has failed to eliminate can be expressed as the point spread function and, as a result, the blur that has not been eliminated through the blur correction by the blur correction optical system can be corrected through the image restoration.

SECOND EMBODIMENT

In this embodiment, the system configuration of the first embodiment is modified by adding a blur correcting operation selector switch 194 and a signal flow control unit 452.

Figure 9:
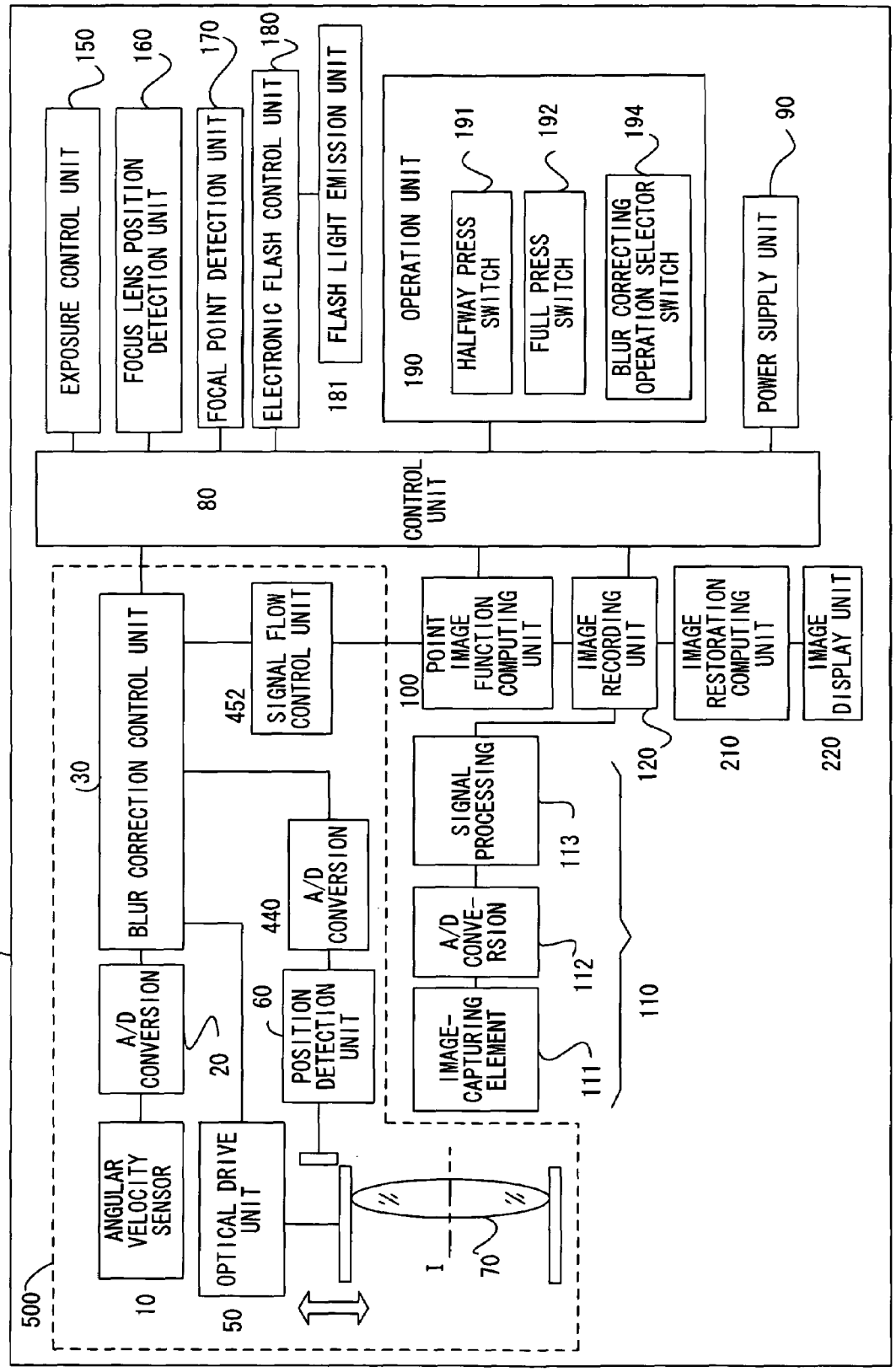
FIG. 9 is a block diagram showing a system configuration adopted in a second embodiment of the blur correction camera according to the present invention.
Figure 10:
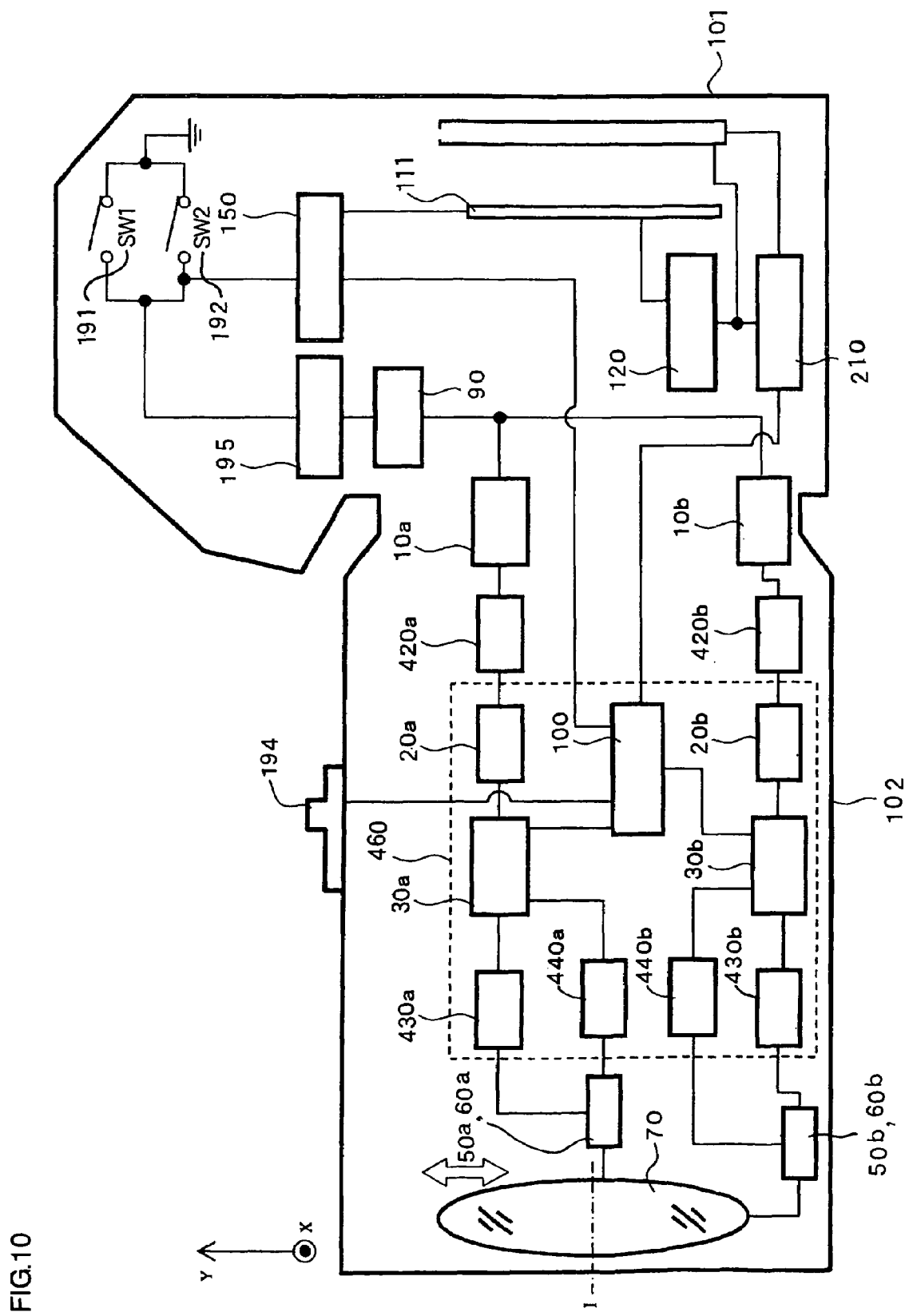
FIG. 10 presents an example of a block configuration that maybe adopted in the blur correction camera in the second embodiment.

FIG. 9 is a block diagram showing the system configuration adopted in the embodiment, and FIG. 10 is a diagram showing the block configuration adopted in the system. The same reference numerals are assigned to components having functions similar to those in the first embodiment to minimize the need for a reputed explanation thereof.

Figure 11:
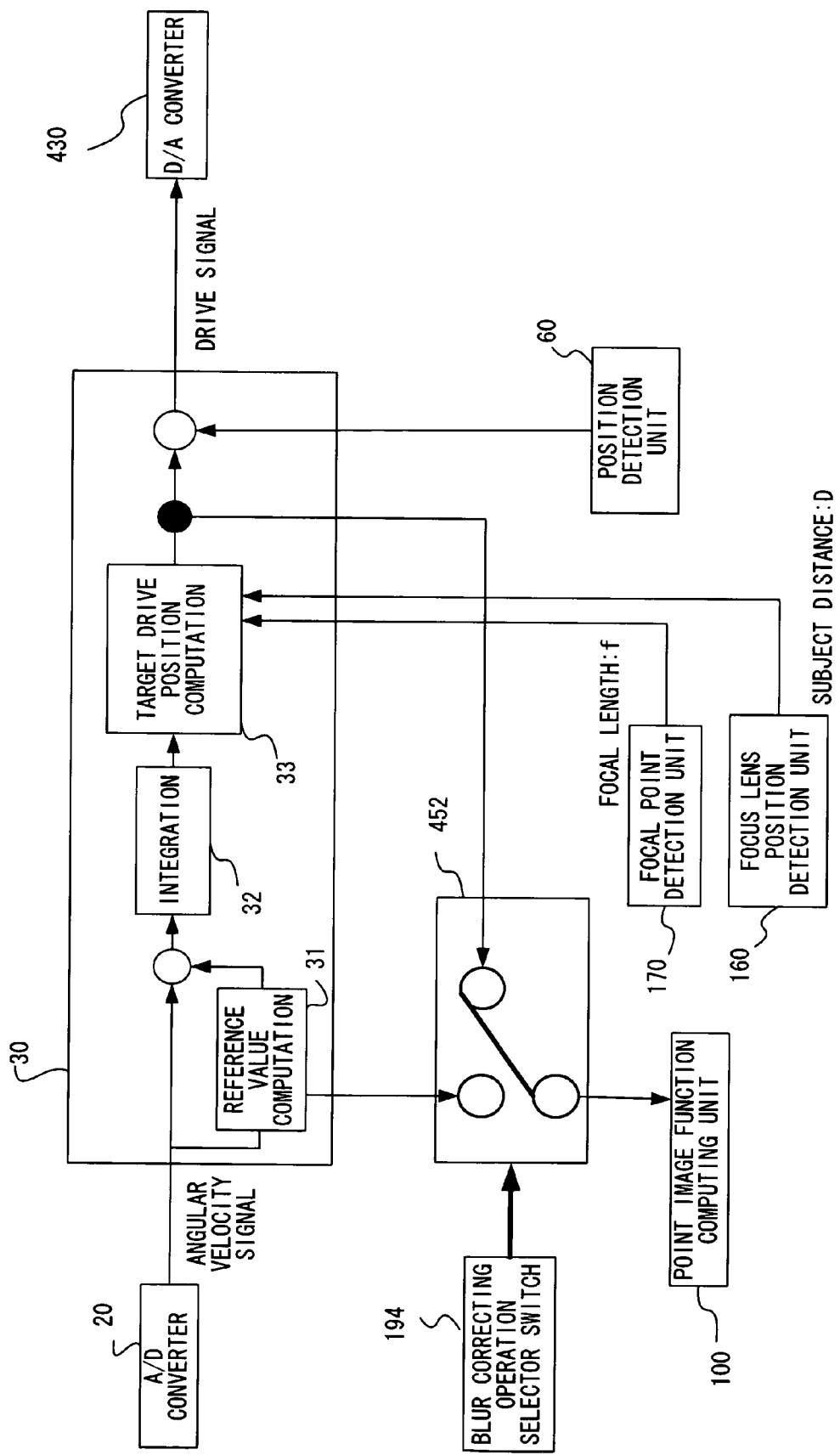
FIG. 11 is a control block diagram illustrating a control operation executed in a blur correction control unit in the second embodiment.

FIG. 11 is a block diagram illustrating the operation executed at the blur correction control unit. FIG. 11 shows the signal flow control unit 452 installed to switch on/off a blur correcting operation when the output from the reference value computing unit 31 is provided to the point-image function computing unit 100.

The blur correcting operation selector switch (VRSW) 194 is operated to switch on/off an optical blur correcting operation. In addition, the signal flow control unit 452 switches the data to be transmitted to the point-image function computing unit 100 in correspondence to the state of the VRSW 194. It is to be noted that in a camera that allows the use of interchangeable lens barrels, the correcting operation selector switch 194 is disposed at the outer circumferential area of the lens barrel 102 of the interchangeable lens, as shown in FIG. 10. The operation is executed as described below based upon the state of the selector switch 194 in the embodiment.

When the VRSW 194 is in an ON state, the lens correction lens 70 is driven and an optical correcting operation and an operation that is required to implement image restoration are executed. Image restoration data needed for the image restoration processing are transmitted from the reference value computing unit 31 to the point-image function computing unit 100. If, on the other hand, the VRSW 194 is in an OFF state, the blur correction lens 70 is not driven and no optical blur correcting operation is executed. The target drive position signal output from the target drive position computing unit 33 is transmitted to the point-image function computing unit 100 as the image restoration data. It is to be noted that information indicating the current setting of the VRSW 194 is transmitted to the point-image function computing unit 100 regardless of whether it is in an ON state or an OFF state.

Next, the basic operation of the blur correction camera 1 executed in the embodiment is explained.

Figure 12:
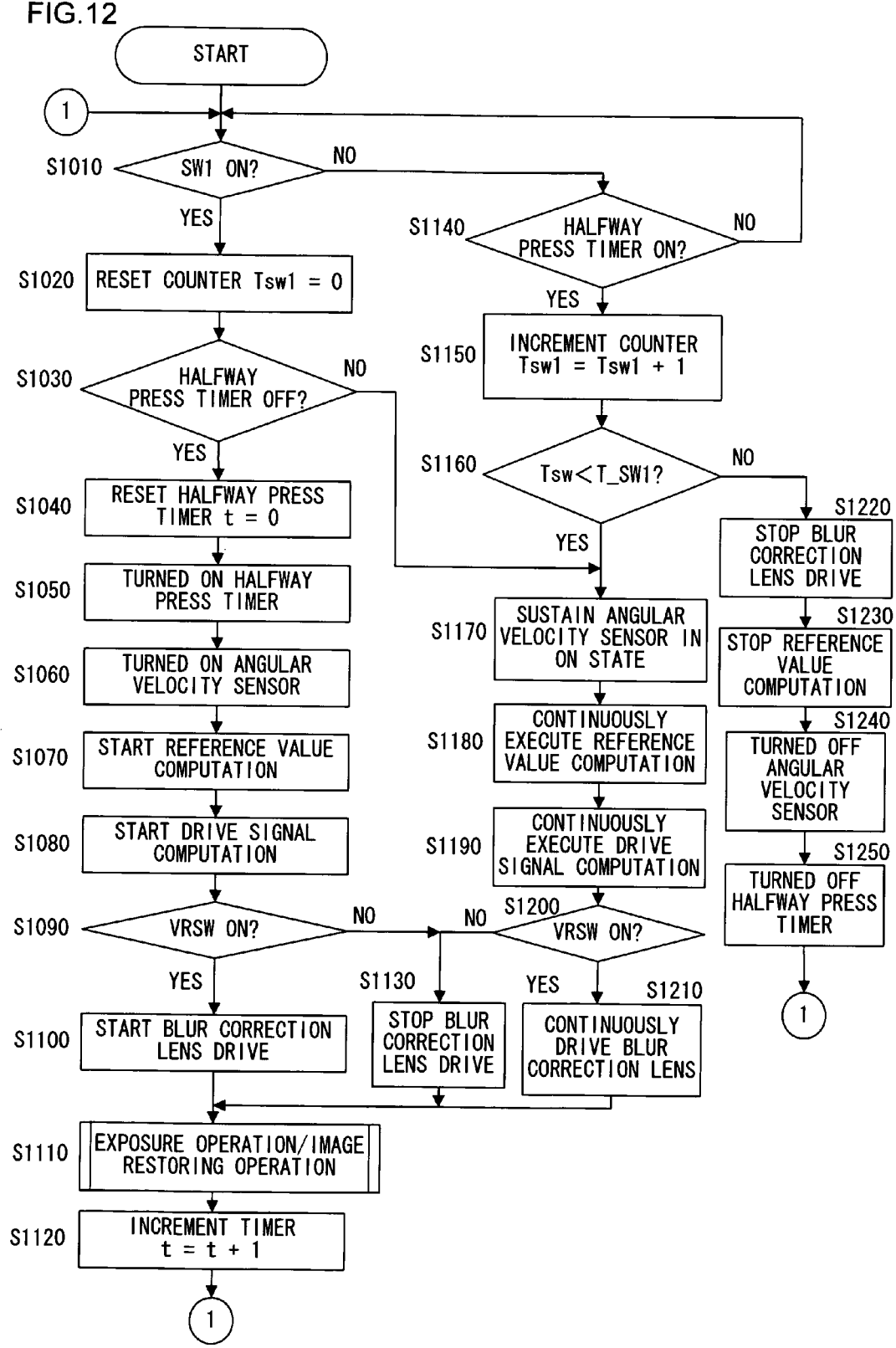
FIG. 12 presents a flowchart of a camera operations executed in the second embodiment.

FIG. 12 presents a flowchart of the basic operation of the camera executed in the embodiment.

The following is an explanation of the camera operation executed in the embodiment, given in reference to the flowchart presented in FIG. 12.

It is to be noted that since the details of the operations executed along the X direction and the Y direction are identical, the explanation is given without referring to a specific direction.

In step S1010, a decision is made as to whether or not the halfway press switch SW1 is in an ON state. The operation proceeds to step S1020 if the halfway press switch SW1 is currently in an ON state, whereas the operation proceeds to step S1140 if the halfway press switch SW1 is in an OFF state.

In step S1020, a counter Tsw1 is reset to clear the count to 0. The value of the count at the counter Tsw1, which measures the length of time elapsing after the halfway press switch SW1 enters an OFF state is an integer. The counter holds the value 0 while the halfway press switch SW1 is in an ON state, and it engages in operation only while the halfway press switch SW1 is in an OFF state and the halfway press timer 195 is in an ON state.

In step S1030, a decision is made as to whether or not the halfway press timer 195 is in an OFF state. The operation proceeds to step S1040 if the halfway press timer 195 is determined to be in an OFF state, whereas the operation proceeds to step S1170 if the halfway press timer 195 is determined to be in an ON state.

In step S1040, a counter "t" is reset to clear the count to 0. The counter "t" measures the length of time over which the halfway press timer 195 remains in an ON state. This counter is an integral value counter which starts a count operation immediately as the halfway press timer 195 enters an ON state and continuously executes the count operation as long as the halfway press timer 195 remains in an ON state.

In step S1050, the halfway press timer 195 is turned on. In step S1060, the angular velocity sensor 10 is turned on and a vibration detection starts. In addition, a conversion operation at the A/D converter 20, too, starts in this step. In step S1070, the computation of the reference value, which is executed based upon the output from the angular velocity sensor 10, starts. In step S1080, the computation of a drive signal to be used to drive the blur correction lens 70 starts. In step S1090, a decision is made as to whether or not the VRSW 194 is currently in an ON state. If the VRSW 194 is determined to be on, the operation proceeds to step S1100 to drive the blur correction lens 70. If, on the other hand, the VRSW 194 is currently set in an OFF state, the operation proceeds to step S1130.

In step S1100, drive of the blur correction lens 70 starts. In step S1110, an exposure operation and an image restoring operation are executed. These operations are to be explained in detail later in reference to FIG. 13. In step S1120, the count at the counter "t" for the halfway press timer 195 is incremented by one. In step S1130, the drive of the blur correction lens 70 is stopped. It is to be noted that if the drive of the blur correction lens 70 has already stopped prior to this step, the stopped state is sustained.

In step S1140, a decision is made as to whether or not the halfway press timer 195 is in an ON state. The operation proceeds to step S1150 if the halfway press timer 195 is determined to be in an ON state, whereas the operation returns to step S1010 if the halfway press timer 195 is determined to be in an OFF state to continuously check the halfway press switch SW1. At the time point at which the operation proceeds to step S1150, the halfway press switch SW1 and the halfway press timer 195 at the camera are respectively in an OFF state and an ON state. In order to measure the length of time elapsing while sustaining this condition, the count at the counter Tsw1 is incremented by one.

In step S1160, a decision is made as to whether or not the count value at the counter Tsw1 is smaller than a threshold value T_SW1. The threshold value T_SW1 is a constant used to determine the upper limit for the counter Tsw1 and determines the length of time to elapse after the halfway press switch SW1 enters an OFF state until the halfway press timer 195 shifts into an OFF state.

If the count at the counter Tsw1 is smaller than the threshold value T_SW1, i.e., if an affirmative decision is made, the operation proceeds to step S1170 without turning off the halfway press timer 195. If, on the other hand, the count at the counter Tsw1 is judged to be equal to the threshold value T_SW1, i.e., if a negative decision is made in step S1160, the operation proceeds to step S1220 to execute processing for turning off the halfway press timer 195 and processing that needs to be executed after the halfway press timer 195 is turned off.

In step S1170, the vibration detection is continuously executed by sustaining the angular velocity sensor 10 in an ON state. In addition, the conversion operation at the A/D converter 20, too, is continuously executed. In step S1180, the computation of the reference value is continuously executed. In step S1190, the computation of the drive signal to be used to drive the blur correction lens 70 is continuously executed based upon the output from the angular velocity sensor 10 and the reference value having been computed in step S1180.

In step S1200, a decision is made as to whether or not the VRSW 194 is currently in an ON state. If the VRSW 194 is judged to be set in an ON state, the operation proceeds to step S1210 to continuously drive the blur correction lens 70. If, on the other hand, the VRSW 194 is set in an OFF state, the operation proceeds to step S1130.

In step S1210, the blur correction lens 70 is continuously driven. In step S1220, the drive of the blur correction lens 70 is stopped. In step S1230, the computation of the reference value is stopped. In step S1240, the power supply to the angular velocity sensor 10 stops, thereby turning off the angular velocity sensor 10. In step S1250, the halfway press timer 195 is turned off and then the operation returns to step S1010 to detect the state of the halfway press switch (SW1) 191.

Next, the exposure operation and the image restoring operation executed in the camera achieved in the embodiment are explained.

Figure 13:
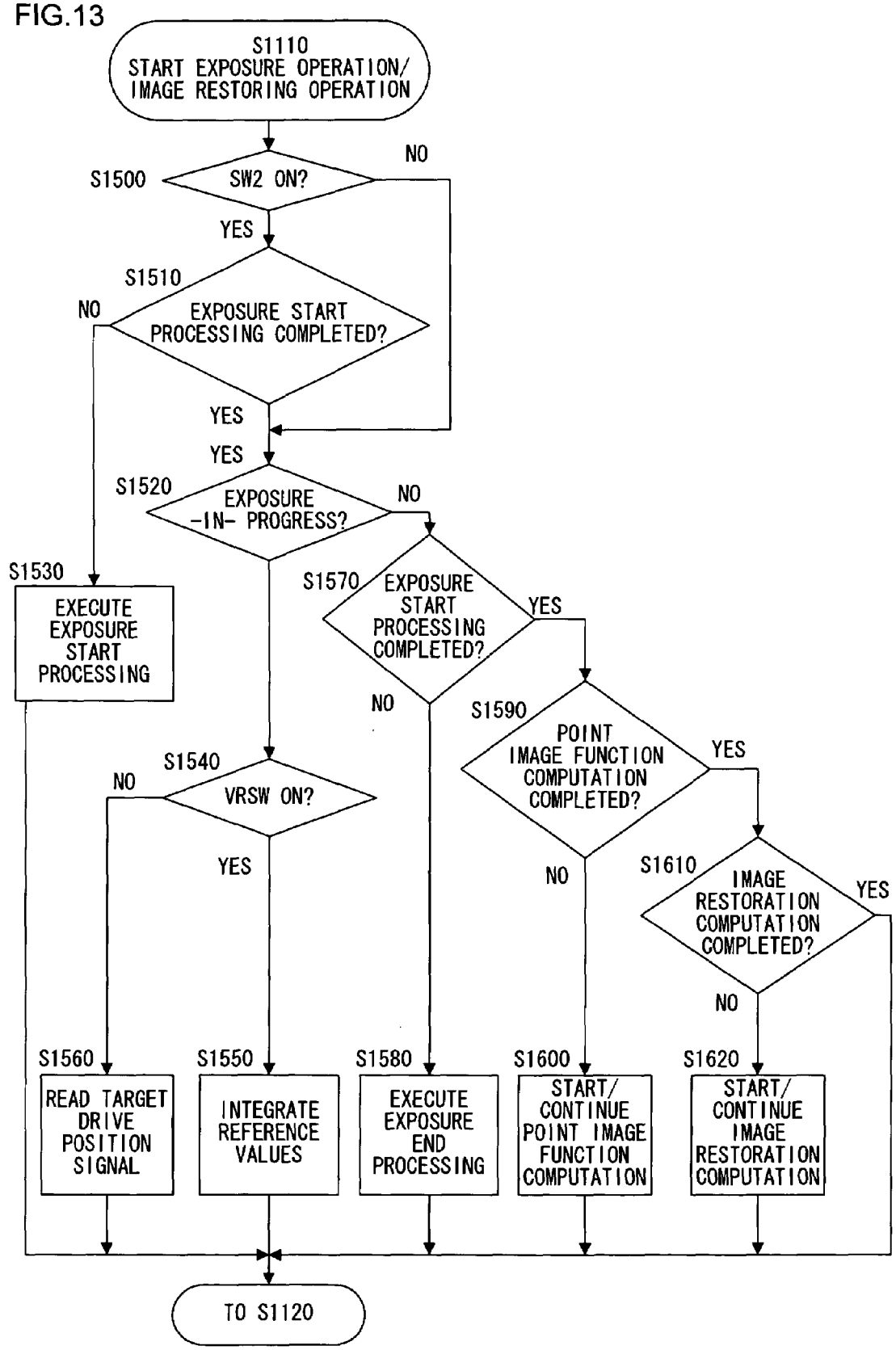
FIG. 13 presents a flowchart of exposure and image restoring operations executed in the second embodiment.

FIG. 13 presents a detailed flowchart of the exposure operation and the image restoring operation executed in step S1110 in FIG. 12.

In step S1500, a decision is made as to whether or not the full press switch (SW2) 192 is an ON state. The operation proceeds to step S1510 if the full press switch SW2 is determined to be in an ON state, whereas the operation proceeds to step S1520 if the full press switch SW2 is determined to be in an OFF state.

In step S1510, a decision is made as to whether or not exposure start processing has been completed. If the exposure start processing is judged to have been completed, the operation proceeds to step S1520, whereas if the exposure start processing is judged to be incomplete, the operation proceeds to step S1530. The full press switch SW2 is operated to trigger the exposure processing. If the exposure has not been started yet when the switch enters an ON state, the exposure operation starts at this point and if the exposure has already started, the exposure control is implemented.

In step S1520, a decision is made as to whether or not exposure is in progress. The operation proceeds to step S1540 if it is decided that exposure is in progress, whereas the operation proceeds to step S1570 if it is decided that exposure is not in progress. In step S1530, the exposure start processing such as raising a mirror (not shown) and opening the shutter is executed. In step S1540, a decision is made as to whether or not the VRSW 194 is in an ON state. The operation proceeds to step S1550 if the VRSW 194 is determined to be in an ON state, whereas the operation proceeds to step S1560 if the VRSW 194 is determined to be in an OFF state.

In step S1550, the reference value is integrated. This operation is equivalent to computing the image blur that has not been corrected through the optical blur correcting operation. The integrated value is stored into memory or the like to be used when computing the point-image function after the exposure.

In step S1560, the target drive position signal is read and stored into memory or the like. After the exposure ends, the point-image function is computed by using the target drive position signal thus stored. In step S1570, a decision is made as to whether or not processing for ending the exposure has been completed. The operation proceeds to step S1590 if the processing is determined to have been completed, whereas the operation proceeds to step S1580 if the processing is determined to be incomplete. In step S1580, the exposure end processing such as lowering the mirror and closing the shutter is executed.

In step S1590, a decision is made as to whether or not the computation of the point-image function has been completed. The operation proceeds to step S1610 if the point-image function computation is determined to have been completed, whereas the operation proceeds to step S1600 if the point-image function computation has not been completed.

In step S1600, the computation of the point-image function is started or is continuously executed. If the point-image function computation has not been started when the operation proceeds to this step, the computation is started, whereas if the computation has already been started, the computation is continuously executed.

In step S1610, a decision is made as to whether or not the image restoration computation has been completed. If the image restoration computation has been completed, the operation proceeds to step S1120, whereas if the image restoration computation has not been completed, the operation proceeds to step S1620. In step S1620, the image restoration computation is started or is continuously executed. If the image restoration computation has not been started when the operation proceeds to this step, the computation is started, whereas if the image restoration computation has already been started, the computation is continuously executed.

In addition, if the optical blur correcting operation is not executed, the extent of blurring can be reduced by computing the point-image function based upon the output from the angular velocity sensor 10 and executing image restoration processing after the photographing operation. Thus, even when the blur correction lens 70 cannot be engaged in operation due to insufficient battery power, failure to turn on the switch or the like, the blur can be reduced through the image restoration processing.

As explained in detail above, the present invention achieves the advantages summarized below.

There are provided the blur correction optical system that corrects an image blur, the point spread function computing unit that computes a point spread function by using a reference value or a vibration detection signal and the image restoration computing unit that corrects an image blur through image restoration by executing image processing on an image captured by the image-capturing unit using the point spread function, and it is possible to restore the image regardless of whether or not an optical blur correction is executed with the blur correction optical system.

Since the point spread function computation switching unit is provided that selects either the reference value or the vibration detection signal to be used in the computation of the point spread function executed at the point spread function computing unit, the optimal point spread function computing method satisfying specific needs can be selected and the image can be restored effectively whenever necessary.

Since the point spread function computation switching unit also functions as a blur correcting operation setting unit that switches on/off the blur correcting operation by the blur correction optical system, the point spread function computing method can be adjusted by interlocking with the blur correcting operation by the blur correction optical system and the point spread function can be computed in the optimal manner based upon whether or not the blur correcting operation is executed by the blur correction optical system.

When the blur correcting operation by the blur correction optical system is not executed, the point spread function computing unit computes the point spread function by using the vibration detection signal. The point spread function thus computed directly relates to the vibration of the camera and the image blur caused by the vibration of the camera can be corrected through image restoration.

Since the blur correction optical system which corrects an image blur and the point spread function computing unit, which computes the point spread function by using the reference value or the vibration detection signal are provided, the point spread function needed in the image restoration can be computed through the optimal computing method regardless of whether or not the optical blur correction is executed with the blur correction optical system, and the photographed image can be subsequently restored with a high level of effectiveness by utilizing an external device or the like.

THIRD EMBODIMENT

A third embodiment includes an image restoring device and a camera body provided independently of each other. The same reference numerals are assigned to components having similar functions to those in the first embodiment to minimize the need for a repeated explanation thereof.

Figure 14:
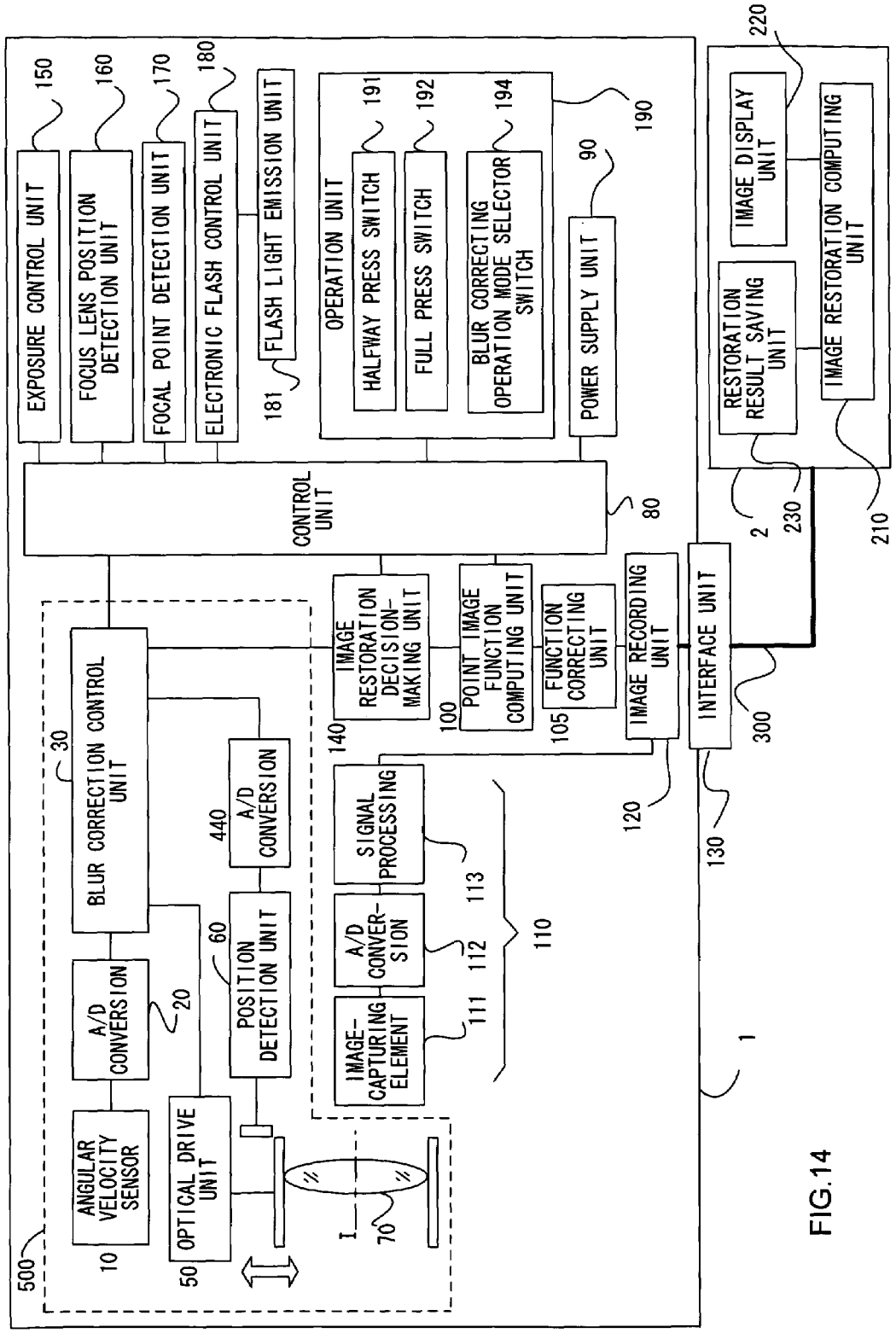
FIG. 14 is a block diagram showing a system configuration adopted in a third embodiment of the blur correction camera according to the present invention.

The following is a detailed explanation of the embodiment of the present invention, given in reference to drawings and the like. FIG. 14 is a block diagram of the system configuration adopted in the third embodiment of the blur correction camera according to the present invention.

The blur correction camera body 1 in the embodiment adopts a structure achieved by adding a function correcting unit 105, an interface unit 130 and an image restoration decision-making unit 140 in the structure in the first embodiment, with an image restoration computing unit 210 constituting part of an image reproduction device 2, which is a separate device independent of the camera body 1.

The image reproduction device 2 is an image restoring device connected with the image recording unit 120 or the blur correction camera 1 via a transfer cable or the like, which is capable of reproducing and restoring an image having been captured in the blur correction camera 1.

The function correcting unit 105 corrects the point-image function by using a position signal indicating the position of the blur correction lens 70, which is provided by the position detection unit 60. More specifically, it corrects the point-image function by using the position signal, based upon a control position error representing the difference between a target drive position and the position signal (the actual drive position).

With the interface unit 130 and the image reproduction device 2 connected with each other via a transfer cable 300, an image saved at the image recording unit 120 and information needed for the image restoration processing are transferred to the image reproduction device 2 as necessary.

The interface unit 130 is a communication means having a terminal to which the transfer cable 300 used to connect the blur correction camera 1 and the image reproduction device 2 is connected.

The connecting cable 300 is used to connect a connecting connector at the interface unit 130 to a communication port (e.g., an RS-232C, a USB, a parallel port or an IEEEE 1394) at the image reproduction device 2. The blur correction camera 1 and the image reproduction device 2 exchange data via this connecting cable 300.

The image restoration decision-making unit 140 executes decision-making processing to decide whether or not to execute a point-image function computation. Namely, it makes a decision based upon information indicating the shutter speed, the extent of vibration and the like as to whether or not to execute the point-image function computation by using the output data provided by the reference value computing unit of the blur correction control unit 30.

Since the image restoration decision-making unit 140 determines whether or not the point-image function computation needs to be executed, only the essential data need to be saved at the image recording unit 122. Thus, redundant arithmetic operations are eliminated and the required memory capacity is reduced.

An operation unit 190 includes a halfway press switch (SW) 191, a full press switch (SW) 192 and a blur correction mode selector switch (SW) 194.

The blur correction mode selector switch 194 is an operating member operated to select an optical correcting operation mode and an image restoration mode in a specific combination. The blur correction mode selector switch in the embodiment allows one of three blur correcting operation mode combinations to be selected through the operation described below.

If a "blur correction off mode" is selected, neither the optical correction or the image restoration is executed. Namely, the drive of the blur correction lens 70 is stopped and no blur correcting operation is executed. In addition, no image restoration data are recorded or saved.

If an "optical correcting operation mode" is selected, only the optical correcting operation is executed by driving the blur correction lens 70 and engaging it in an image blur correcting operation. No point-image function for image restoration processing is computed and no image restoration data are recorded or saved.

If an "image restoring operation mode" is selected, the optical correcting operation and an operation necessary for the image restoration are executed. The image restoration data needed in the image restoration processing are transmitted from the optical correction system 500 to the point-image function computing unit 100 via the image restoration decision-making unit 140.

Next, the image reproducing device 2 is described.

The image reproduction device 2 includes the image restoration computing unit 210 that executes the image restoration processing, an image display unit 220 at which an image is displayed and a restoration result saving unit 230.

The image reproduction device 2 is achieved by using a personal computer in the embodiment, and the personal computer having installed therein an application software program containing a dedicated blur correction program needed to execute the image restoration is enabled to function as the image reproduction device 2.

The blur correction program includes a data input unit (data input step) that receives image data, a point spread function and various types of parameters transferred from the camera side and a setting unit that allows the image reproduction device to set parameters for the camera as well as an image restoration computing unit (image restoration computation step) that executes the image restoration processing.

It is to be noted that instead of using a personal computer, the image reproduction device 2 may be constituted as a dedicated reproducing device or it may be built into the camera.

The image restoration computing unit 210 executes the image restoration processing for correcting a blur contained in an image based upon the image data transmitted from the image recording unit 120 of the blur correction camera 1, the point-image function information corresponding to the image data and the various parameters used during the image restoration processing.

While the Wiener filter having been described in reference to expression (6) is used in the image restoration processing executed by the image restoration computing unit 210, the present invention is not limited to this example and the image restoration processing may be executed by adopting another method.

The image display unit 220 at which an image photographed by the photographer or an image resulting from the image restoration is displayed, is constituted with the monitor unit of the personal computer in the embodiment.

At the restoration result saving unit 230, the restored image resulting from the image restoration processing executed by the image restoration computing unit 210 and the parameters used in the image restoration processing are saved in correspondence to the raw image.

Figure 15:
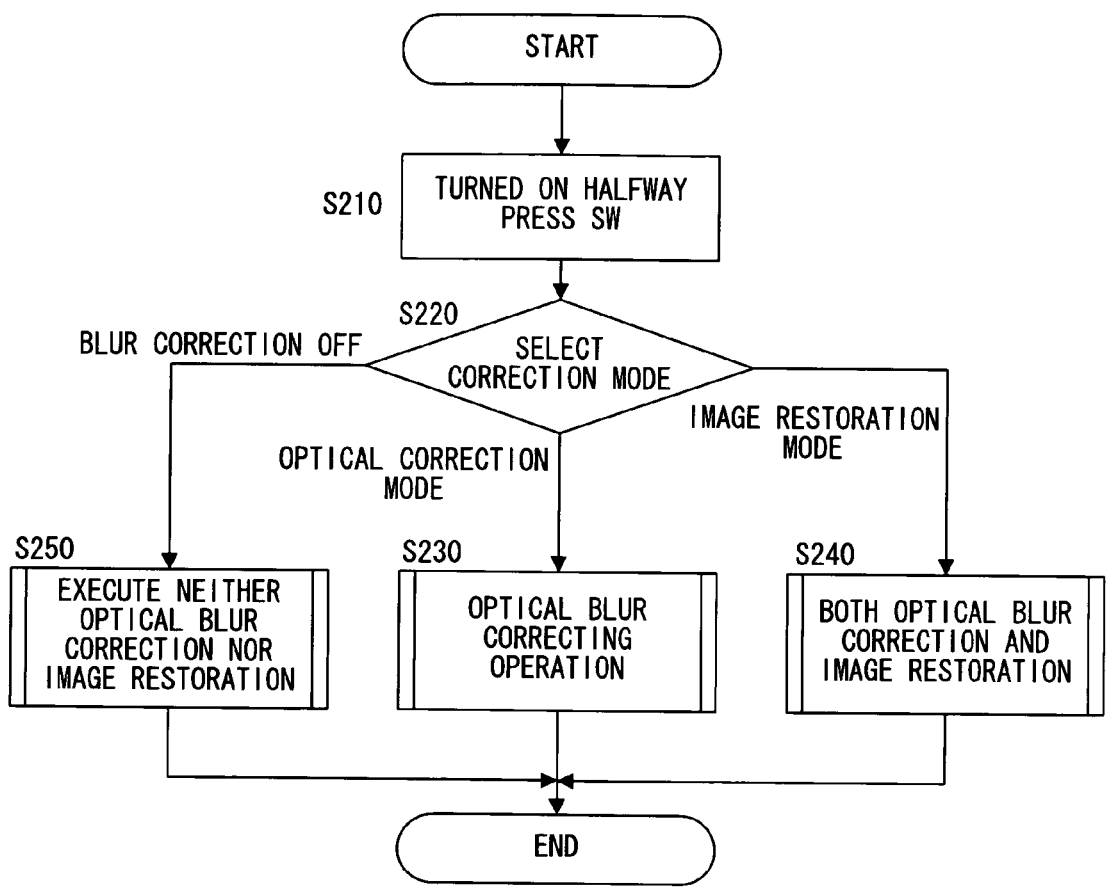
FIG. 15 presents a flowchart of a basic operations of the camera that are engaged in a blur correcting operation.

Next, the basic operation of the blur correction camera 1 executed in the embodiment is explained;

FIG. 15 presents a flowchart of the basic operation of the camera executed in relation to blur correction.

As the halfway press switch 191 is turned on in step S210, the operation proceeds to step S220. In step S220, a decision is made with regard to the state of the blur correction mode selector switch 194. The operation proceeds to step S230 to start an optical correcting operation flow if the "optical correcting operation mode" has been selected, whereas the operation proceeds to step S240 to start an image restoration processing flow during which the optical blur correcting operation and the image restoration processing operation are executed in combination if the "image restoring operation mode" has been selected. If the "blur correction off mode" has been selected, the operation proceeds to step S250.

In step S250 to which the operation proceeds when the "blur correction off mode" has been selected, neither the optical correction nor the image restoration is executed, the drive of the blur correction lens 70 is stopped, no blur correcting operation is executed and no image restoration data are recorded or saved.

The following is an explanation of the operations executed in the blur correction camera 1 in the "optical correcting operation mode" and in the "image restoring operation mode".

First, the operation of the blur correction camera in the "optical correcting operation mode" is explained.

Figure 16:
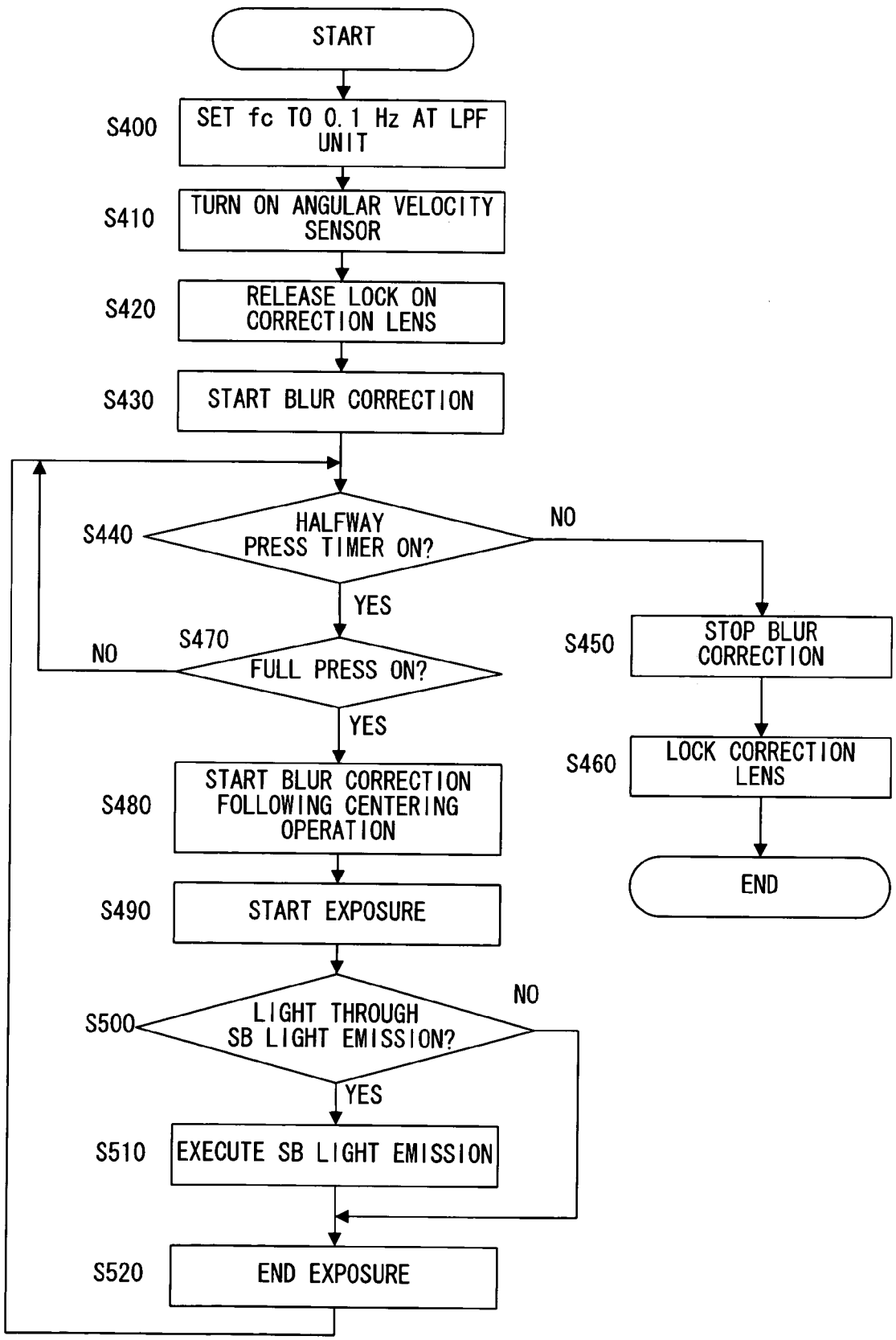
FIG. 16 presents a flowchart of a basic operation executed in the camera set in an optical blur correcting operation mode in the third embodiment.

FIG. 16 presents a flowchart of the basic operation of the camera executed in the optical blur correcting operation mode.

In step S400, the cutoff frequency fc at the LPF unit constituting the reference value computing unit 31 is set to 0.1 Hz. In step S410, the angular velocity sensor 10 constituting the vibration detection unit is turned on. In step S420, the blur correction lens 70 having been held in the lock is released. In step S430, the blur correcting operation starts. The blur correction started in step S430 is the optical blur correcting operation through which the blur is corrected by moving the blur correction lens 70 along a direction substantially perpendicular to the optical axis so as to cancel out the image blur based upon the output from the angular velocity sensor 10.

In step S440, the state of the halfway press timer is detected, and the operation proceeds to step S450 if the halfway press timer is determined to be in an OFF state, whereas the operation proceeds to step S470 if the halfway press timer is determined to be in an ON state. In step S450, the blur correcting operation is stopped, and in step S460, the correction lens 70 is locked and the operation exits the optical correction mode. In step S470, the state of the full press switch 192 is detected and the operation proceeds to step S480 if the full press switch 192 is in an ON state whereas the operation returns to step S440 if the full press switch 192 is in an OFF state.

In step S480, after executing a centering operation for the blur correction lens 70, the blur correction is started again. When the blur correction lens is not driven by the optical drive unit 50, the optical axis of the blur correction lens 70 and the optical axis I of the photographic optical system are not always aligned. Under normal circumstances, the blur correction lens 70 will have moved to an end of its moving range, and if the blur correcting operation is started in this state, there is bound to be a direction along which the blur correction lens cannot be driven. Accordingly, the centering operation is executed to drive the blur correction lens 70 so as to substantially align the optical axis of the blur correction lens 70 with the optical axis I of the photographic optical system.

In step S490, the shutter is opened and exposure at the image-capturing unit 110 is started. In step S500, a decision is made as to whether or not flash light (SB) is to be emitted, and if it is decided that flash light is to be emitted, the operation proceeds to step S510, whereas if it is decided that flash light is not to be emitted, the operation proceeds to step S520. In step S510, flash light is emitted. In step S520, the shutter is closed, thereby ending the exposure. Subsequently, the operation returns to step S440 to execute the halfway press timer decision-making routine.

Next, the operation of the blur correction camera set in the "image restoring operation mode" is explained.

Figure 17:
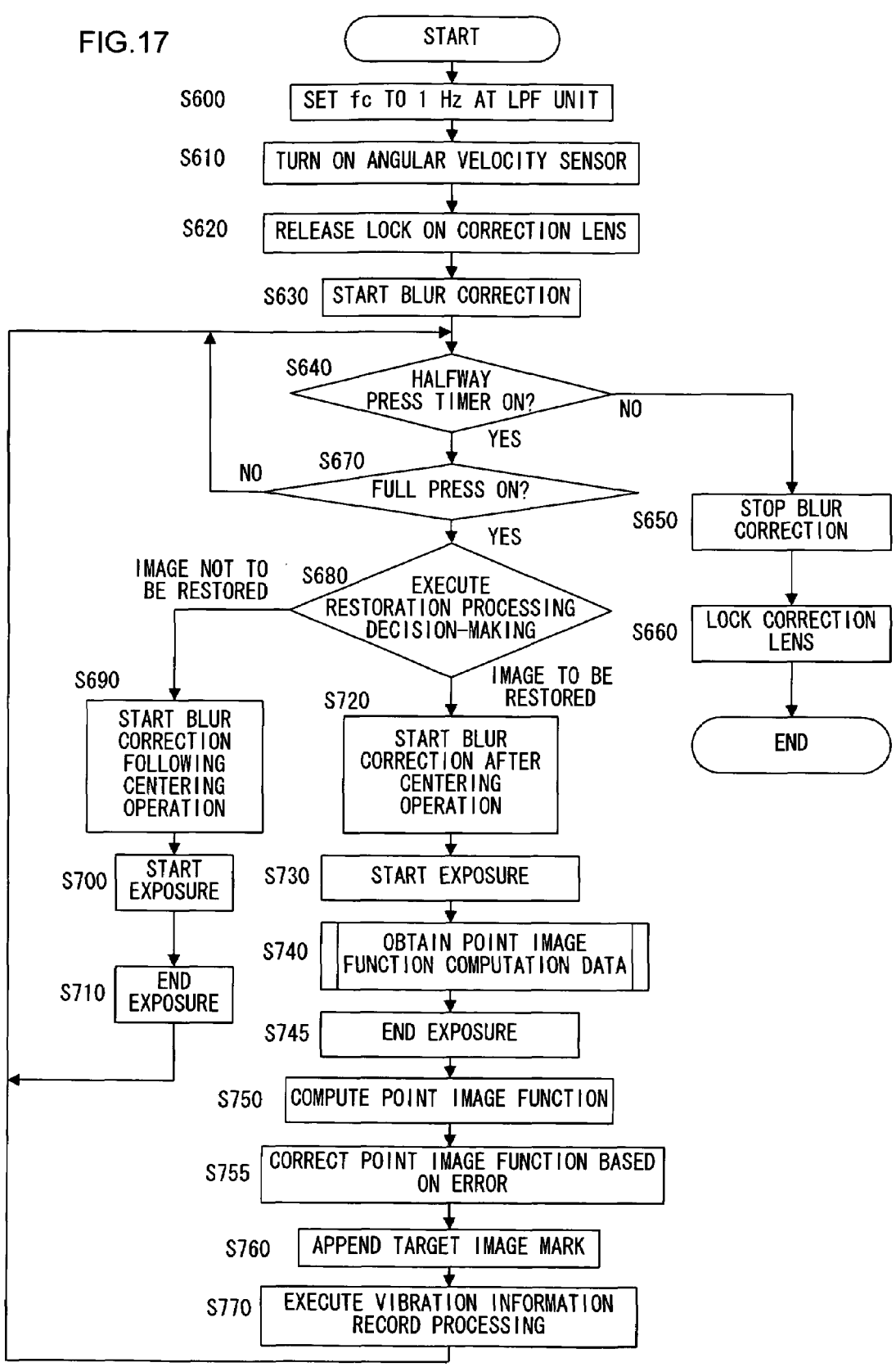
FIG. 17 presents a flowchart of a basic operation executed in the camera set in an image restoring operation mode in the third embodiment.

FIG. 17 presents a flowchart of the basic operation of the camera executed in the image restoring operation mode.

In step S600, the cutoff frequency fc at the LPF unit constituting the reference value computing unit 31 is set to 1 Hz. While the cutoff frequency fc is set to 0.1 Hz in the "optical correcting operation mode" as described earlier, a higher cutoff frequency fc is set in the "image restoring operation mode".

By setting the cutoff frequency to a higher level, a greater component of the vibration to which the blur correction camera 1 is subjected is allowed to evince in the point-image function computed by the point-image function computing unit 100 so as to reduce the component to undergo the blur correction executed by driving the blur correction lens 70. Since this reduces the extent to which the blur correction lens 70 needs to be driven, the blur correction lens 70 can be driven within its drivable range with a comfortable margin. While the blur is corrected through the optical blur correcting operation to a lesser extent and the blur manifests to a greater extent in the captured image in this case, the blur manifesting to a greater extent in the captured image can be corrected later through the image restoration. Thus, an image with no image blur or hardly any image blur can ultimately be achieved through highly effective blur correction.

By setting the cutoff frequency used in the reference value computation to a higher value in the "image restoring operation mode" compared to the cutoff frequency set for the "optical correcting operation mode" as described above so as to split the component to undergo the blur correction to a component to be corrected through the optical blur correction and a component to be corrected through the image restoration, even a blur caused by a very shaky hand movement can be corrected in a more effective manner in the "image restoring operation mode" than in the "optical correcting operation mode".

Since the operational flow from step S610 through step S670 in FIG. 17 is similar to the operational flow from step S410 through step S470 in FIG. 16, a detailed explanation is not provided.

In step S680, a decision is made with regard to the restoration processing. The restoration processing decision-making in step S680 is to be explained in further detail later in reference to FIG. 18. If the image restoration processing is judged to be unnecessary through the restoration processing decision-making in this step, the operation proceeds to step S690, whereas the operation proceeds to step S720 if the image restoration processing is judged to be necessary.

In step S690, the blur correction resumes after executing a centering operation for the blur correction lens 70 as in step S480 in FIG. 16. In step S700, the shutter is opened and the exposure at the image-capturing unit 110 starts. In step S710, the shutter is closed and the exposure ends. Then, the operation returns to step S640 to execute the halfway press timer decision-making routine. In step S720, the blur correction resumes after executing the centering operation for the blur correction lens 70 as in step S480 in FIG. 16.

In step S730, the shutter is opened and the exposure at the image-capturing unit 110 starts. In step S740, data to be used in the point-image function computation are obtained while the exposure is in progress. The data to be used in the point-image function computation include the reference value computed based upon the output from the angular velocity sensor 10 and error information indicating the error computed based upon the position information indicating the position of the blur correction lens 70 and is provided by the position detection unit 60. The acquisition of the point-image function computation data in step S740 is to be explained in detail later in reference to FIG. 19.

In step S745, the shutter is closed and the exposure ends. In step S750, the point-image function is computed by using the point-image function computation data having been obtained. Since a method that may be adopted when computing the point-image function has been explained in reference to the first embodiment, a repeated explanation is omitted. In step S755, the point-image function having been computed in step S740 is corrected by using the error data (operation executed by the function correcting unit 105).

Now, a method that may be adopted when correcting the point-image function by using the error data is explained.

With lc(t) and lr(t) respectively representing the target drive position and the actual drive position of the blur correction lens 70, each taken as a function of time t, control position errors e(t) manifesting along the X axis and the Y axis are given as in the following expressions (operation executed by the control position error output unit).

$$ex(t)=lcx(t)-lrx(t) \tag{12}$$

$$ey(t)=lcy(t)-lry(t) \tag{13}$$

With e (x, y) representing a function obtained by expanding expressions (12) and (13) two-dimensionally, a corrected point-image function p' (x, y) is given as in the following expression by using the point-image function p(x, y) presented in expression (1).

$$p'(x, y)=p(x, y)+e(x, y) \tag{14}$$

After correcting the point-image function, a blur mark is attached to the image restoration processing target image in step S760.

In step S770, the corrected point-image function is recorded as blur information and then the operation returns to step S640.

Next, the processing of the blur information output from the optical correction system 500 and the acquisition of the point-image function computation data are explained.

Figure 18:
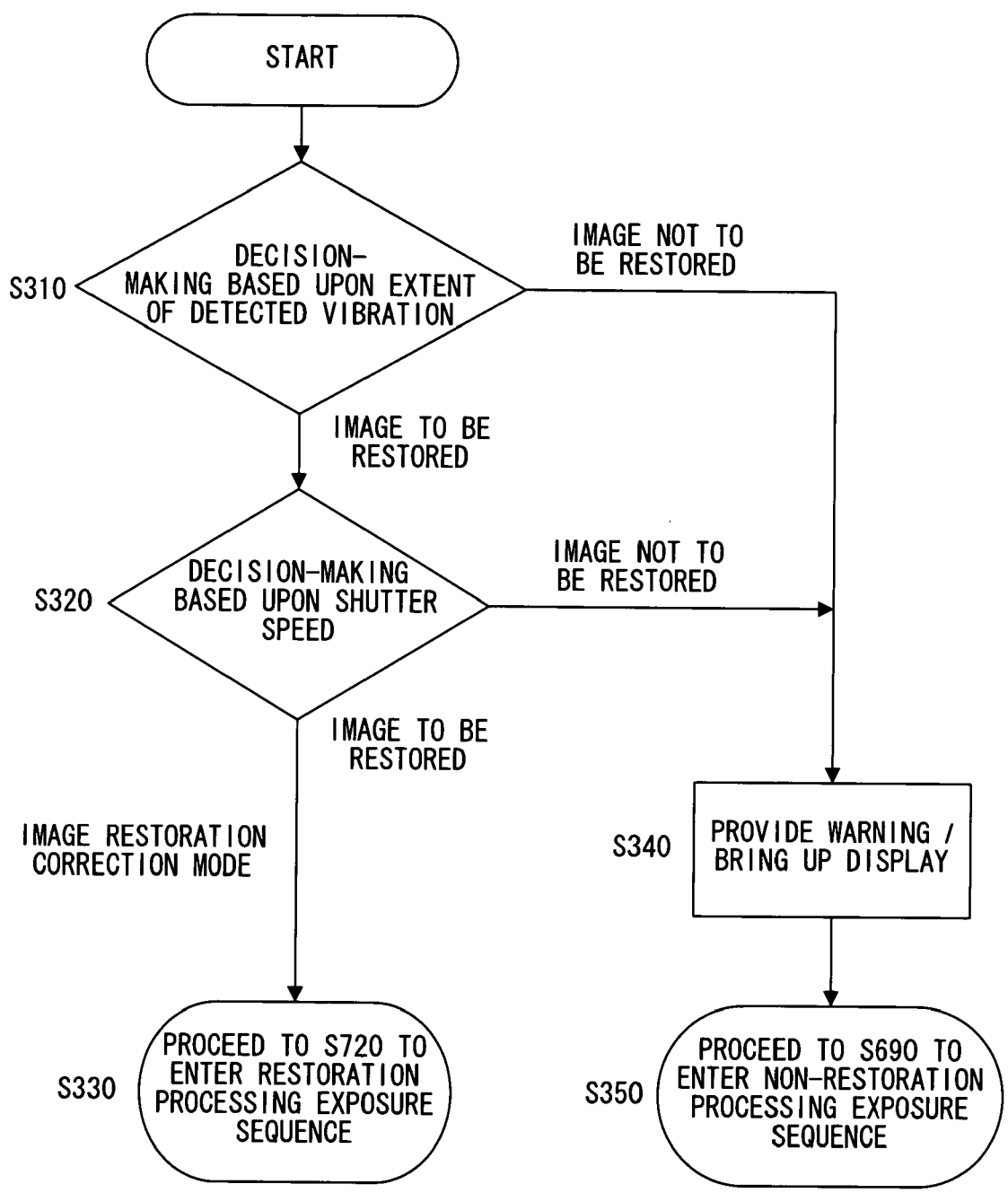
FIG. 18 presents a detailed flowchart of an operation executed at an image restoration decision-making unit in the third embodiment to make a decision based upon vibration detection data as to whether or not a point-image function computation is to be executed.

FIG. 18 presents a detailed flowchart of the operation executed by the image restoration decision-making unit 140 (in step S680 in FIG. 17) to make a decision based upon the blur detection data as to whether or not the point-image function computation is to be executed.

Based upon the decision made by the image restoration decision-making unit 140, a decision is made as to whether or not the vibration detection data needed for the image restoration are to be recorded.

In step S310, the effectiveness of the image restoration processing is judged based upon the extent of the vibration having been detected. In this step, a decision is made as to whether or not the results of the target drive position computation indicate that the blur can be effectively corrected through the image restoration processing by checking the image restorable condition range set in-advance based upon the vibration information and camera photographing information.

For instance, if the blur manifests to an excessive extent (blur manifesting to the highest limit extent), noticeable stripes will still remain in the image after the image restoration processing and thus, the image quality will still be poor. If, on the other hand, the extent of blurring is insignificant (blur manifesting to the lowest limit extent), the image quality will not be significantly improved through the image restoration.

Accordingly, these blurring extent limits are set in advance by conducting tests or based upon experience.

In step S320, a decision is made as to whether or not the image restoration processing needs to be executed based upon the shutter speed (the length of the exposure period). Since the extent of blurring can be predicted with some accuracy based upon the shutter speed, a decision is made as to whether or not the image restoration processing needs to be executed based upon the predicted blurring extent in this step. When the shutter speed is high, only a very small extent of blurring, if any, occurs, and accordingly, the quality of the image is judged to be acceptable. This blurring extent can be determined in correspondence to both the focal length and the shutter speed. It is generally accepted that when the optical blur correction is not executed, a blur attributable to an unsteady hand movement manifests when the shutter speed is lower than (1/focal length). However, since the optical blur correction is also executed in the embodiment, the image restoration processing should be executed only if the relationship expressed in (15) below, for instance, is true.

$$(A/\text{focal length})<\text{shutter speed (exposure period)} \tag{15}$$

"A" in expression (15) may be a specific value or it may be a variable that changes in correspondence to other conditions.

If it is decided through the shutter speed decision-making and the detected blurring extent decision-making in steps S310 and S320 that the restoration processing needs to be executed, the operation proceeds to step S330 to enter the restoration processing in step S720 in FIG. 17.

If, on the other hand, it is decided through the shutter speed decision-making or the detected blurring extent decision-making in step S310 or step S320 that the restoration processing is not necessary, the operation proceeds to step S340 to issue a warning or bring up a display (message) indicating that the image restoring operation is not to be executed. The message may be provided as, for instance, a warning sound or through a specific display.

After executing step S340, the operation proceeds to step S350 to enter the non-restoration processing exposure sequence in step S690 in FIG. 17.

By making a decision as to whether or not the image restoration should be executed as shown in FIG. 18, the required memory capacity can be reduced since the memory only needs to store a smaller volume of blur information for the image restoration processing.

Figure 19:
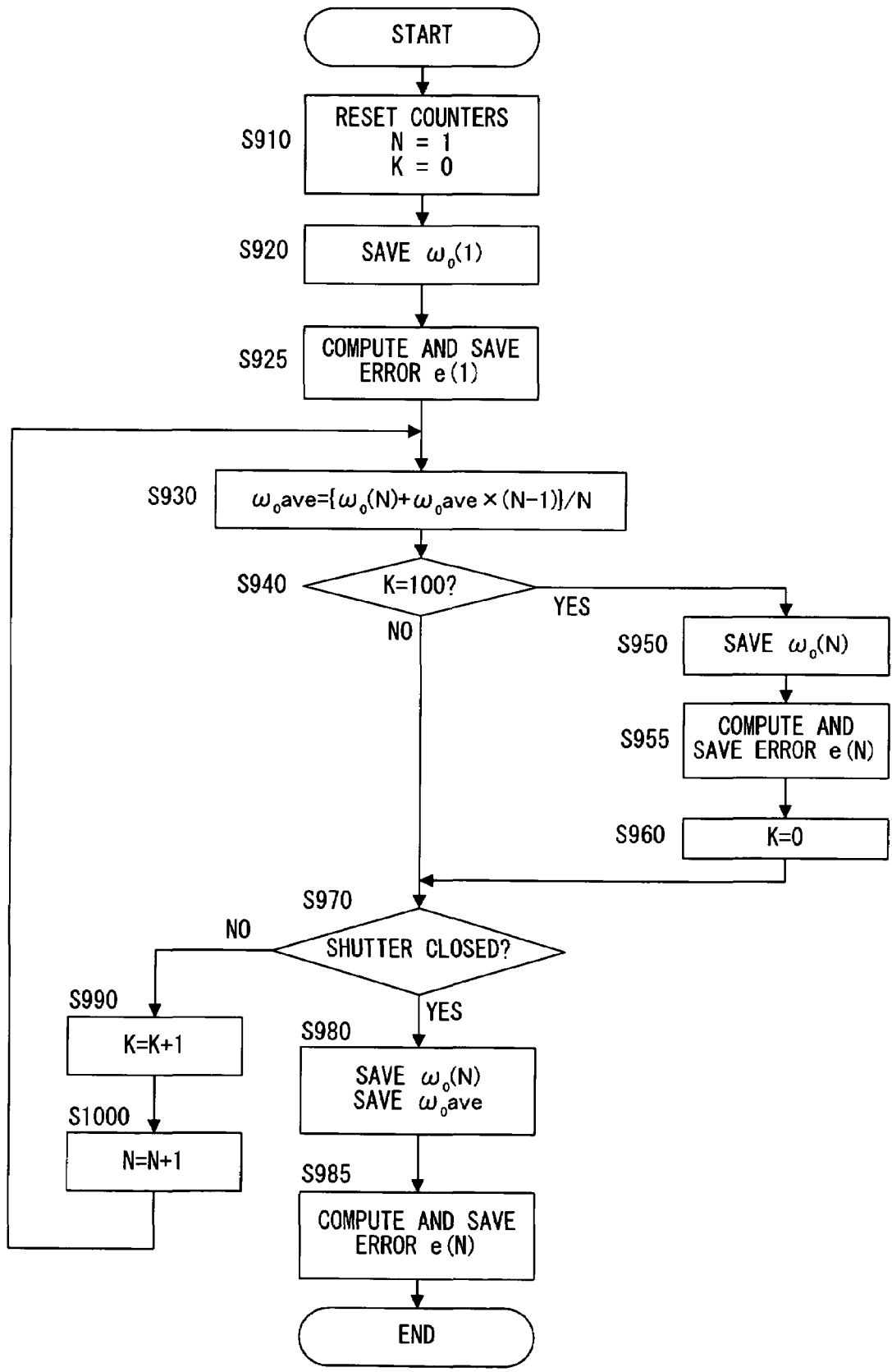
FIG. 19 is a detailed flowchart of an operation executed to obtain point-image function computation data.

FIG. 19 presents a detailed flowchart of the operation executed to obtain the point-image function computation data (in step S740 in FIG. 17).

In the embodiment, the reducing processing (processing executed at an information volume reducing unit) shown in FIG. 19 is executed primarily in order to save space in the memory.

Following the exposure start, counters are reset in step S910. More specifically, a counter N is set to 1 and a counter K is set to 0. The counter N indicates the value assigned to one of a plurality of reference values to distinguish it from the rest of the reference values, whereas the counter K functions as a timer that measures time.

In step S920, a first reference value output, i.e., $\omega 0(1)$, is saved.

In step S925, the corresponding error e(1) is computed and saved. The "error" as referred to in this context represents the difference (control position error) between the target drive position for the blur correction lens 70 computed by the target drive position computing unit 33 and the actual drive position of the blur correction lens 70 output by the position detection unit 60, which is computed by the blur correction control unit 30. While the blur correction control unit 30 outputs a drive signal that will make-up for the difference between a target drive position and the actual drive position, the blur correction lens 70 cannot always achieve the drive target and an error occurs under such circumstances.

In step S930, the reference value output average $\omega 0\text{ave}$ is computed as expressed below.

$$\omega 0\text{ave}=\{\omega 0(N)+\omega 0\text{ave}\times(N-1)\}/N \tag{16}$$

In step S940, one of the counters is checked. If the counter K indicates 100, the operation proceeds to step S950, but the operation otherwise proceeds to step S970. In step S950, the reference value output $\omega 0(N)$ is saved.

In step S955, the corresponding error e(N) is computed and saved. In step S960, the timer counter K is cleared to zero. In the embodiment, the sampling frequency at the angular velocity sensor 10 is 1 kHz and the reference value output is saved every 0.1 sec, thereby culling the reference value outputs. In step S970, it is checked to determine as to whether or not the shutter is closed, and the operation proceeds to step S990 if the shutter is open, whereas the operation proceeds to step S980 if the shutter is closed.

In step S980, the last reference value output ω0(N) is saved. The most recent reference value output is saved so as to ensure that at least another reference value output is saved in addition to the initial reference value output even when the reference value outputs are culled with the shutter set at a high speed setting. For instance, since the reference value output is saved every 0.1 sec when the sampling frequency is set to 1 kHz in the embodiment, only the first reference value output will have been saved if the shutter speed is set higher than 1/10 sec, and in such a case, a point-image function cannot be computed. In addition, the reference value output average ω0ave having been computed in step S930 is also saved in step S980.

In step S985, the corresponding error e(N) is computed and saved. In steps S990 and S1000, the counters are incremented before the operation returns to step S930 to compute the reference value output average.

Now, the reducing processing mentioned earlier is explained.

In the embodiment, the point-image function used in the image restoration processing is computed based upon the reference value output. Since the reference value output is an LPF output with a 1 Hz cutoff frequency (in the image restoration flow in FIG. 17) as described earlier, the frequency level is lower than the level of the frequency component of the blur caused by the unsteady hand movement. For this reason, the sets of data to be used in the point-image function computation can be reduced.

If the point-image function were computed by using all the blur detection data provided by the optical correction system 500, a huge load of computation must be executed and a huge memory capacity is required.

For instance, the number of sets of blur detection data obtained as the results of the target position computation when the sampling frequency for the reference value computation is 1 kHz amounts to N=1000 sets of reference value data per second, which represents an extremely large volume of data. The frequency of an unsteady hand movement is normally within the range of 0.1 to 10 Hz, and the cutoff frequency of the low pass filter installed in the reference value computing unit 31 that calculates the reference value for the vibration caused by an unsteady hand movement is approximately 1 Hz. Namely, the frequency component equal to or lower than 1 Hz constitutes the primary component processed at the point-image function computing unit 100. The frequency of 1 Hz can be adequately expressed by using data taken with a frequency approximately 10 times as high, i.e., in the 0.1 sec cycle. Thus, it is possible to reduce the data sampled with the 1 kHz frequency by the factor of 1/100.

In addition, when the cutoff frequency at the LPF used in the reference value output computation is altered, the reducing extent, too, needs to be adjusted in correspondence to the altered cutoff frequency.

Through the processing described above, the length of time required for the computation processing, the required memory capacity and the like can be reduced.

Following the reducing processing, the blur information is recorded into the recording medium to be used in the image restoration processing executed by the image reproducing device or the data are transferred to the image reproducing device 2. Since only the absolute minimum number of sets of data required in the image restoration processing, resulting from the reducing processing, is recorded or transferred in the embodiment, great advantages such as reductions in the length of time required for the data transfer and in the length of time required for the computation processing and in particular, more efficient use of memory capacity are achieved.

Now, the operation of the point-image function computing unit 100 executed in step S750 in FIG. 17 is explained.

The problem that some extent of residual blurring still manifests in the image (occurrence of a blur correction residual error) even after the blur correction by the optical correction system 500 has been described in reference to the related art. Such a blur correction residual error is primarily attributable to the reference value and the error occurring between the actual drive position of the blur correction lens and the target drive position. Accordingly, the point-image function computing unit 100 in the embodiment calculates a point-image function based upon the reference value, which is then corrected based upon the error by the function correcting unit 105. The point-image function thus corrected is transmitted to the image restoration computing unit 210. The image restoration computing unit 210 executes an image restoration computation based upon the corrected point-image function transmitted thereto so as to correct the image blur that the blur correcting operation by the blur correction lens 70 has failed to correct and, as a result, a high quality image in which blur has been effectively corrected is obtained.

Next, the operation of the image reproducing device 2 is explained.

Figure 20:
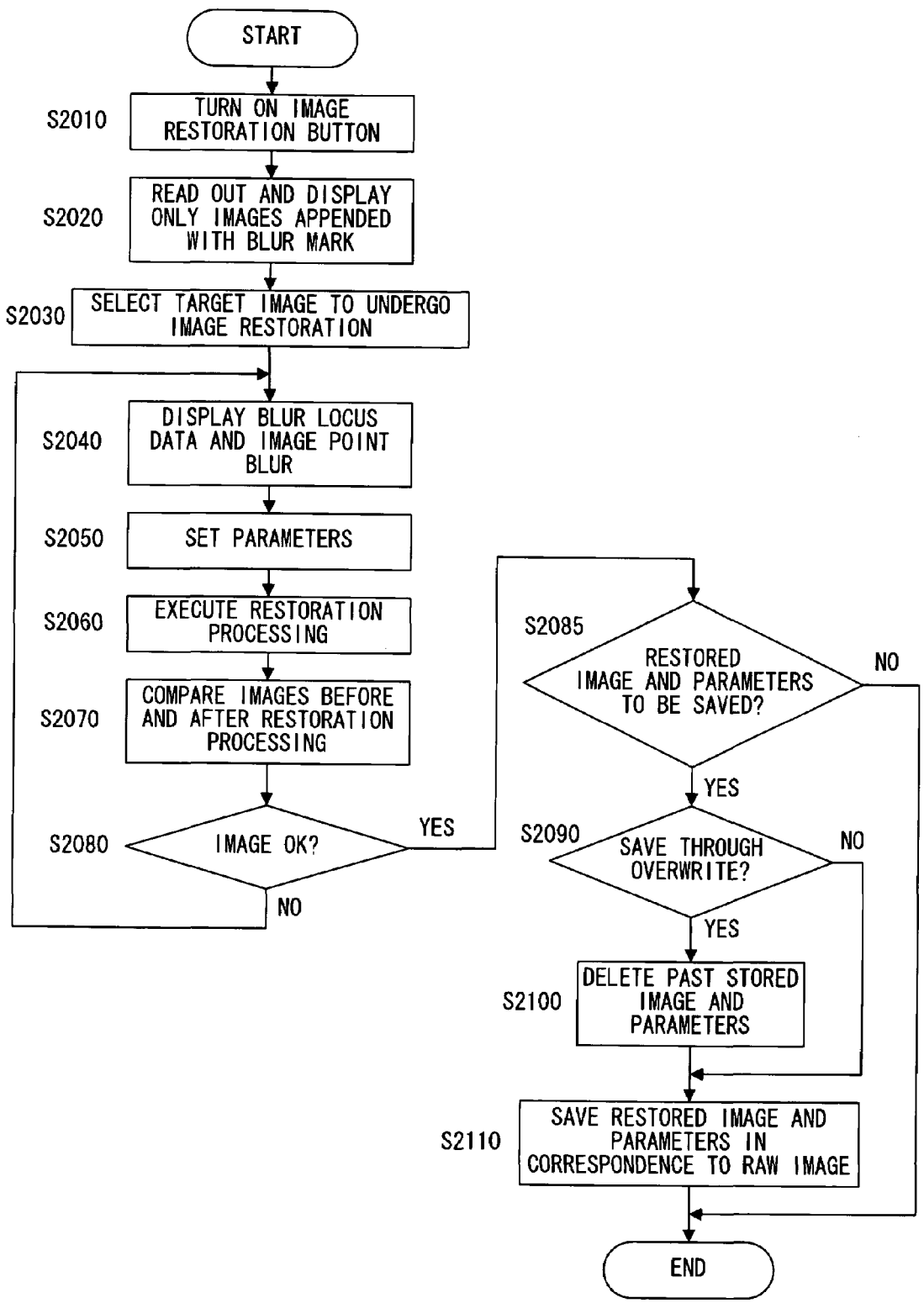
FIG. 20 presents a flowchart of a basic operation of an image reproduction device.

FIG. 20 presents a flowchart of the basic operation of the image reproducing device 2.

It is assumed that the blur correction program in conformance to which the image restoration is executed is preinstalled in the image reproducing device 2.

As explained earlier, the image data generated on the camera side are transferred to the image reproducing device 2 via the transfer cable 300 in the embodiment.

It is assumed that before the processing in FIG. 20 starts, images have already been transferred, the blur correction (image restoration processing) program has been started up and a menu screen has been brought up on display.

In step S2010, a restoration processing button is clicked with an input device such as a mouse and in response, the operation enters the image restoration flow. Since the blur mark was attached and recorded in advance at the camera to each image determined to be a target image to undergo the restoration processing, only images appended with the blur mark are read out and displayed as the operation for reading images to be reproduced starts in step S2020. In step S2030, the user selects and displays an image to undergo the image restoration processing by checking the images or the various parameters related to their image blurs.

In step S2040, blur locus data and the image point blur constituting the parameters needed for the image restoration of the selected image are displayed in further detail. More specifically, correction information having been recorded by the blur correction camera 1, such as the blur locus data and the image point blur, the photographing information and the like are displayed on the image display unit (display) 220 so as to enable the operator to work directly with the blur locus data on the image display unit 220 as desired.

Figure 21:
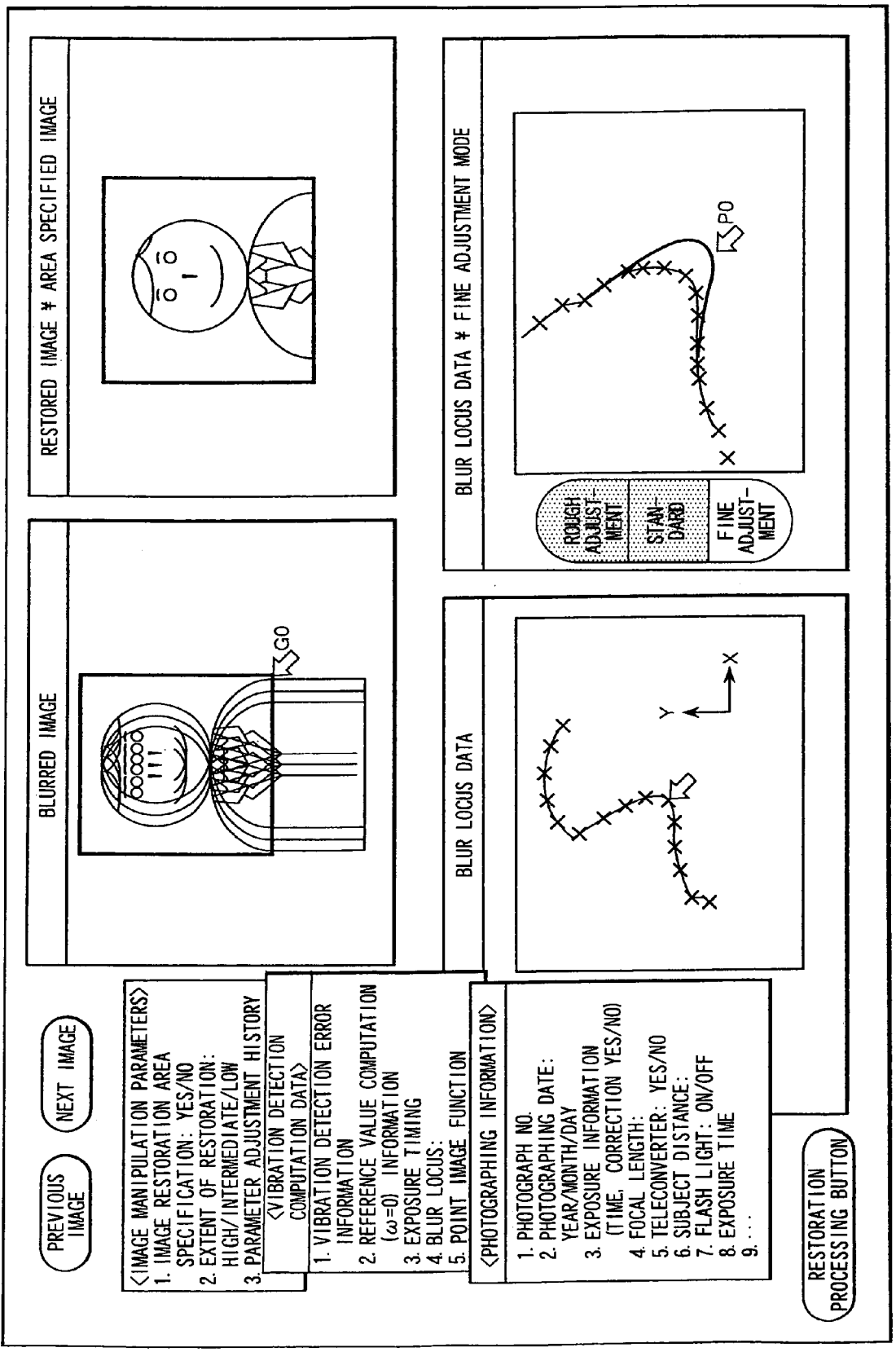
FIG. 21 presents a specific example of an image display and operations that may be executed with regard to various parameters.
Figure 22:
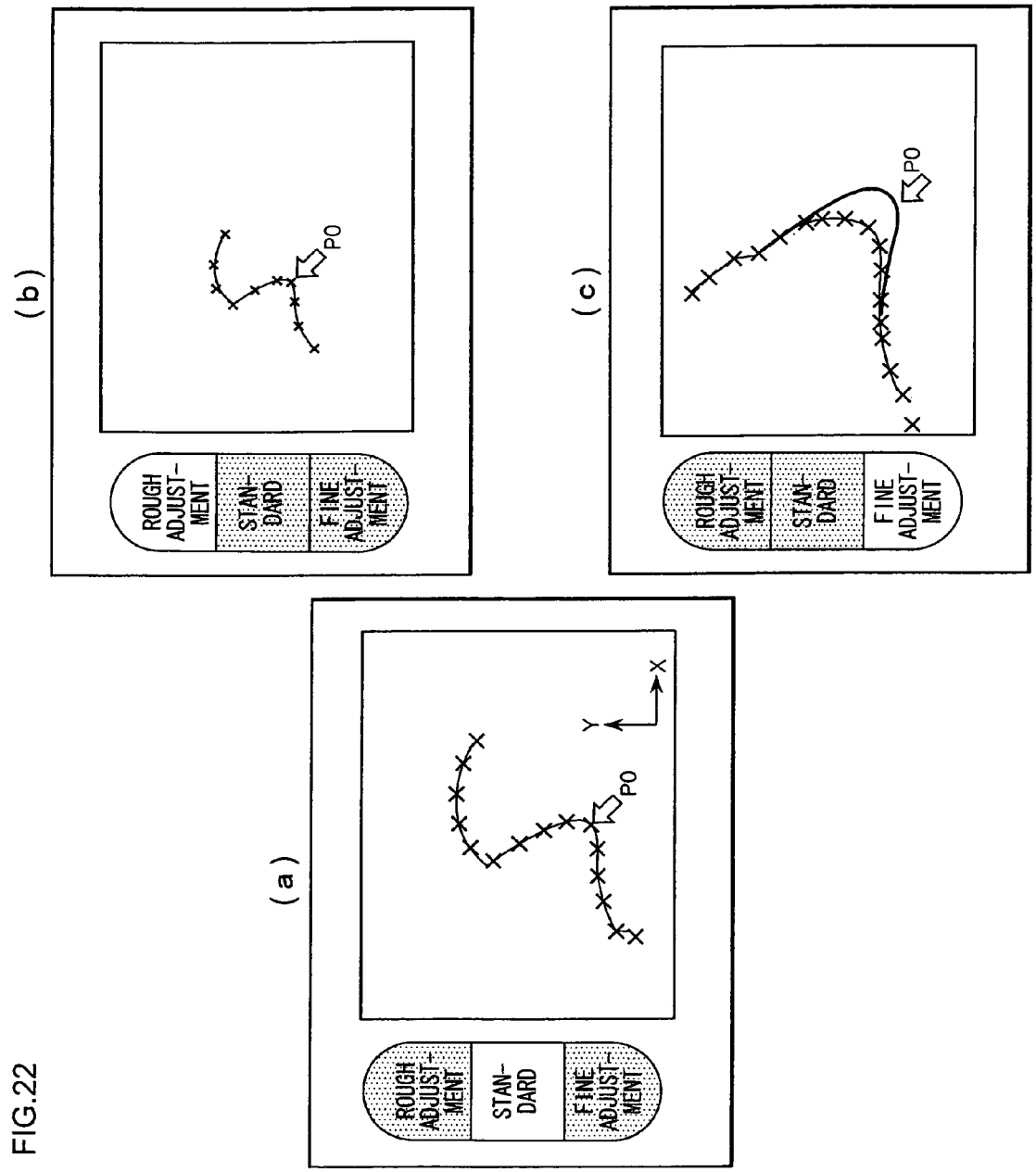
FIGS. 22(a) to 22(c) each present a specific example of image display and operations executed with regard to various parameters.

FIGS. 21 and 22(a) to 22(c) represent a specific example of how images may be displayed and the various parameters may be adjusted. FIG. 22(a) shows the blur locus data, FIG. 22(b) shows the blur locus data in a rough adjustment operation mode and FIG. 22 (c) shows the blur locus data in a fine adjustment operation mode.

In step S2050, the parameters used in the image restoration are adjusted and set as desired. In step S2060, the restoration processing is executed by using the parameters having been set in step S2050. In step S2070, the pre-restoration blurred image and the restored image resulting from the restoration processing are displayed for comparison on the image display unit 220 at the image reproduction device 2. In step S2080, the pre-restoration blurred image and the restored image resulting from the restoration processing are visually compared and a decision is made as to whether or not the restored image is acceptable (whether or not the image restoration should be re-executed). The operation proceeds to step S2085 if the restored image is acceptable, whereas the operation returns to step S2040 if the image restoration is to be re-executed.

In step S2085, the user makes a decision as to whether or not the restored image and the parameters should be saved. The operation proceeds to step S2090 if the restored image and the parameters are to be saved, whereas the processing ends if they are not to be saved. In step S2090, the user makes a decision as to whether or not to save the restored image and parameters by writing the data over other data and an instruction is issued accordingly. The operation proceeds to step S2110 if the data are not to be saved by writing them over other data, whereas the operation proceeds to step S2100 if they are to be saved through an overwrite. In addition, if the data are to be saved through an overwrite, the data to be written over and thus deleted (existing saved data) are also selected.

In step S2100, the past restored image and the corresponding parameters (the data having been selected in step S2090 to be written over) having been saved in correspondence to the raw image are deleted. In step S2110, the current restored image and the new parameters used for the current image restoration processing are saved in correspondence to the raw image.

In the step, three different files, a first file containing the pre-restoration raw image (blurred image), a second file containing the parameters and a third file containing the restored image are prepared and information related to the file containing the raw image and the file containing the restored image is written in the file containing the parameters. As the file containing the parameters is subsequently opened at the image reproduction device 2, the file containing the raw image and the file containing the restored image, which are correlated to the file containing the parameters, too, are opened and displayed.

Figure 23:
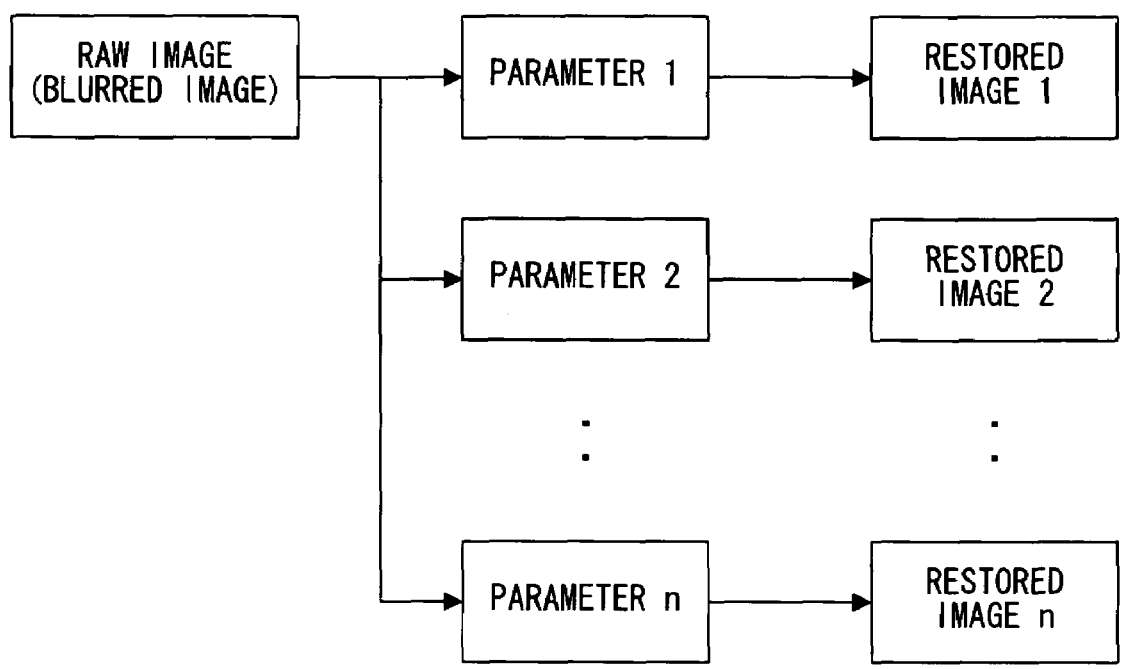
FIG. 23 schematically shows the relationship among restored images saved in S2110, parameters and a raw image.

FIG. 23 schematically illustrates the relationship among restored images, parameters and the raw image saved in step S2110.

As shown in FIG. 23, a plurality of combinations of restored images and parameters all correlated to a single raw image exist in the embodiment.

Since this allows the parameters to be saved in correspondence to each image no matter how many times image restoration processing is executed, the user is able to work with his images smoothly without becoming confused.

It is to be noted that the restored image, the parameters and the raw image can be saved by adopting any of various other modes instead of the mode adopted in the embodiment. Table 1 below presents examples of possible modes that may be adopted, each corresponding to a specific combination of instructions for saving/not saving the images and the parameters.

TABLE 1

| SAVE RAW IMAGE? | SAVE RESTORED IMAGE? | SAVE PARAMETERS? | SAVING METHOD | No. |
|---|---|---|---|---|
| NOT SAVED | SAVED | SAVED | NEW | 1 |
| | | | OVERWRITE | 2 |
| | NOT SAVED | SAVED | NEW | 3 |
| | | | OVERWRITE | 4 |
| | SAVED | NOT SAVED | NEW | 5 |
| | | | OVERWRITE | 6 |
| SAVED | SAVED | SAVED | NEW | 7 |
| | | | OVERWRITE | 8 |
| | NOT SAVED | SAVED | NEW | 9 |
| | | | OVERWRITE | 10 |
| | SAVED | NOT SAVED | NEW | 11 |
| | | | OVERWRITE | 12 |

In modes No. 1 through 6 in Table 1, the raw image is not saved.

For instance, if the user is satisfied with the restoration results and does not wish to have the image restoration re-executed, there may not be any need to save the raw image. Mode No. 1, 2, 5 and 6 will be effective under such circumstances.

If, on the other hand, the user is not satisfied with the restored image obtained by executing the restoration processing on a raw image and does not wish to save either the raw image or the restored image, the user may still wish to save the parameters to be used for reference when another raw image subsequently undergoes the restoration processing. Mode No. 3 and 4 will be effect of in such a situation.

In mode No. 7 through 12 in Table 1, the raw image is saved. Mode No. 7 and 8 among them are adopted in the embodiment described above.

For instance, if the processing speed at the image restoration computing unit 210 of the image reproduction device 2 is high, only the parameters may be saved in correspondence to a raw image so that the image restoration can be executed by using the parameters and the raw image having been saved to display the restored image whenever necessary, without saving the restored image. As a result, memory capacity at the recording medium or the like can be saved while assuring ease of use comparable to that achieved in the embodiment (modes 9 and 10).

In addition, even when the user is satisfied with the restoration results and does not think it necessary to re-execute the image restoration under the same conditions, the user may still wish to save the raw image just to ensure that if such needs ever arise, the image restoration can be re-executed by using different parameters. Modes 11 and 12 are effective under such circumstances.

It is to be noted that in each of the combinations described above, the user is allowed to choose whether to save the data as additional data or through an overwrite.

In the example presented in FIG. 21, a window display that includes the pre-restoration blurred image, the restored image obtained through the restoration processing, information related to the point-image function and the blur locus data corresponding with one another is provided on the image display unit 220. By displaying them in a single screen to facilitate comparison, the operator is able to intuitively determine which image area needs to be corrected instantly.

In addition, the lower right display in FIG. 21 enables the operator to manipulate the blur locus data. The blur locus data displayed on the image display unit 220 in this manner in the embodiment can be locally manipulated by the operator with a mouse or the like. The restoration processing is re-executed based upon the blur locus data having been manipulated as described above so as to make a decision with regard to the finer details through comparison.

In the embodiment, the blur locus data having been obtained, which is shown in FIG. 22(a), can be reduced/enlarged in reference to a point P0 indicated with the mouse so as to allow the image data to be processed through a rough adjustment as shown in FIG. 22(b) or through a fine adjustment as shown in FIG. 22(c). FIG. 22(c) shows an example of an image data operation in the fine adjustment mode in which data can be manipulated by using a larger number of sets of data to facilitate the evaluation of the parameters of the resulting restored image. This, in turn, improves the level of freedom in the image operation and improves the efficiency of the processing.

In the point-image function computation in the related art, the output from a sensor such as the angular velocity sensor 10 is directly used in the computation, and for this reason, the point-image function contains numerous error factors, making it difficult to obtain a high-quality image even by manipulating the image on display. In contrast, the image restoration processing in the embodiment is executed through a point-image function computation in which output data with a lesser extent of noise error, resulting from the blur correction achieved through the optical blur correcting operation are used and thus, an extremely high quality restored image is achieved. In addition, since the blur locus data, the image point data and the like of the image can be directly manipulated by using, for instance, a mouse, the effect of the parameters used in the image restoration processing on the image restoration results can be evaluated with greater ease and highly efficient processing can be executed.

As described above, the blur information is recorded in correspondence to the image in the embodiment. As a result, the user is able to verify the blur information simply by viewing the image at the image reproduction device 2 (image viewing software program). Accordingly, the user does not need to correlate the image with the blur information prior to the image restoration, and the work efficiency is improved. The work efficiency is further improved with the display of the blur mark indicating that image restoration is required.

In the embodiment, the actual drive position of the blur correction lens 70 is detected, the difference between the actual drive position and the target drive position is determined as an error and a point-image function reflecting the error is computed. Then, by restoring the image using the point-image function, the blur correction residual error attributable to the drive error occurring while driving the blur correction lens 70, too, can be corrected through the image restoration, thereby enhancing the blur correction effect.

It is to be noted that the present invention is not limited to the embodiment described above and allows for numerous variations and modifications which are equally considered to be within the scope of the present invention.

For instance, while a digital low pass filter is used in the reference value computation in the embodiment, the present invention is not limited to this example and the reference value computation may be executed by adopting another method such as the moving average method. While the cutoff frequency at the LPF is adjusted depending upon whether or not the image restoration is to be executed, the present invention is not limited to this example and the cutoff frequency at the LPF may remain unchanged regardless of whether or not the image restoration is executed.

While the blur correction camera 1 and the image reproduction device 2 are connected with each other via the transfer cable 300 to enable data exchange in the embodiment, the present invention is not limited to this example and instead, a multipurpose recording medium having recorded therein an image having been photographed with the blur correction camera 1, the point-image function corresponding to the image, the other parameters needed in the image restoration processing and the photographing information may be used instead, or the data may be transmitted through wireless communication.

While the restoration result operation unit 230 is included in the image reproduction device 2 in the embodiment, the present invention is not limited to this example and the restoration result operation unit may be installed on the camera side as long as the camera includes an image restoration computing unit.

While the data reducing processing is executed prior to the point-image function computation in the embodiment, the present invention is not limited to this example and the data reducing processing may be executed after the point-image function computation.

The blur correcting operation mode selector switch 194 is a three-position switch in the embodiment. However, the present invention is not limited to this example and it may be an ON/OFF switch operated to individually turn on/off the "optical correcting operation mode" and the "image restoring operation mode" or it may be a switch in software. If the "image restoring operation mode" alone is selected without selecting the "optical correcting operation mode", as well through such a switch, a warning for the user may be issued by generating a warning sound, bringing up a warning display or appending a warning mark to the image to indicate that the image blur has not been optically corrected.

In the embodiment, if the operator having checked the need for image restoration determines that the image restoration is not to be executed, the blur information such as the point-image function is neither obtained through an arithmetic operation nor recorded (saved). The present invention is not limited to this example and the blur information having a mark (a warning) attached thereto to indicate that the image is not suited for image restoration may be recorded or a mark indicating that the blur information has not been recorded/saved may be appended.

In the embodiment, three separate files, i.e., the file containing the raw image, the file containing the parameters and the file containing a restored image are prepared, with the information related to the raw image file and the restored image file written in the parameter file. However, the present invention is not limited to this example, and the three types of data may be saved in a single file, for instance, or information indicating the correlation among the three types of data may be saved in another file so as to enable a display of the three different types of data in correlation to one another in reference to this separate file in an application program.

The advantages that can be obtained in the present invention explained in detail above are summarized below.

Since the system includes a camera having the point spread function computing unit and an external device having the image restoration computing unit, the camera does not need to execute image restoration which entails a great load of arithmetic operations, and thus, the camera can be provided as an inexpensive unit and the level of power consumption in the camera, too, is reduced.

Since it includes the point spread function output means for outputting to the external device the computed point spread function by the point spread function computing unit via the image recording unit or a communication means, the image can be restored at the external device with ease without requiring a complicated operation.

As the point spread function computing unit computes the point spread function based upon the results of the computation executed at the reference value computing unit, the residual blur which has not been corrected through the blur correction by the blur correction optical system can be expressed as a point spread function and the blur, which has not been corrected through the blur correction by the blur correction optical system can be corrected through the image restoration.

Since it includes the data input unit that receives the image data and the point spread function and the image restoration computing unit that corrects an image blur through image restoration, an image blur can be corrected after the photographing operation through the image restoration executed on the image data containing a blur by using the point spread function.

Since the blur correction program includes a data input step in which image data and a point spread function are received and an image restoration computation step in which an image blur is corrected through image restoration, the image restoration can be executed on a multipurpose computer. Thus, the image can be restored without having to use a dedicated external device and the overall system can be achieved at low cost.

Since the system includes the information volume reducing unit that reduces the volume of information related to the reference value used in the computation of the point spread function and/or the computed point spread function, the length of time required for the arithmetic processing can be reduced and memory space can be saved. Thus, image restoration can be executed without having to employ a high-speed arithmetic processing unit, a large-capacity recording medium, a high-speed recording means or a high-speed communication means.

Since the information volume reducing unit reduces the information volume by culling the data related to the reference value and/or the computed point spread function, the volume of the information is reduced with ease and reliability.

Since the information volume reducing unit reduces the information volume by ensuring that there will be a sufficient volume of information after the reducing processing to enable the image restoration computation, the quality of the restored image is not compromised and a high-quality restored image is obtained.

The system having the restoration result saving unit or the restoration results saving step in which the parameters used in the image processing executed at the image restoration computing unit and/or the restored image is saved in correspondence to the raw image, facilitates highly organized management of the image data and the parameter settings when the user needs to adjust a parameter to be used in image restoration.

Since the restoration result saving unit is capable of saving therein a plurality of sets of parameters each corresponding to one of a plurality of restored images and/or the restored images themselves, the records of a plurality of image restoration trials executed by adjusting the parameters can be retained, making it possible to keep track of the history of the restoration trials.

Since the blur correction control unit adjusts the details of the control implemented on the blur correction optical system in correspondence to the mode selection made through the blur correction mode selection unit, an optimal optical blur correcting operation that will work best is executed in conjunction with the image restoring operation, whenever the image restoring operation mode is selected.

The blur correction control unit adjusts the contents of the control implemented on the blur correction optical system by switching the method adopted to compute the reference value in correspondence to the mode selection made through the blur correction mode selection unit. As a result, when the image restoration is to be executed, the extent to which the blur is corrected through the optical blur correcting operation can be adjusted. Even a blur caused by a very shaky hand movement can be corrected through the optimal blur correcting operation by reducing the extent to which the blur is corrected through the optical blur correcting operation. Since the residual image blur is corrected through the image restoration, a high-quality image in which the blur has been fully corrected can ultimately be obtained.

Since the blur correction control unit adjusts the contents of the control implemented on the blur correction optical system by adjusting the cutoff frequency at the low pass filter, the extent to which the blur is to be corrected through the optical blur correcting operation can be altered with ease, and thus, the present invention can be embodied with ease.

When the selection made by the blur correction mode selection unit indicates that the image restoration is to be executed, the blur correction control unit sets the cutoff frequency to a higher level than the cutoff frequency set when a non-image restoration mode has been selected at the blur correction mode selection unit. Consequently, the extent to which the blur is to be corrected through the optical blur correcting operation is reduced when the image restoration, too, is to be executed. As a result, even a blur attributable to a very shaky hand movement can be corrected in an optimal manner.

Since the system includes the image restoration decision-making unit that makes a decision as to whether or not the image restoration mode should be selected, the image restoration is executed only if the image quality is likely to be improved through the image restoration and no redundant image restoration is implemented.

The image restoration decision-making unit makes a decision as to whether or not the image restoration mode should be selected based upon the vibration detection signal, and thus, it is capable of judging the extent of the image blur, e.g., an extreme image blur or a very slight image blur.

Since the image restoration decision-making unit makes a decision as to whether or not the image restoration mode should be selected based upon the shutter speed, the image restoration is executed if the shutter speed is set to a level at which a concern for an image blur exists.

Since the image restoration decision-making unit makes a decision as to whether or not the image restoration mode should be selected based upon the focal length of the photographic optical system, the image restoration is executed if a concern for an image blur exists at the particular focal length.

Since the image restoration decision-making unit makes a decision as to whether or not the image restoration mode should be selected based upon the point spread function, the need for the image restoration can be judged with a higher level of accuracy as the extent of blurring changes during the exposure.

Since the system includes the reporting means for reporting the results of a decision made by the image restoration decision-making unit indicating that the image restoration mode should not be entered, the photographer is able to ascertain the photographing state with ease and thus, the operability is improved.

If the image restoration decision-making unit determines that the image restoration mode should not be entered, the image restoration mode is not entered, thereby ensuring that no redundant arithmetic operation or the like is executed. This feature is particularly effective in improving the processing speed and minimizing the power consumption.

If the image restoration decision-making unit determines that the image restoration mode should not be entered, the point spread function is not saved, and thus the required memory capacity can be reduced.

Since the blur correction mode selection unit invariably selects the optical blur correction mode in conjunction with the image restoration mode, the blur of the image to undergo the image restoration is first reduced through the optical blur correction to ensure that a high-quality image is obtained through the image restoration.

Since the blur correction mode selection unit is not allowed to enter the image restoration mode without also selecting the optical blur correction mode, an erroneous image restoration of a photographic image that has not undergone the optical blur correction is prevented. Accordingly, whenever the image restoration is executed, a high-quality image results.

A warning is issued if the image restoration mode is selected without also selecting the optical blur correction mode at the blur correction mode selection unit, an erroneous image restoration of a photographic image that has not undergone the optical blur correction is prevented. Accordingly, whenever the image restoration is executed, a high-quality image results.

The computation of the point spread function by the point spread function computing unit is enabled as the optical blur correction means is engaged in operation. Thus, the blur in the image to undergo the image restoration is first reduced through the optical blur correction and the computed point spread function contains ample information needed in the image restoration to ensure that whenever the image restoration is executed, the resulting image invariably achieves a high image quality.

FOURTH EMBODIMENT

Figure 24:
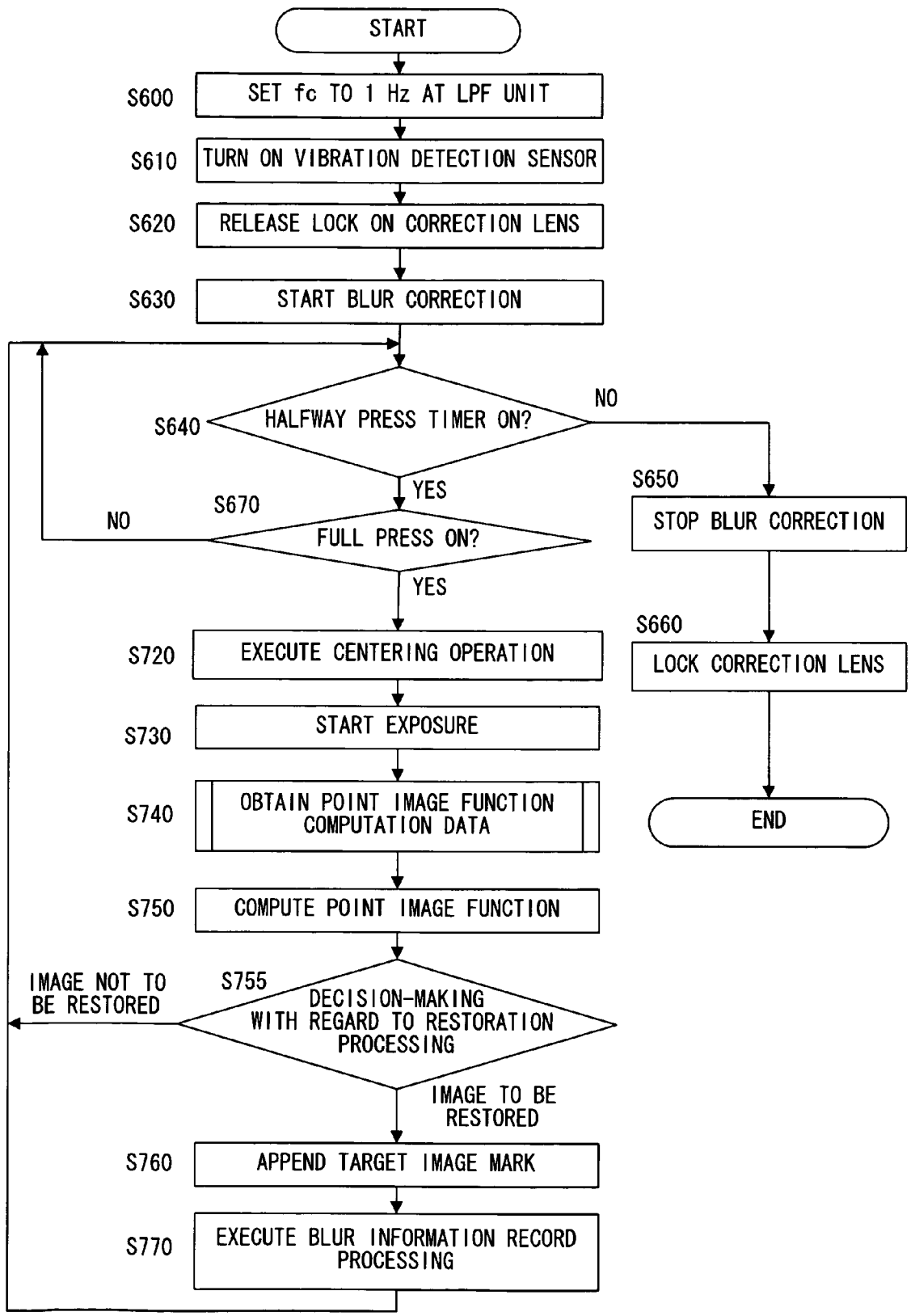
FIG. 24 presents a flowchart of an image restoring operation executed in the fourth embodiment.

The following is an explanation of the fourth embodiment of the present invention, given in reference to FIG. 24.

The fourth embodiment differs from the third embodiment in that an operation equivalent to that executed in step S680 (the image restoration decision-making unit) in FIG. 17 in the third embodiment is executed after the point-image function computation (step S750), but otherwise, it is identical to the third embodiment. Accordingly, the same reference numerals are assigned to components having functions similar to those in the third embodiment to minimize the need for a repeated explanation thereof.

After executing the point-image function computation in step S750, a decision is made in step S755 as to whether or not the image restoration should be executed (whether or not the image restoring operation mode should be selected. While the objective of the operation executed in this step (the operation of the image restoration decision-making unit) is similar to that of the operation executed in step S680 in FIG. 17 in the third embodiment, a different decision-making method is adopted (see FIG. 25). If it is decided in step S755 that the image restoration is to be executed, the operation proceeds to step S760, whereas if it is decided that the image restoration is not to be executed, the operation returns to step S640.

Figure 25:
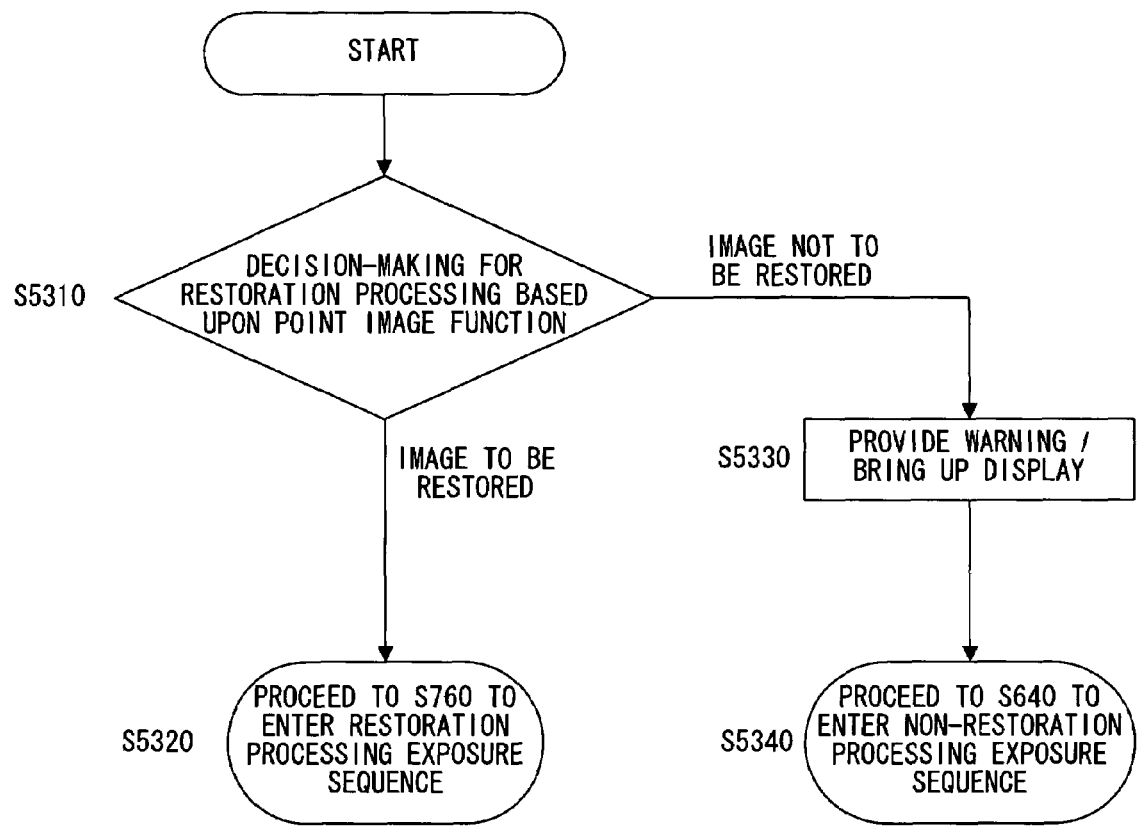
FIG. 25 presents a detailed flowchart of an operation executed at the image restoration decision-making unit in the fourth embodiment to make a decision based upon the point-image function as to whether or not image restoration is to be executed.

FIG. 25 is a detailed flowchart of the operation executed at the image restoration decision-making unit to make a decision based upon the point-image function as to whether or not the image restoration is to be executed, and the flowchart corresponds to the flowchart presented in FIG. 18 which shows the operation executed in the third embodiment.

In step S5310, a decision is made based upon the point-image function as to whether or not the image restoring operation mode should be selected. If it is decided that the image restoration is to be executed, the operation proceeds to step S5320 to enter an exposure sequence which includes the image restoration (S760 in FIG. 24). If, on the other hand, it is decided that the image restoration is not to be executed, the operation proceeds to step S5330.

In the specific method that may be adopted when making a decision based upon the point-image function as to whether or not to select the image restoring operation mode, the width of the point-image function may be computed and a decision that the image restoration is to be executed may be made if the computed width is smaller than a predetermined value (e.g., 30 μm). The width of the point-image function may be taken as the length of the diagonal contacting a rectangle obtained by circumscribing the point-image function.

In step S5330, a warning display (message) indicating that the image restoring operation is not to be executed is provided. The message may be provided, for instance, in the form of a warning sound or a specific display.

In step S5340, the operation enters an exposure sequence that does not include restoration processing (S640 in FIG. 24).

In the third embodiment, a decision is made based upon the information indicating the extent of the detected blur, the shutter speed, the focal length and the like as to whether or not to execute the image restoration prior to the point-image function computation. However, since this information is obtained during the period of time elapsing between the half-way press operation and the full press operation of the shutter release button, it is used to make a decision by predicting the extent of vibration to occur during the exposure, which means that if the extent of vibration blur changes during the period of time elapsing between the full press operation of the shutter release button and the exposure end, an accurate decision may not be made. Accordingly, a decision as to whether or not to select the image restoring operation mode is made in the embodiment based upon a point-image function computed by using information obtained during the exposure so as to enable decision-making that reflects the actual vibration information obtained during the photographing operation.

In addition, since the extent of the image blur manifesting on the image plane is indicated with a specific numerical value through the point-image function, a decision as to whether or not the image restoration should be executed can be made with a higher level of accuracy.

Since the decision as to whether or not to select the image restoring operation mode is made based upon the point-image function, the need for the image restoration can be judged by taking into consideration any change in the extent of vibration that may take place during the exposure and an even more accurate judgment can be made accordingly.

The advantages that can be obtained through the present invention described in detail about are summarized below.

Since the system includes the image restoration decision-making unit that makes a decision as to whether or not the image restoration mode should be selected, the image restoration is executed only if the image quality is likely to be improved through the image restoration and no redundant image restoration is implemented.

The image restoration decision-making unit makes a decision as to whether or not the image restoration mode should be selected based upon the vibration detection signal, and thus, it is capable of judging the extent of an extreme blur, e.g., a major image blur or a very slight image blur.

Since the image restoration decision-making unit makes a decision as to whether or not the image restoration mode should be selected based upon the shutter speed, the image restoration is executed if the shutter speed is set to a level at which a concern for an image blur exists.

Since the image restoration decision-making unit makes a decision as to whether or not the image restoration mode should be selected based upon the focal length of the photographic optical system, the image restoration is executed if a concern for an image blur exists at the particular focal length.

Since the image restoration decision-making unit makes a decision as to whether or not the image restoration mode should be selected based upon the point spread function, the need for the image restoration can be judged with a higher level of accuracy as the extent of vibration changes during the exposure.

Since the system includes the reporting means for reporting the results of a decision made by the image restoration decision-making unit indicating that the image restoration mode should not be entered, the photographer is able to ascertain the photographing state with ease and thus, the operability is improved.

If the image restoration decision-making unit determines that the image restoration mode should not be entered, the image restoration mode is not entered, thereby ensuring that no redundant arithmetic operation or the like is executed. This feature is particularly effective in improving the processing speed and minimizing the power consumption.

If the image restoration decision-making unit determines that the image restoration mode should not be entered, the point spread function is not saved, and thus the required memory capacity can be reduced.

FIFTH EMBODIMENT

In the fifth embodiment, the present invention is adopted in a camera that allows the use of exchangeable photographic lenses. The same reference numerals are assigned to components having functions similar to those in the third embodiment to minimize the need for a reputed explanation thereof.

Figure 26:
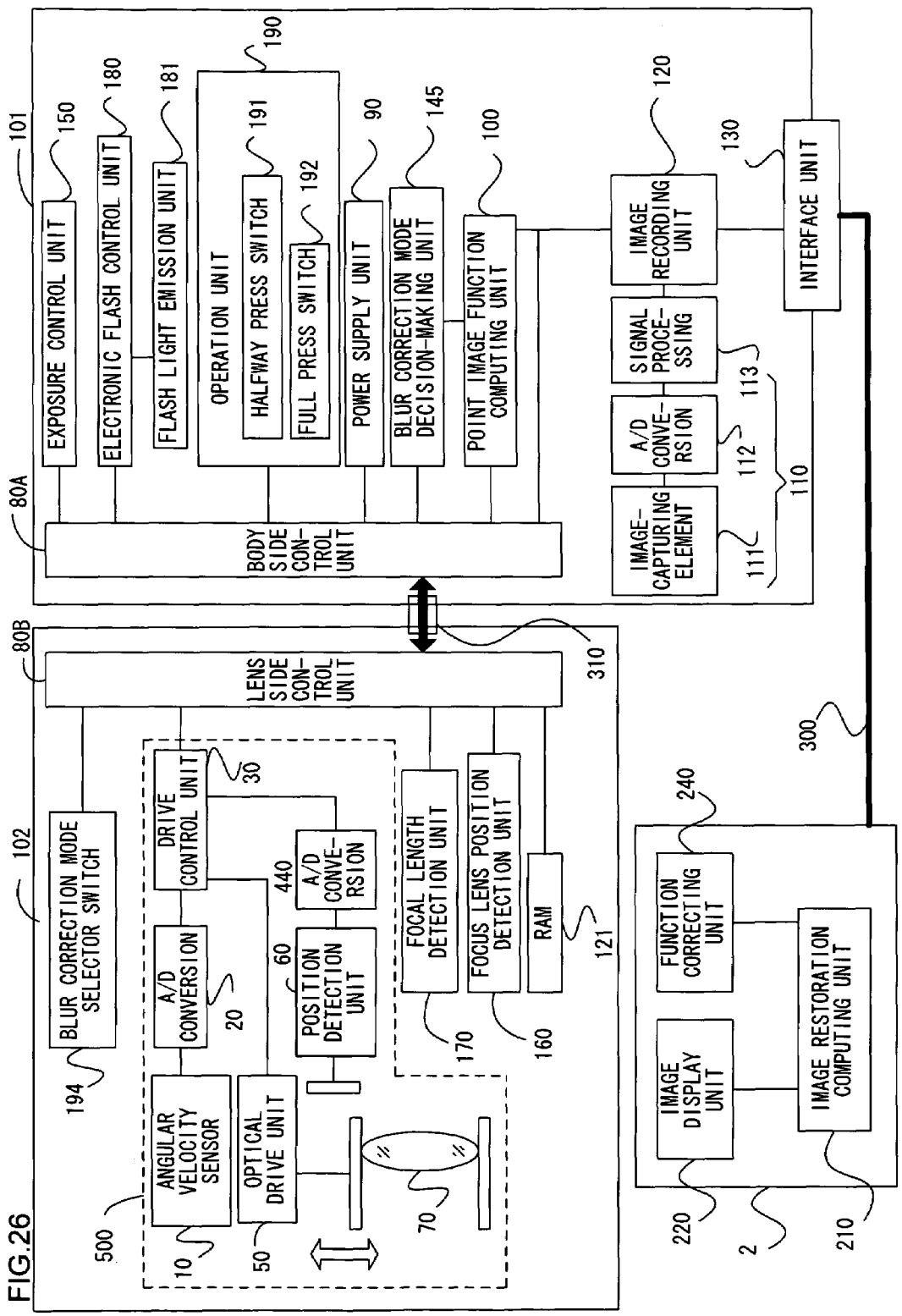
FIG. 26 is a block diagram showing a system configuration adopted in a fifth embodiment of the blur correction camera according to the present invention.

FIG. 26 is a block diagram of the system configuration adopted in the fifth embodiment of the blur correction camera according to the present invention.

At a camera body 101, a body-side control unit 80A, a power supply unit 90, a point-image function computing unit 100, an image-capturing unit 110, an image recording unit 120, an interface unit 130, a blur correction mode decision-making unit 145, an exposure control unit 150, an electronic flash control unit 180, an operation unit 190 and the like are disposed.

At an interchangeable lens 102, a lens-side control unit 80B, a RAM 121, a focus lens position detection unit 160, a focal length detection unit 170, a blur correction mode selector switch 194, an optical correction system 500 and the like are disposed.

In addition, a signal transfer unit 310 is disposed at a position at which the camera body 101 and the interchangeable lens 102 are connected with each other so as to enable signal exchange between the camera body 101 and the interchangeable lens 102.

An image reproduction device 2 includes a function correcting unit 240.

Next, the operations executed at the camera body 101 and the interchangeable lens 102 in the embodiment while an image is photographed are explained.

It is to be noted that while the three modes, the "blur correction off mode" the "optical correcting operation mode" and the "image restoring operation mode", can be selected with the blur correction mode selector switch 194, as explained in reference to the third embodiment, the explanation focuses on the operations characterizing the present invention, i.e., the operations executed in the "optical correcting operation mode" and the "image restoring operation mode".

Figure 27:
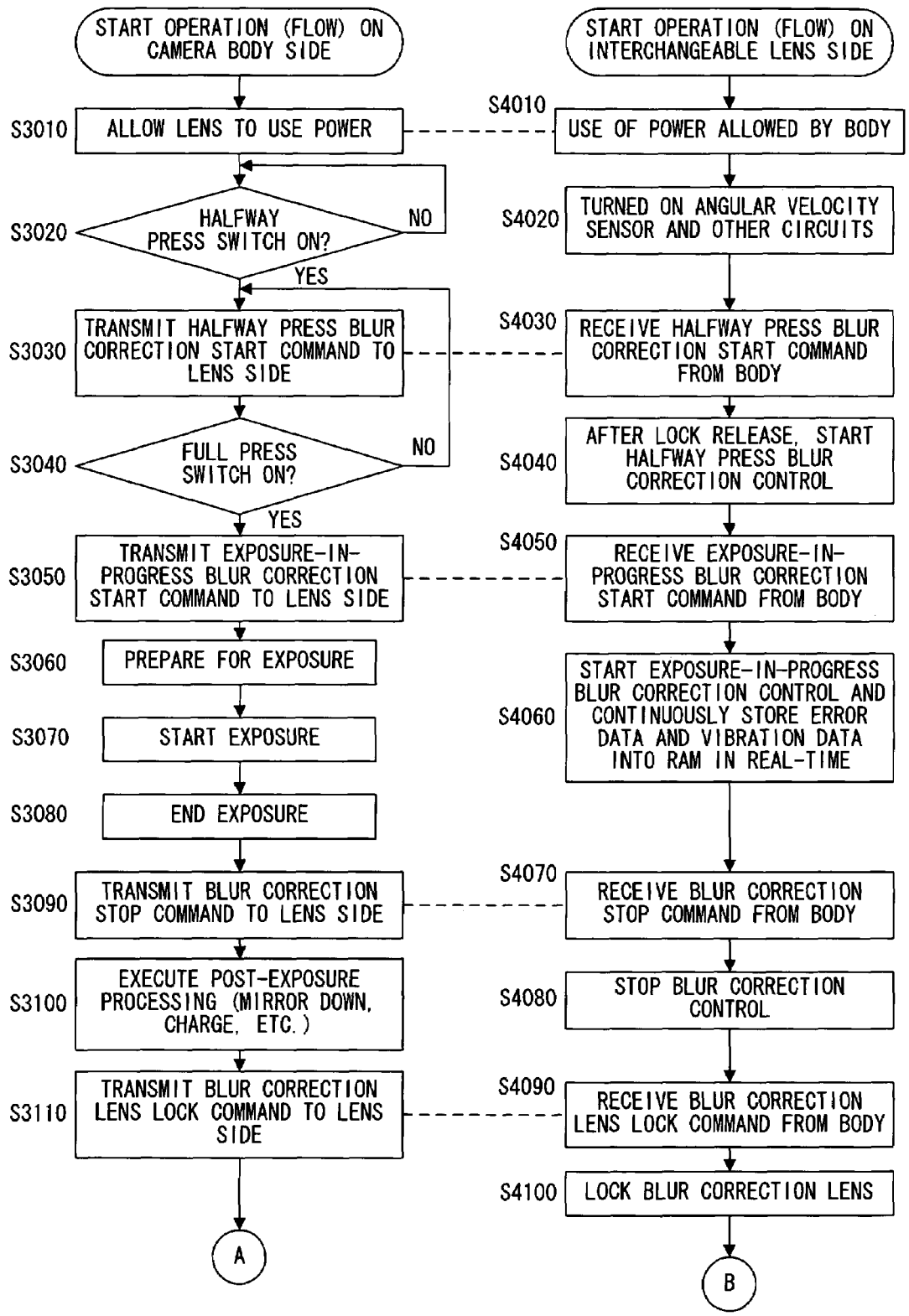
FIG. 27 presents a flowchart of operations executed at a camera body and an interchangeable lens during a photographing operation in the fifth embodiment.
Figure 28:
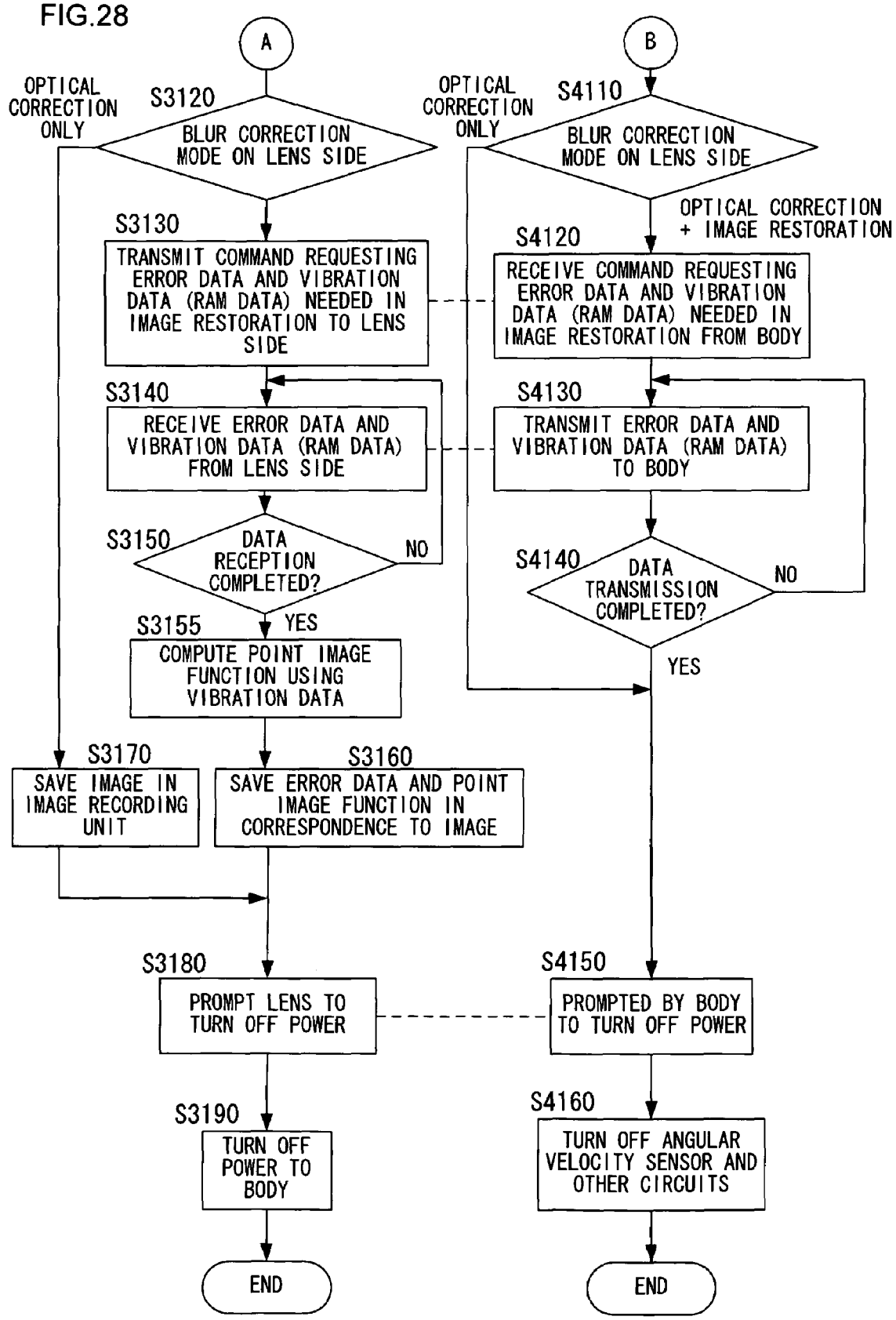
FIG. 28 presents a flowchart of operations executed at the camera body and the interchangeable lens during a photographing operation in the fifth embodiment, in continuation from FIG. 27.

FIGS. 27 and 28 present a flowchart of the operations executed at the camera body 101 and the interchangeable lens 102 in the embodiment while an image is photographed, featuring the blur correction executed in response to a normal single-shot shutter release. Since the flowchart is highly comprehensive, it is presented in two separate parts in FIGS. 27 and 28. In addition, in the flowchart, the operational flow (steps assigned with step numbers in the 3000's) at the camera body 101 is shown on the left side and the operational flow (steps assigned with step numbers in the 4000's) at the interchangeable lens 102 is shown on the right side, with a dotted line connecting a pair of steps indicating that the operations are executed substantially simultaneously.

In step S3010, the interchangeable lens 102 is allowed to use the power from the power supply unit 90.

Upon being allowed the use of the power (S4010), the interchangeable lens 102 supplies the power to the angular velocity sensor 10 and other circuits in step S4020.

In step S3020, a decision is made as to whether or not the halfway press switch 191 is in an ON state, and the operation proceeds to step S3030 if the halfway press switch 191 is determined to be in an ON state whereas the decision-making in step S3020 is repeatedly executed if the halfway press switch 191 is determined to be in an OFF state. In step S3030, a command constituting a start instruction for a blur correcting operation (hereafter referred to as a halfway press blur correcting operation) to be executed while the halfway press switch 191 remains in an ON state is transmitted to the lens-side.

Upon receiving the halfway press blur correction start command (S4030), the interchangeable lens 102 releases the lock on the blur correction lens 70 and starts the halfway press blur correcting operation in step S4040.

In step S3040, a decision is made as to whether or not the full press switch 192 is in an ON state, and the operation proceeds to step S3050 if the full press switch 192 is determined to be in an ON state, whereas the operation returns to step S3030 to repeatedly execute the decision-making in step S3040 if the full press switch 192 is determined to be in an OFF state. In step S3050 to which the operation proceeds when the full press switch 192 is in an ON state, a command constituting a start instruction for an exposure-in-progress blur correction is transmitted to the lens side. In step S3060, an exposure preparation such as a mirror-up operation is executed, the exposure is started in step S3070 and then the exposure ends in step S3080.

Upon receiving the exposure-in-progress blur correction start command (S4050), the interchangeable lens 102 starts an exposure-in-progress blur correcting operation in step S4060. In addition, in step S4060, the position detection unit 60 at the interchangeable lens 102 detects the actual drive position of the blur correction lens 70 while the exposure-in-progress blur correcting operation is underway, and error information (error data) indicating the difference between the actual drive position and the target drive position and vibration data constituted with information provided by the angular velocity sensor 10 are continuously stored into the RAM 121 at least during the period of time elapsing between the exposure start point and the exposure end point.

In step S3090, a command instructing a blur correction stop (a blur correction stop command) is transmitted to the interchangeable lens 102. Upon receiving the blur correction stop command (S4070), the interchangeable lens 102 stops the blur correction control in step S4080.

In step S3100, post-exposure processing such as a mirror-down operation and a charge is executed. In step S3110, a blur correction lens lock command constituting an instruction for locking the blur correction lens 70 is transmitted to the interchangeable lens 102. Upon receiving the blur correction lens lock command (S4090), the interchangeable lens 102 locks the blur correction lens in step S4100.

In step S3120 in FIG. 28, the blur correction mode decision-making unit 145 at the camera body 101 makes a decision as to whether the "optical correcting operation mode" (in which only the optical blur correction is executed) or the "image restoring operation mode" (in which both the optical blur correction and the image restoration are executed) has been selected with the blur correction mode selector switch 194 disposed at the interchangeable lens 102. The operation proceeds to step S3130 if the "image restoring operation mode" has been selected, whereas the operation proceeds to step S3170 if the "optical correcting operation mode" has been selected.

In addition, in correspondence to the operation executed in step S3120, the operation proceeds to step S4120 if the "image restoring operation mode" has been selected but the operation proceeds to step S4150 otherwise on the interchangeable lens side (S4110).

In step S3130, a command requesting the error data and the vibration data having been stored into the RAM 121 earlier is transmitted to the interchangeable lens 102. Upon receiving the command requesting the error data and the vibration data (S4120), the interchangeable lens 102 transmits the error data to the camera body 101 in step S4130.

In step S4140, a decision is made as to whether or not the transmission of both types of data has been completed and the operation proceeds to step S4150 if the data transmission has been completed, whereas the operation returns to step S4130 if the data transmission has not been completed, to continuously transmit the error data. Upon receiving the error data and the vibration data (S3140), a decision is made at the camera body 101 in step S3150 as to whether or not the two types of data have been received, and the operation proceeds to step S3160 if the reception has been completed, whereas the operation returns to step S3140 if the reception has not been completed, to continuously receive the two types of data.

In step S3155, the point-image function is computed by using the received vibration data. In step S3160, the error data and the point-image function are saved into the image recording unit 120 in correspondence to the photographed image. In step S3170, the photographed image is saved into the image recording unit 120. It is to be noted that unlike in step S3160, the error data are not saved in step S3170. In step S3180, a command prompting the interchangeable lens 102 to turn off the power is transmitted, and subsequently, the power to the camera body 101 is turned off in step S3190, thereby ending the operation.

Upon receiving the command prompting a power off (S4150), the interchangeable lens 102 turns off the angular velocity sensor 10 and the other circuits in step S4160, thereby ending the operation.

The image data, the point-image function having been computed by the point-image function computing unit 100 and the error data, which have been saved are transmitted to the image reproducing device 2 where the point-image function is corrected based upon the error data at the function correcting unit 240.

Subsequently, the image is restored at the image restoration computing unit 210. At this time, the image restoration is executed by using the point-image function having been corrected based upon the error data. The restored image obtained through this process will have undergone blur correction executed by taking into consideration the positional error of the blur correction lens 70, thereby achieving a high blur correction effect in the restored image.

In the camera system achieved in the embodiment, which allows the use of interchangeable lenses, the drive error manifesting with regard to the blur correction lens 70 is detected and the image restoration is executed by taking into consideration the detected error. As a result, the optimal blur correction effect is achieved regardless of which of a plurality of interchangeable lenses with varying blur correction lens drive characteristics is currently used.

The present invention is not limited to the embodiments described above and allows for numerous variations and modifications which are also considered to be equally contained within the scope of the present invention.

While the volume of data is reduced through the reducing processing in the first and third embodiments, the present invention is not limited to this example and the reference value may be computed and saved and the error may be computed and saved without culling any data.

While the point-image function is computed based upon the reference value having been computed by using the output from the angular velocity sensor 10 or the vibration data and the point-image function thus computed is then corrected based upon the error information in the embodiments described above, the present invention is not limited to this example and a function computed based upon both the reference value and the vibration data may then be corrected.

Alternatively, the point-image function maybe computed by using the error information in conjunction with either or both of the reference value or the vibration data, and the image restoration may then be executed without correcting the point-image function.

In addition, the point-image function may be computed by using the error information alone without using the output from the angular velocity sensor 10. Since it is not necessary to store or transfer through communication the reference value or the vibration data if the point-image function is computed based upon the error information alone, the work efficiency is improved and the length of time required for the operation is reduced.

While the point-image function computing unit 100 is disposed at the camera body 101 of the camera 1 in the embodiments, the present invention is not limited to this example and the point-image function computing unit 100 may instead be installed at, for instance, the image reproduction device 2. Likewise, while the function correcting unit 240 is included in the image reproducing device 2 in the fifth embodiment, the present invention is not limited to this example and the function correcting unit may instead be installed at the camera body 101 of the camera 1. In other words, the information related to the control position error can be utilized by adopting any of various configurations achieved through different combinations of functions achieved at the camera body and the image reproduction device. Examples of such combinations are listed in Table 2 below.

TABLE 2

| No. | CAMERA . CAMERA BODY | IMAGE REPRODUCTION DEVICE | REMARKS |
|---|---|---|---|
| 1 | POINT-IMAGE FUNCTION COMPUTING UNIT FUNCTION CORRECTING UNIT IMAGE RESTORATION COMPUTING UNIT | | |
| 2 | POINT-IMAGE FUNCTION COMPUTING UNIT (REFLECTS ERROR) IMAGE RESTORATION COMPUTING UNIT | | |
| 3 | POINT-IMAGE FUNCTION COMPUTING UNIT (EXECUTES COMPUTATION BASED UPON ERROR ALONE) IMAGE RESTORATION COMPUTING UNIT | | |
| 4 | POINT-IMAGE FUNCTION COMPUTING UNIT FUNCTION CORRECTING UNIT | IMAGE RESTORATION COMPUTING UNIT | CORRESPONDS TO THIRD EMBODIMENT |
| 5 | POINT-IMAGE FUNCTION COMPUTING UNIT | FUNCTION CORRECTING UNIT IMAGE RESTORATION COMPUTING UNIT | CORRESPONDS TO FIFTH EMBODIMENT |
| 6 | POINT-IMAGE FUNCTION COMPUTING UNIT (REFLECTS ERROR) | IMAGE RESTORATION COMPUTING UNIT | |
| 7 | POINT-IMAGE FUNCTION COMPUTING UNIT (EXECUTES COMPUTATION BASED UPON ERROR ALONE) | IMAGE RESTORATION COMPUTING UNIT | |
| 8 | | POINT-IMAGE FUNCTION COMPUTING UNIT FUNCTION CORRECTING UNIT IMAGE RESTORATION COMPUTING UNIT | |
| 9 | | POINT - IMAGE FUNCTION COMPUTING UNIT (REFLECTS ERROR) IMAGE RESTORATION COMPUTING UNIT | |
| 10 | | POINT - IMAGE FUNCTION COMPUTING UNIT (EXECUTES COMPUTATION BASED UPON ERROR ALONE) IMAGE RESTORATION COMPUTING UNIT | |

Combination No. 4 in Table 2 corresponds to the third embodiment and combination No. 5 in Table 2 corresponds to the fifth embodiment. The advantages of the present invention can be realized with equal effectiveness by adopting any of the combinations listed in Table 2.

In addition, in combination No. 3, 7 and 10 in Table 2, the reference value data and the vibration data do not need to be stored or transferred through communication and thus, an improvement in the work efficiency and a reduction in the length of processing time are achieved as explained earlier.

The advantages that can be obtained in the embodiments of the present invention described in detail above are summarized below.

In the system which includes the control position error output unit that outputs a control position error indicating the difference between a target drive position of the blur correction optical system controlled by the control unit and the actual drive position of the blur correction optical system output from the position detection unit and the image restoration computing unit that executes image processing on an image captured by the image-capturing unit by taking into consideration the control position error and thus corrects an image blur through image restoration, the residual image blur attributable to the drive control error of the blur correction optical system, too, can be corrected. Thus, even when the optical blur correction does not achieve ideal results, the image blur can be ultimately corrected with a high level of reliability to achieve a highly effective blur correction at all times.

In the system having the function correcting unit, which corrects the point spread function by using the control position error, the image restoration computing unit executes the image restoration by using the point spread function having been corrected by the function correcting unit and thus, the residual image blur attributable to the drive control error of the blur correction optical system, too, can be corrected. As a result, even when the optical blur correction does not achieve ideal results, the image blur can be corrected with a high level of reliability to ultimately achieve a highly effective blur correction at all times.

In the system having the point spread function computing unit, which computes the point spread function based upon the control position error, the point spread function reflecting the drive control error of the blur correction optical system is computed. Thus, the residual image blur attributable to the drive control error of the blur correction optical system, too, can be corrected. Consequently, even when the optical blur correction does not achieve ideal results, the image blur can be corrected with a high level of reliability to ultimately achieve a highly effective blur correction at all times.

INDUSTRIAL APPLICABILITY

While the explanation has been given above in reference to an example in which the present invention is adopted in a digital still camera used to capture still images, the present invention may be adopted with comparable effectiveness in digital cameras used to capture dynamic images.

The invention claimed is:

1. A blur correction camera system, comprising:
a vibration detection unit that detects a vibration;
a blur correction optical system that is driven based upon a detection result of the vibration detection unit to execute a first image blur correction;
an image capturing unit that captures an image formed with a photographic optical system that includes the blur correction optical system; and
an image correction unit that executes a second image blur correction through image processing on an image captured by the image capturing unit, based on the detection result of the vibration detection unit, wherein:
at least one of a time period information relating to a period of time during which a still image is captured by the image capturing unit and a timing information relating to a timing at which the still image is captured by the image capturing unit is inputted to the image correction unit; and
the image correction unit executes the second image blur correction by using at least one of the time period information and the timing information thus inputted.

2. The blur correction camera system according to claim 1, wherein the image correction unit executes the second image blur correction using a point spread function obtained based on the detection result of the vibration detection unit.

3. The blur correction camera system according to claim 1, further comprising:
a reference value computing unit that computes a reference value for a vibration detection signal output from the vibration detection unit, wherein:
the image correction unit executes the second image blur correction using a point spread function obtained based on the reference value when the blur correction optical system executes the first image blur correction; and
the image correction unit executes the second image blur correction using a point spread function obtained based on the vibration detection signal outputted from the vibration detection unit when the blur correction optical system does not execute the first image blur correction.

4. The blur correction camera system according to claim 1, wherein image blur corrected through the second image blur correction is a still image blur present in a still image captured by the image capturing unit.

5. The blur correction camera system according to claim 1, further comprising:
a reference value computing unit that computes a reference value for a vibration detection signal outputted from the vibration detection unit wherein:
the image correction unit executes the second image blur correction based on at least one of a point spread function obtained by using the reference value and a point spread function obtained based on the vibration detection signal outputted from the vibration detection unit.

6. The blur correction camera system according to claim 5, further comprising a reduction unit that reduces a volume of information relating to at least one of the reference value and the point spread function.

7. The blur correction camera system according to claim 1, further comprising:
a saving unit that saves at least one of parameters used in the second image blur correction and a restored image obtained through the second image blur correction with the image correction unit in correspondence to a raw image on which the second image blur correction is not performed by the image correction unit.

8. The blur correction camera system according to claim 1, further comprising:
a control unit that engages the blur correction optical system in the first image blur correction when the image correction unit is to execute the second image blur correction.

9. A blur correction camera system comprising:
a vibration detection unit that detects a vibration;
a blur correction optical system that is driven based upon a detection result of the vibration detection unit to execute a first image blur correction;
an image capturing unit that captures an image formed with a photographic optical system that includes the blur correction optical system;
an image correction unit that executes a second image blur correction through image processing on an image captured by the image capturing unit, based on the detection result of the vibration detection unit;
an image restoration decision unit that makes a decision as to whether or not the second image blur correction is to be executed by the image correction unit, based on at least one of a focal length of the photographic optical system, a period of time during which a still image is captured by the image capturing unit, and a blur component remaining even after the first image blur correction is executed.

10. The blur correction camera system according to claim 9, wherein image blur corrected through the second image blur correction is a still image blur present in a still image captured by the image capturing unit.

11. The blur correction camera system according to claim 9, further comprising:
a reference value computing unit that computes a reference value for a vibration detection signal outputted from the vibration detection unit, wherein:
the image correction unit executes the second image blur correction using a point spread function obtained based on the reference value when the blur correction optical system executes the first image blur correction; and
the image correction unit executes the second image blur correction using a point spread function obtained based on the vibration detection signal outputted from the vibration detection unit when the blur correction optical system does not execute the first image blur correction.

12. The blur correction camera system according to claim 9, further comprising:
a reference value computing unit that computes a reference value for a vibration detection signal outputted from the vibration detection unit, wherein:
the image correction unit executes the second image blur correction based on at least one of a point spread function obtained by using the reference value and a point spread function obtained based on the vibration detection signal outputted from the vibration detection unit.

13. The blur correction camera system according to claim 12, further comprising:
a reduction unit that reduces a volume of information related to at least one of the reference value and the point spread function.

14. The blur correction camera system according to claim 9, further comprising:
saving unit that saves at least one of parameters used in the second image blur correction and a restored image obtained through the second image blur correction with the image correction unit in correspondence to a raw image on which the second image blur correction is not performed by the image correction unit.

15. The blur correction camera system according to claim 9, further comprising:
a control unit that engages the blur correction optical system in the first image blur correction when the image correction unit is to execute the second image blur correction.

16. The blur correction camera system according to claim 9, wherein:
the image correction unit executes the second image blur correction using a point spread function obtained based on the detection result of the vibration detection unit.

17. A blur correction camera system comprising:
a vibration detection unit that detects a vibration;
a blur correction optical system that is driven based upon a detection result of the vibration detection unit to execute a first image blur correction;
an image capturing unit that captures an image formed with a photographic optical system that includes the blur correction optical system; and
an image correction unit that executes a second image blur correction through image processing on an image captured by the image capturing unit, based on the detection result of the vibration detection unit,
wherein:
image blur corrected through the second image blur correction is a blur component remaining after the first image blur correction is executed.

18. The blur correction camera system according to claim 17, further comprising:
a saving unit that saves at least one of parameters used in the second image blur correction and a restored image obtained through the second image blur correction with the image correction unit in correspondence to a raw image on which the second image blur correction is not performed by the image correction unit.

19. The blur correction camera system according to claim 17, further comprising:
a control unit that engages the image blur correction optical system in the first image blur correction when the image correction unit is to execute the second image blur correction.

20. The blur correction camera system according to claim 17, wherein:
image blur corrected through the second image blur correction is a still image blur present in a still image captured by the image capturing unit.

21. The blur correction camera system according to claim 17, wherein:
the image correction unit executes the second image blur correction using a point spread function obtained based on the detection result of the vibration detection unit.

22. A blur correction method, comprising:
detecting a vibration by a sensor;
driving a blur correction optical system for executing a first image blur correction based on a vibration detection result obtained by using the sensor;
capturing an image formed with a photographic optical system that includes the blur correction optical system; and
executing a second image blur correction through image processing on the image thus captured based on the vibration detection results obtained by using the sensor;
outputting a first vibration signal and a second vibration signal which is different from the first vibration signal by using the sensor;
executing the first image blur correction based on the first vibration signal; and
executing the second image blur correction based on the second vibration signal.

23. The blur correction method according to claim 22, wherein a frequency band of the first vibration signal is higher than a frequency band of the second vibration signal.

24. The blur correction method according to claim 22, further comprising outputting the first vibration signal and the second vibration signal by dividing a signal output from the sensor into the first vibration signal and the second vibration signal using a filter.

25. The blur correction method according to claim 22, further comprising:
saving at least one of parameters used in the second image blur correction and a restored image obtained through the second image blur correction in correspondence to a raw image on which the second image blur correction is not performed.

26. The blur correction method according to claim 22, further comprising:
engaging the blur correction optical system in the first image blur correction when the second image blur correction is to be executed.

27. The blur correction method according to claim 22, wherein:
image blur corrected through the second image blur correction is a still image blur present in a captured still image.

28. The blur correction method according to claim 22, wherein: the second image blur correction is executed by using a point spread function obtained based on the detection result of the sensor.

* * * * *